(12) United States Patent
Yun et al.

(10) Patent No.: US 8,948,819 B2
(45) Date of Patent: Feb. 3, 2015

(54) MOBILE TERMINAL

(75) Inventors: Yeerang Yun, Seoul (KR); Hoyoun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 13/479,571

(22) Filed: May 24, 2012

(65) Prior Publication Data

US 2012/0302167 A1 Nov. 29, 2012

(30) Foreign Application Priority Data

May 24, 2011 (KR) ........................ 10-2011-0049148
Mar. 27, 2012 (KR) ........................ 10-2012-0031209

(51) Int. Cl.
*H04B 1/00* (2006.01)
*G06F 17/24* (2006.01)
*G06F 3/0488* (2013.01)

(52) U.S. Cl.
CPC .......... *G06F 17/242* (2013.01); *G06F 3/04883* (2013.01); *H04M 2250/22* (2013.01)
USPC ............ 455/566; 345/173; 382/186; 382/189

(58) Field of Classification Search
USPC ................................................ 455/566, 41.2
See application file for complete search history.

(56) References Cited

U.S. PATENT DOCUMENTS

| | | | |
|---|---|---|---|
| 6,177,926 B1 * | 1/2001 | Kunert | 345/173 |
| 6,504,956 B1 * | 1/2003 | Gannage et al. | 382/188 |
| 2002/0051262 A1 * | 5/2002 | Nuttall et al. | 358/537 |
| 2005/0289059 A1 * | 12/2005 | Brewington et al. | 705/45 |
| 2006/0221064 A1 * | 10/2006 | Sawada | 345/173 |
| 2008/0166049 A1 * | 7/2008 | Wang et al. | 382/189 |
| 2010/0042171 A1 * | 2/2010 | Saketkhou | 607/5 |
| 2010/0271366 A1 * | 10/2010 | Sung et al. | 345/419 |
| 2012/0019487 A1 | 1/2012 | Kazamaki et al. | |

FOREIGN PATENT DOCUMENTS

| | | | |
|---|---|---|---|
| CN | 101242602 A | 8/2008 | |
| CN | 101296457 A | 10/2008 | |
| CN | 101895625 A | 11/2010 | |
| EP | 1956809 A2 | 8/2008 | |
| KR | 10-2010-0063545 A | 6/2010 | |
| WO | WO 2010/082421 A1 | 7/2010 | |

* cited by examiner

*Primary Examiner* — Mazda Sabouri
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a touch screen; an input unit configured to generate input data; and a controller configured to activate a handwriting input function in response to the input data generated by the input unit, capture an image of a display screen being displayed on the touch screen, receive handwriting input received through the touch screen, generate output data corresponding to the received handwriting input, and generate a file including the generated output data and the captured image of the display screen.

52 Claims, 119 Drawing Sheets

FIG. 5
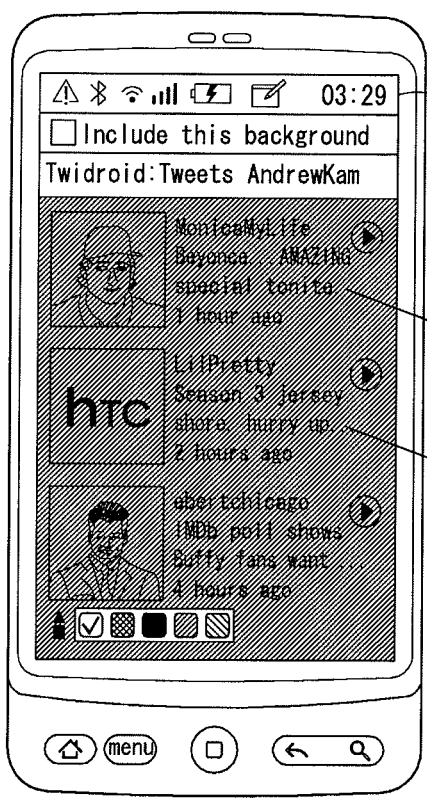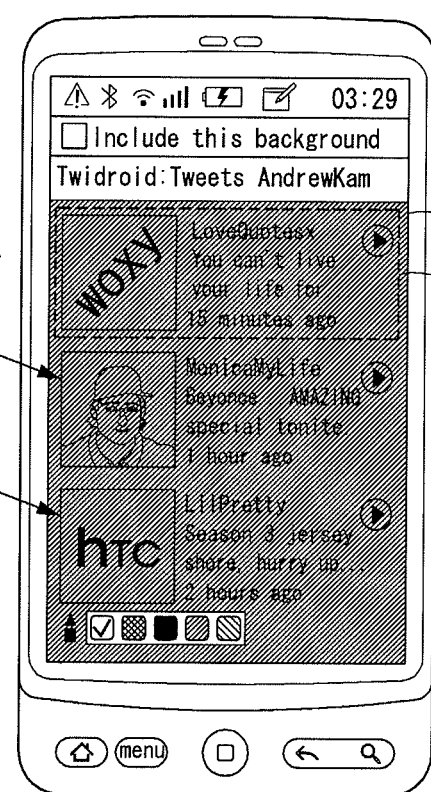

(a)          (b)

FIG. 78
| Pen type | | | Thickness | Opacity |
|---|---|---|---|---|
| Normal pen |  | —————— | 2px | 0% |
| Marker pen (Highlighter) |  | ▬▬▬▬▬ | 15px | 60% |
| Medium-size pen (Default type) |  | ——————— | 6px | 0% |
| Board marker |  | ▬▬▬▬▬ | 12px | 0% |
| Eraser |  | ● | 28px | 0% |

FIG. 100
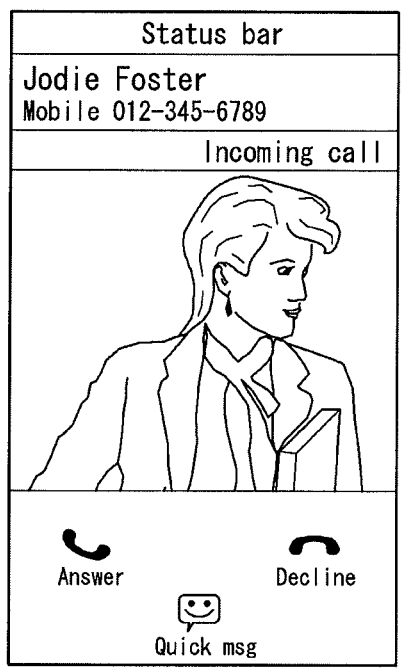
(a)
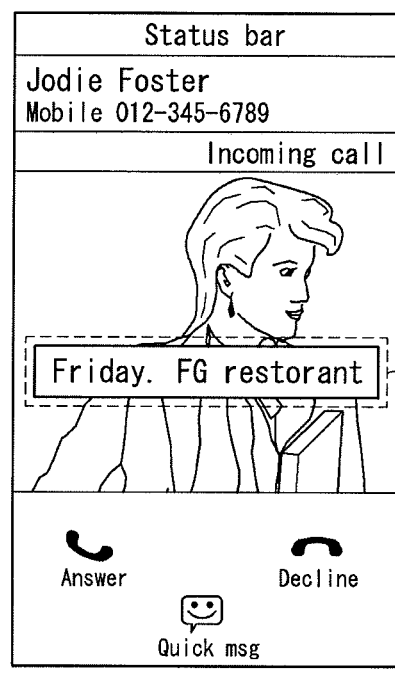
(b)

MOBILE TERMINAL

This application claims the benefit of Korean Patent Applications No. 10-2011-0049148 filed on 24 May, 2011 and No. 10-2012-0031209 filed on Mar. 27, 2012 which are hereby incorporated by reference.

BACKGROUND

1. Field of the Invention

The present invention relates to a mobile terminal. More specifically, the present invention relates to a mobile terminal capable of carrying out various functions such as memo and search functions by using a handwriting input function.

2. Discussion of the Related Art

As the functions of terminals such as personal computers, laptop computers, cellular phones, smart phones, and the like are diversified, the terminals are constructed in the form of a multimedia player having multiple functions of capturing pictures or moving images, playing music and video files, playing games, and receiving broadcasting programs.

To support and enhance functions of a terminal, it can be considered to improve a structural part and/or a software part of the terminal. A variety of recent terminals including mobile terminals provide more complex menu structure as multi-functional functions and various functions are incorporated therein.

SUMMARY OF THE INVENTION

A user of a mobile terminal according to the present invention can use a memo function through handwriting input under any circumstances.

A user of a mobile terminal according to the present invention can generate a memo file by using a screen displayed on a display unit.

A user of a mobile terminal according to the present invention can generate a memo file including an item selected from among a plurality of items displayed on a display unit.

A user of a mobile terminal according to the present invention can search for contents based on handwriting input and can further perform a particular function predetermined according to the attributes of the contents searched based on the handwriting input.

A user of a mobile terminal according to the present invention can utilize a touch screen as a quick handwriting input means based on simple operation such as operating hardware hot keys and software keys.

A user of a mobile terminal according to the present invention can easily generate a memo file including data created based on a display screen of a touch screen and handwriting input to the touch screen.

Also, a user of a mobile terminal according to the present invention can store data created easily based on handwriting input to a touch screen in conjunction with an execution screen of a particular application displayed on the touch screen.

A mobile terminal according to an embodiment of the present invention to solve the technical problem can comprise a touch screen and a controller. The controller, if handwriting input is received through the touch screen while a handwriting input function is activated, can convert the handwriting input into a memo file including at least one image and at least one from at least one text group and store the memo file.

At this time, if the handwriting input function is activated, the controller, while displaying the execution screen of a particular application on the touch screen, can deactivate the execution screen of the particular application. Also, while the handwriting input function is activated, the controller can update the execution screen of the particular application while keeping the execution screen of the particular application in a deactivated state.

In addition, if handwriting input is received through the touch screen while the handwriting input function is activated, the controller can incorporate a capture image of the execution screen of the particular application into the memo file.

A mobile terminal according to another embodiment of the present invention to solve the technical problem can comprise a display unit and a controller. The display unit can display a plurality of items. If a memo function is activated, the controller, while the memo function is activated, can deactivate a particular function corresponding to each of the plurality of items and convert at least one item selected from the plurality of items into a memo file including at least one image and at least one from at least one text group and store the memo file.

At this time, if the plurality of items correspond to the items included in the execution screen of a particular application, the controller, while the memo function is activated, can update the execution screen of the particular application while keeping the execution screen of the particular application in a deactivated state.

A mobile terminal according to yet another embodiment of the present invention to solve the technical problem can comprise a touch screen and a controller. The controller can search for contents corresponding to handwriting input received through the touch screen for which a handwriting input function is activated and display the search result on the touch screen. At this time, if the search contents are selected, the controller can display a control area intended for carrying out a function predetermined according to the attributes of the searched contents.

A mobile terminal according to still another embodiment of the present invention to solve the technical problem can comprise a touch screen; an input unit configured to generate input data; and a controller configured to activate a handwriting input function in response to predetermined input data generated based on the operation against the input unit. The handwriting input function is configured to capture a display screen of the touch screen, generate data corresponding to handwriting input received through the touch screen, and generate a file including the generated data and the capture image of a display screen of the touch screen, in response to the predetermined input data.

A mobile terminal according to a further embodiment of the present invention to solve the technical problem can comprise a touch screen configured to display an execution screen of a particular application; an input unit configured to generate input data; and a controller configured to activate handwriting input function through the touch screen, generate data corresponding to handwriting input received through the touch screen, associate the generated data in conjunction with the execution screen of the particular application displayed on the touch screen, and store the generated data in response to predetermined input data generated at the input unit.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 5 is a procedure through which an execution screen of an SNS application deactivated upon activation of a memo function is updated according to the execution procedure of the SNS application;

FIG. 78 illustrates the types of virtual pens, thickness and transparency of each pen used for showing the trajectory of handwriting and shape and opacity of a virtual eraser provided by a mobile terminal according to the present invention;

FIG. 100 illustrates a case where data stored in response to a particular person according to a procedure illustrated in FIG. 99 are displayed on a touch screen at the time of executing a call application for the particular person;

FIGS. 106 and 107 illustrate a procedure of using handwriting input received as a handwriting input function is activated while a calendar application is running according to a method for utilizing handwriting input illustrated in FIG. 103;

FIGS. 108 and 109 illustrate a procedure of using handwriting input received as a handwriting input function is activated while a calendar application is running according to a method for utilizing handwriting input illustrated in FIG. 103;

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
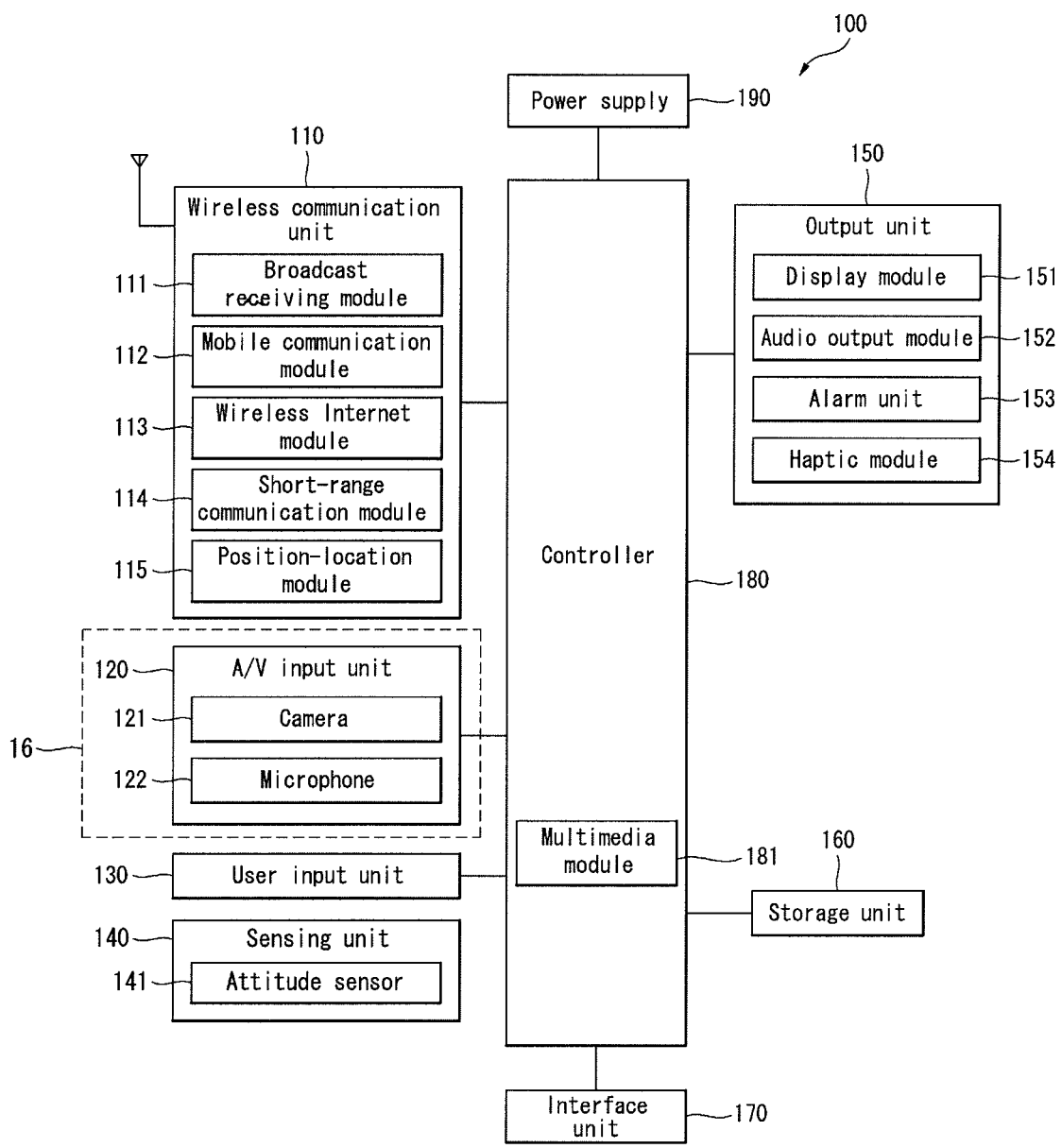
FIG. 1 is a block diagram of a mobile terminal according to an embodiment of the present invention.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

As shown in FIG. 1, the A/V input unit 120 and the user input unit 130 can be realized as a single input unit 116. Various kinds of input data generated at the input unit 116 can be used to activate a handwriting input through a display unit 151 implemented in the form of a touch screen. The input data can comprise images received through the camera 121, voice of a user received through the microphone 122, and touch signals received through the display unit 151. However, the scope of the present invention is not limited to the above.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UT or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

When the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

So far, with reference to FIG. 1, structure of a mobile terminal 100 according to the present invention has been described. In what follows, characteristics of a mobile terminal 100 according to the present invention carrying out a memo function will be described in more detail.

Figure 2:
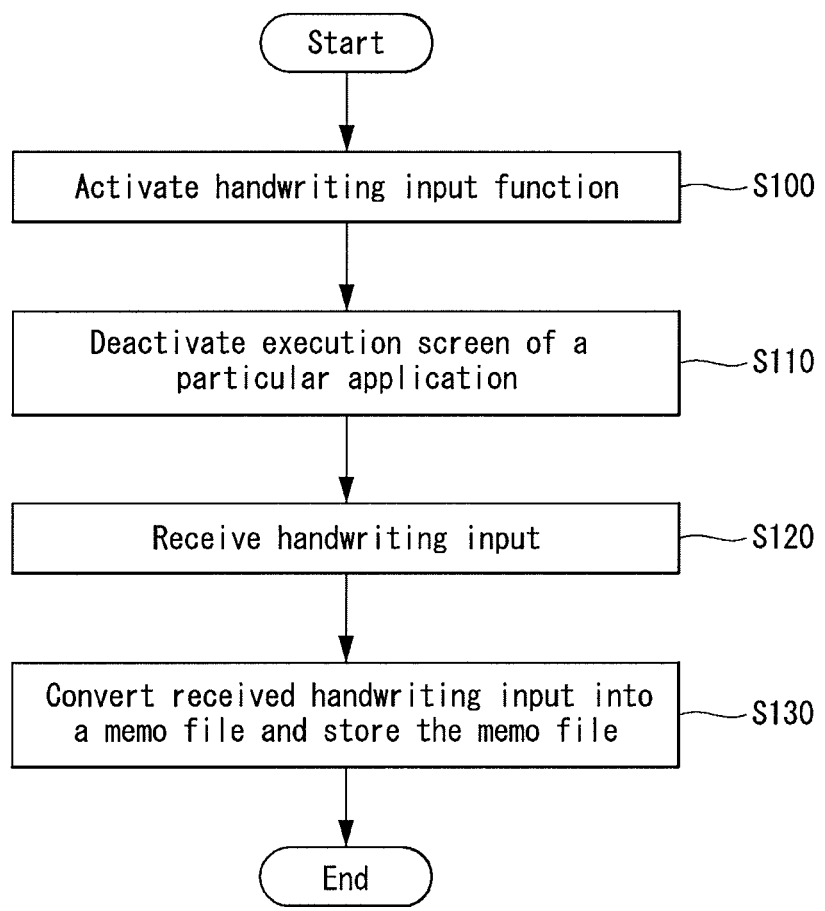
FIG. 2 is a flow diagram illustrating a method for generating a memo file for a mobile terminal according to an embodiment of the present invention.

FIG. 2 is a flow diagram illustrating a method for generating a memo file for a mobile terminal according to an embodiment of the present invention. In response to the user's operation, the controller 180 of the mobile terminal 100 activates a handwriting input function employing a touch screen 151 of the mobile terminal 100, S100. According to the present invention of this document, the user can perform a touch motion against the touch screen 151 by using his or her body part (e.g., a finger), a stylus pen, and the like. Furthermore, the user can perform a handwriting input motion through the touch screen 151.

If a handwriting input function is activated, the controller 180 deactivates the execution screen of a particular application displayed on the touch screen 151, S110. For example, while in the activation state, a touch on a particular area of the execution screen of a particular application causes a function corresponding to the particular area to be performed; however, in the deactivation state, a function corresponding to the particular area is not performed even if a touch is sensed on the particular area.

Here, a particular application may include an application for operating the mobile terminal 100 as well as an application for carrying out a particular function such as a phone application, a memo application, a web browsing application, and so on. Therefore, the execution screen of the particular application can correspond to an execution screen of an application for carrying out a particular function, a lock-screen (which is an execution screen of an operating application), a waiting screen, and so on.

Figure 3:
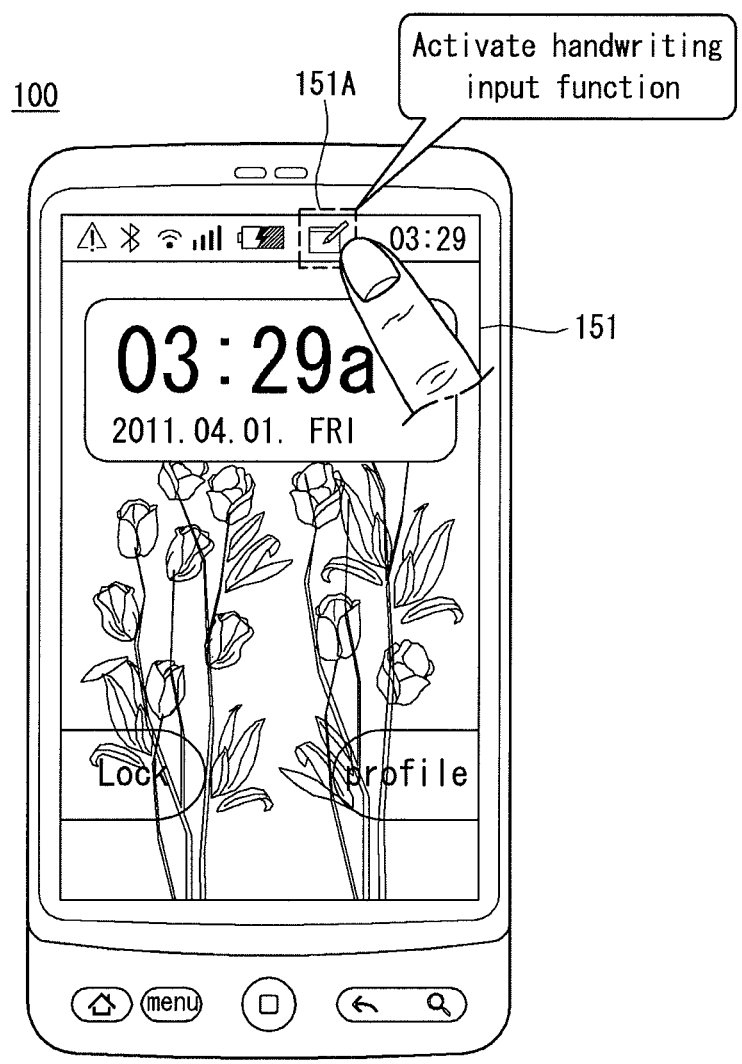
FIG. 3 illustrates a procedure of a user's activating a handwriting input function of the mobile terminal on a lock screen according to the method for generating a memo file illustrated in FIG. 2.
Figure 4:
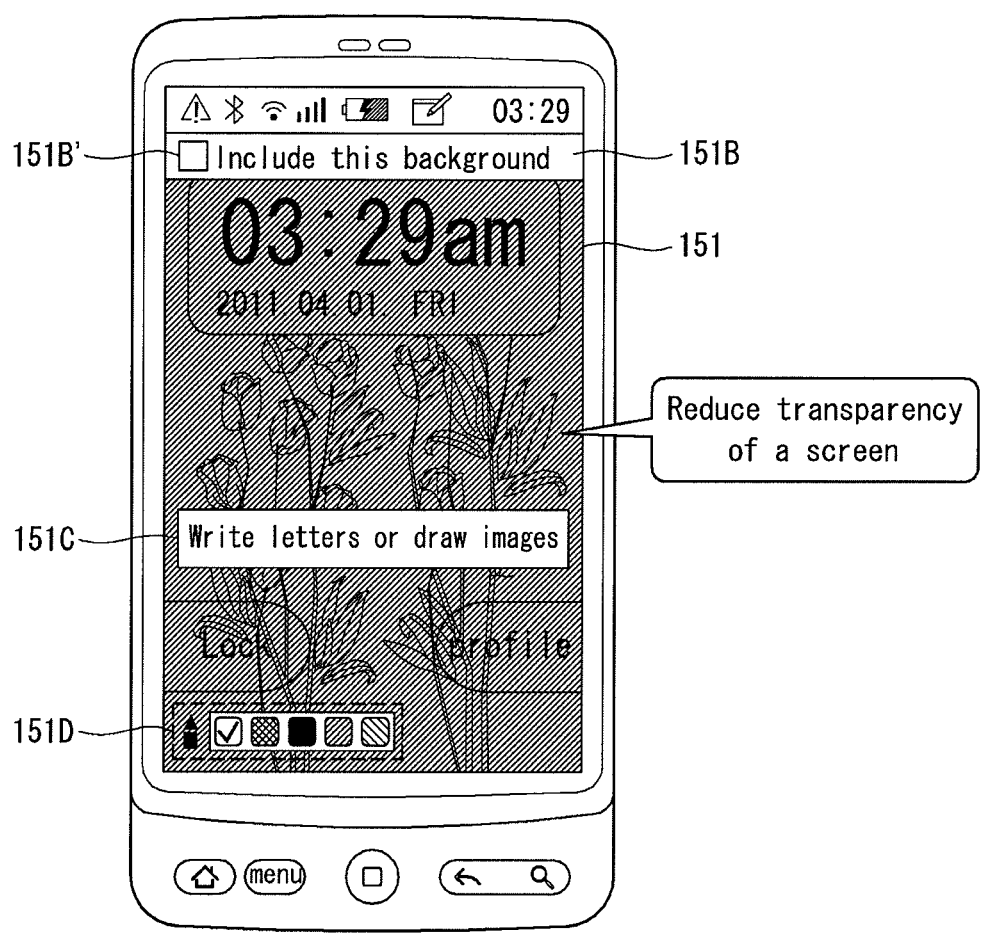
FIG. 4 is a screen of the mobile terminal with a handwriting input function activated according to the method for generating a memo file illustrated in FIG. 2.

FIG. 3 illustrates a procedure of a user's activating a handwriting input function of the mobile terminal 100 on a lock screen according to the method for generating a memo file illustrated in FIG. 2. FIG. 4 is a screen of the mobile terminal 100 with a handwriting input function activated according to the method for generating a memo file illustrated in FIG. 2.

With reference to FIG. 3, the user, touching a soft key 151A corresponding to a handwriting input function displayed in an indicator area, can activate a handwriting input function employing the touch screen 151. Though not shown in FIG. 3, the user can also activate a handwriting input function employing the touch screen 151 by pressing a hardware key included in the mobile terminal 100.

In what follows, with reference to FIG. 4, characteristics found on the screen 151 of the mobile terminal 100 will be examined when a handwriting input function is activated. If a handwriting input function employing the touch screen 151 is activated, the controller 180 decreases a transparency of an execution screen of the particular application, thereby changing the execution screen of the particular application into a translucent state. Then the user, checking that the execution screen of the particular application has been changed into a translucent state, can recognize that the execution screen of the particular application has been deactivated. It should be noted that the controller 180 does not perform a lock-release function for the mobile terminal 100 in the state of FIG. 3 even if the user performs a touch operation to release lock.

If a handwriting input function employing the touch screen 151 is activated, the controller 180 can display a message window 151B on the screen 151, inquiring whether to include an execution screen of the particular application at the time of creating a memo file. If the user touches a selection button 151B' of the message window 151B, the controller 180 can generate a memo file by using at least part of the execution screen of the particular application. A method for generating a memo file by using an execution screen of a particular application will be described in detail with reference to FIGS. 23 to 38.

Also, if a handwriting input function employing the touch screen 151 is activated, the controller 180 can display a pop-up window 151C on the screen 151 of the mobile terminal 100 for a predetermined time, the pop-up window displaying a message that a character or an image can be input through handwriting since a handwriting input function has been activated.

In addition, if a handwriting input function employing the touch screen 151 is activated, the controller 180 can display a setting area 151D for selecting a style for a line generated through handwriting input on the screen 151 of the mobile terminal 100. At this time, the style of a line generated through handwriting input can include color, texture, thickness, transparency, and so on; but the scope of the present invention is not limited to the above.

It should be noted that a method for deactivating an activated handwriting input function can include a method of re-touching a soft key 151A corresponding to a handwriting input function while the handwriting input function is activated and a method of pressing a home button 151E, and a method of pressing a back key; but the scope of the present invention is not limited to the above.

As opposed to what are illustrated in FIGS. 3 and 4, if an execution screen of the particular application is updated according to an execution procedure, the controller 180 can update an execution screen of the particular application according to the execution procedure of the particular application while keeping the execution screen of the particular application in a deactivation state.

FIG. 5 is a procedure through which an execution screen of an SNS application deactivated upon activation of a memo function is updated according to the execution procedure of the SNS application. With reference to FIG. 5, as new messages are arriving, old messages move subsequently to a downward direction of a screen. Therefore, the user can check the execution procedure of an SNS application even while a handwriting input function is activated.

So far, it has been described with reference to FIGS. 3 to 5 that a handwriting input function of the mobile terminal 100 according to the present invention can be activated in a lock screen and an execution screen of a particular application. However, the handwriting input function of the mobile terminal 100 according to the present invention can be a function included in a memo application.

For example, if a handwriting input function is activated as a memo application is performed while an execution screen of the particular application is displayed on the touch screen 151, the user, checking the execution screen of the particular application being updated, may input handwriting through the touch screen 151, perform an editing function (e.g., copy, paste, cut, etc.) against the handwriting input, or open a memo file and perform an editing function against the memo file. At this time, the execution screen of a memo application can be regarded as a transparent or translucent virtual layer being formed on the execution screen of the particular application and blocking a response of the particular application according to a touch input. In other words, as long as the handwriting input function is activated, the controller 180 of the mobile terminal 100 can update the execution screen of the particular application while keeping the execution screen of the particular application in a deactivation state.

Again, with reference to FIG. 2, if the execution screen of the particular application is deactivated, the touch screen 151 receives handwriting input generated based on a touch input of the user S120. Then the controller 180 converts the received handwriting input into a memo file and store the memo file S130.

Figure 6:
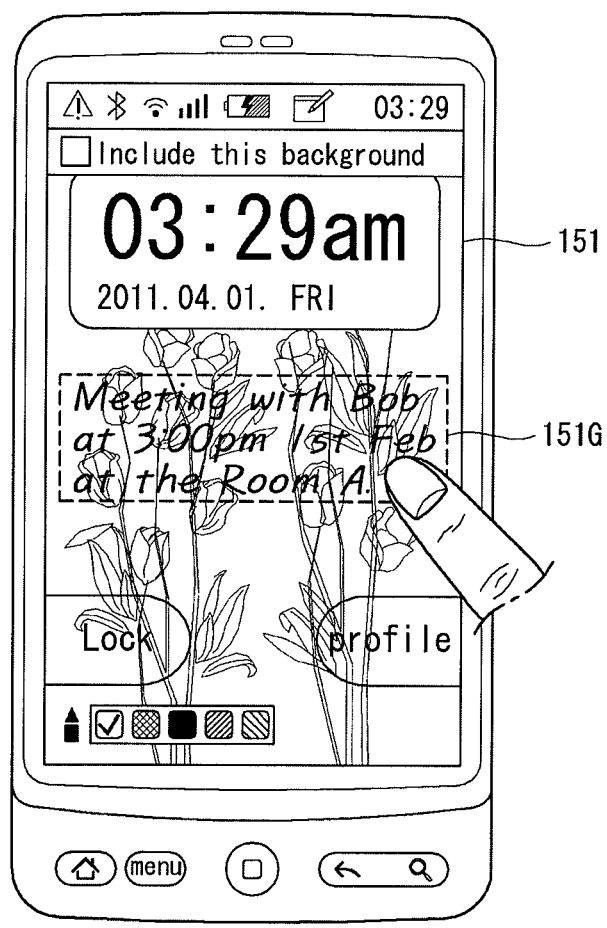
FIGS. 6 to 8 illustrate a procedure through which handwriting input received through a touch screen is stored in the form of a memo file according to the method for generating a memo file illustrated in FIG. 2.
Figure 7:
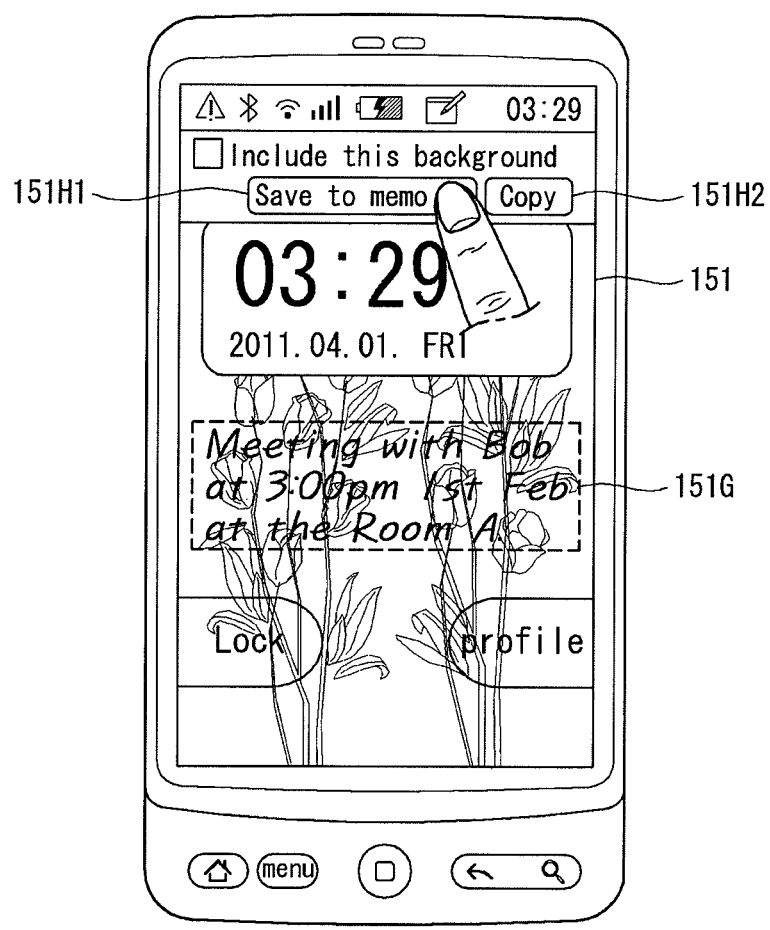
Figure 8:
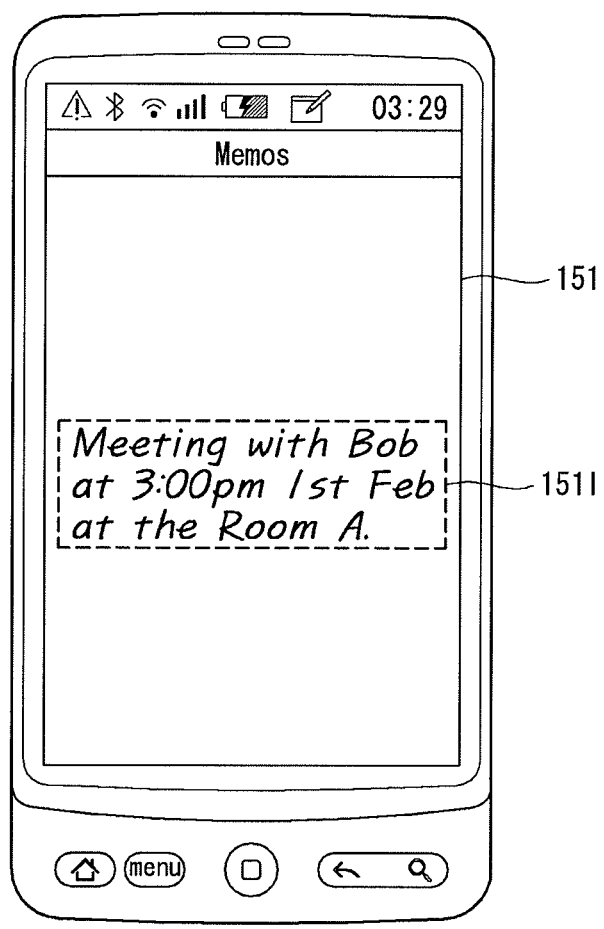

FIGS. 6 to 8 illustrate a procedure through which handwriting input received through a touch screen 151 is stored in the form of a memo file according to the method for generating a memo file illustrated in FIG. 2. More specifically, FIGS. 6 to 8 illustrate a procedure through which the controller 180 of the mobile terminal 100 converts handwriting input received being overlapped on a deactivated lock screen into an image file and generates a memo file including the converted image file.

As shown in FIG. 6, the user selects handwriting input 151G displayed on the screen 151 of the mobile terminal 100. Then the controller, as shown in FIG. 7, displays soft keys 151H1, 151 H2 intended to select storage space for a memo to be generated on the screen 151 of the mobile terminal 100. A first soft key 151H1 of the soft keys 151H1, 151H2 is a soft key intended to store the memo file to be generated into the storage space associated with a memo application while a second soft key 151H2 is a soft key for storing the memo file to be generated into clip board.

Figure 9:
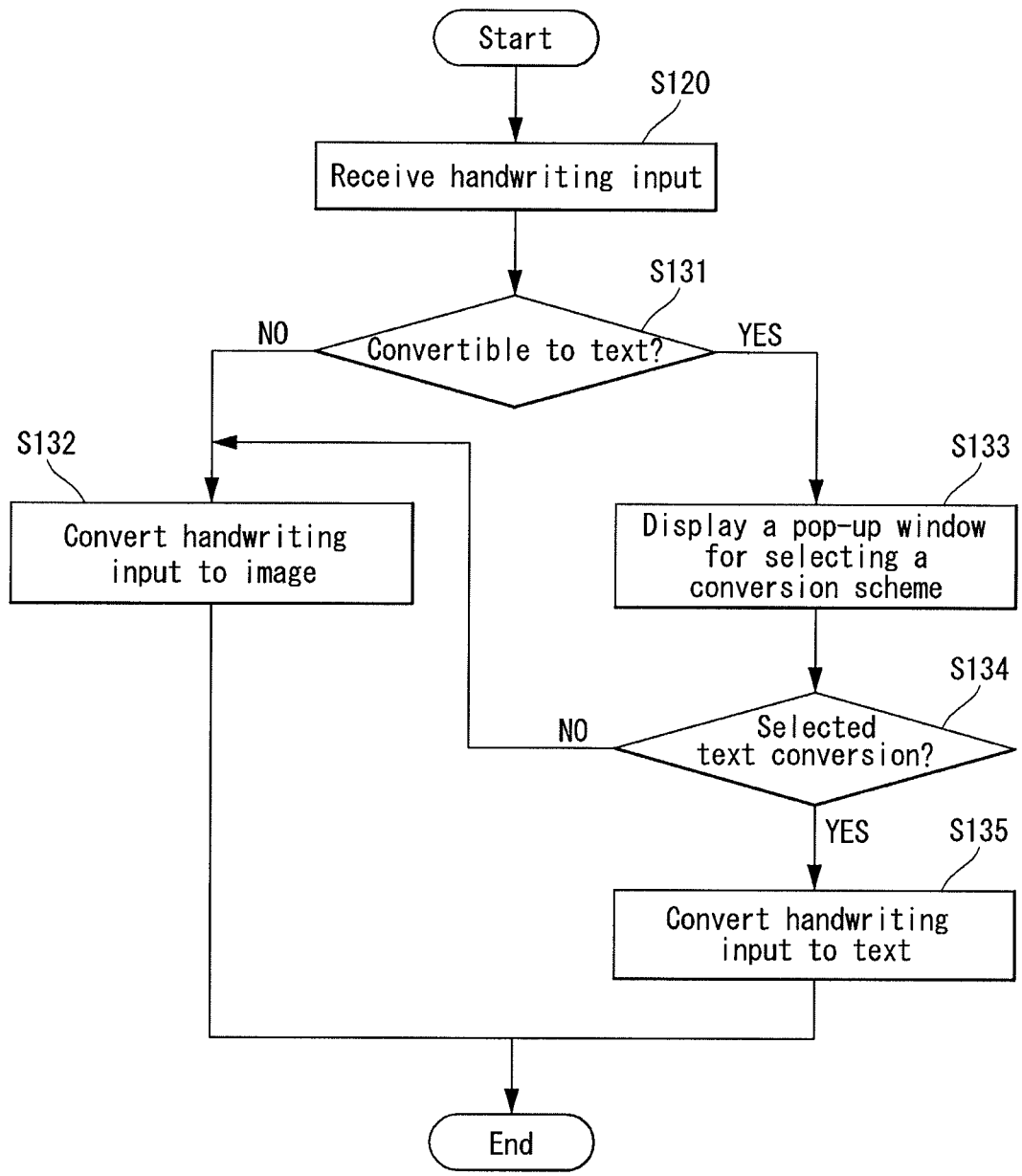
FIG. 9 is a flow diagram illustrating one example of a method for generating a memo file for a mobile terminal according to the present invention illustrated in FIG. 2.

As shown in FIG. 7, if the user touches the first soft key 151H1, a memo file generated is stored in the storage space associated with the memo application. Then, as shown in FIG. 8, the user can check the generated memo file by activating a memo application in conjunction with the stored memo file. Referring to FIG. 8, it can be seen that a memo file including an image file 151I converted from handwriting input has been stored in the storage space associated with the memo application. FIG. 9 is a flow diagram illustrating one example of a method for generating a memo file for a mobile terminal according to the present invention illustrated in FIG. 2. In what follows, the method for generating a memo file will be described with reference to related drawings.

Handwriting input is received through a touch screen 151 while a handwriting input function is activated S120. If handwriting input is received through the touch screen 151, the controller 180 of the mobile terminal 100 determines whether the handwriting input can be converted to text S131. If it is found that the handwriting input cannot be converted to text, the controller 180 can convert the handwriting input into an image S132 and generate a memo file including the converted image and store the memo file into a storage unit 150.

If the controller 180 determines that the handwriting input can be converted to text, however, the controller 180 displays a pop-up window for deciding whether to convert the handwriting input into an image or text S133. In other words, if the handwriting input can be converted to text, the controller 180 displays a pop-up window for choosing a conversion scheme of the handwriting input. However, if it turns out such that conversion of the handwriting input into text is unattainable, the controller 180 does not display a pop-up window for the user's choosing a conversion scheme on the screen 151 of the mobile terminal 100.

Next, the controller 180 determines whether the user makes a choice for converting the handwriting input into text S134. If the user makes a choice for converting the handwriting input into an image through the pop-up window, the controller 180 converts the handwriting input into an image S132. However, if the user makes a choice for converting the handwriting input into text, the controller 180 can convert the handwriting input into text S135 and generate a memo file including the converted text and stored the memo file in a storage unit 150.

FIG. 9 illustrates a case where the controller 180 displays a pop-up window for choosing a conversion scheme of the handwriting input on the screen 151 in the case that handwriting input can be converted into text. However, depending on embodiments of the present invention, the controller 180 can convert the handwriting input directly into text without providing a pop-up window for choosing a conversion scheme of the handwriting input.

Figure 10:
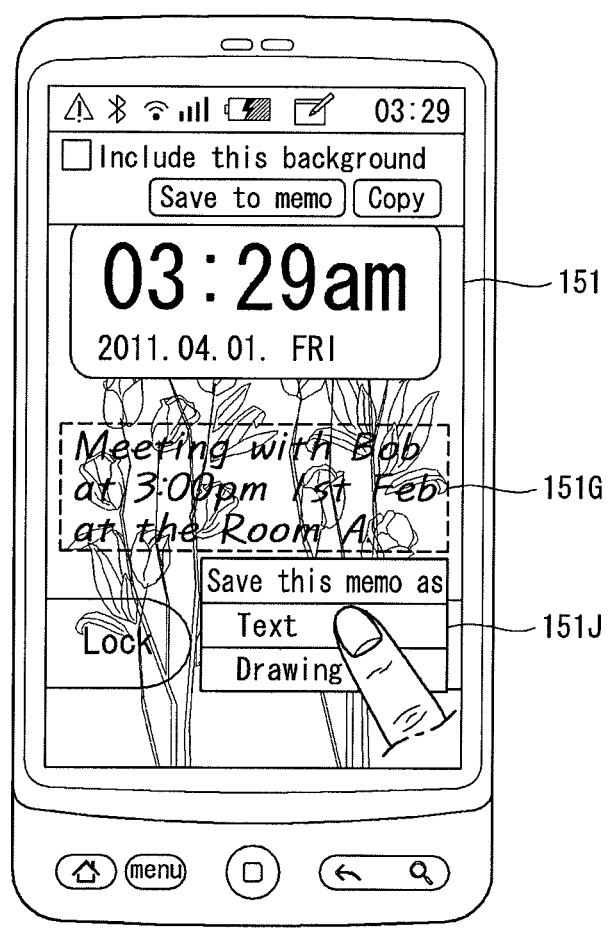
FIGS. 10 to 11 illustrate a procedure of generating a memo file including a text converted from handwriting input according to a method for generating a memo illustrated in FIG. 9.
Figure 11:
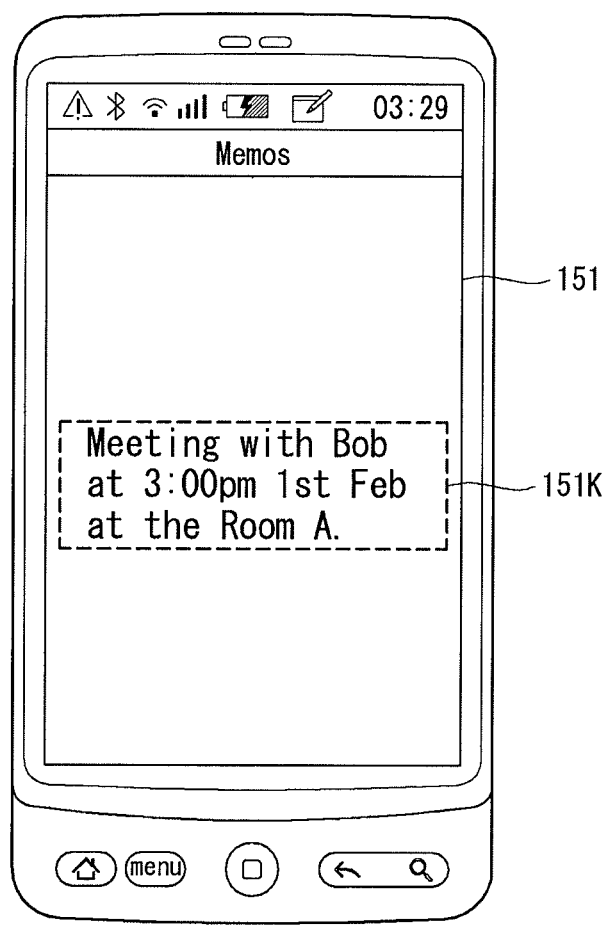

FIGS. 10 to 11 illustrate a procedure of generating a memo file including text 151K converted from handwriting input 151G according to a method for generating a memo illustrated in FIG. 9.

Referring to FIG. 10, it can be known that if the handwriting input 151G can be converted to text, the controller 180 of the mobile terminal 100 displays a pop-up window 151J for choosing a conversion scheme of the handwriting input on the screen 151. As shown in FIG. 10, while a pop-up window 151J is displayed, the user makes a choice to convert the handwriting input into text through the pop-up window 151J. Then the controller 180 converts the handwriting input into text and generates a memo file including converted text and stores the memo file. Then, as shown in FIG. 11, the user can check the memo file including the text 151K converted from the handwriting input by activating a memo application.

So far, a method for storing handwriting input received through a touch screen 151 into a memo file has been described with reference to FIGS. 2 to 11. The mobile terminal 100 according to the present invention, however, can convert the handwriting input into an image or text and store temporality the converted handwriting input into a clipboard instead of storing the handwriting input in a memo file. In what follow, an example of using handwriting input by storing the handwriting input into a clipboard will be described with reference to FIGS. 12 to 16.

Figure 12:
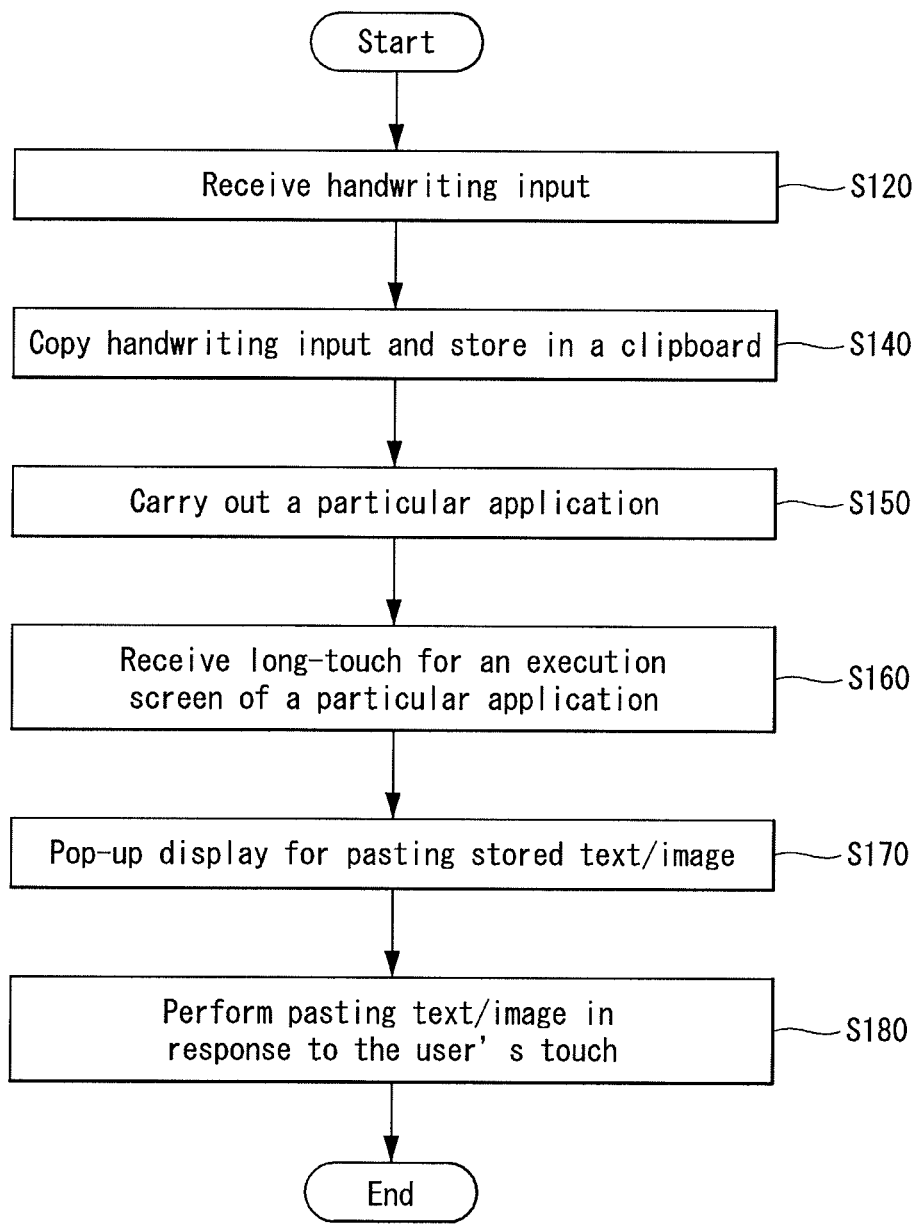
FIG. 12 is a flow diagram illustrating a method for using handwriting input for a mobile terminal according to an embodiment of the present invention.

FIG. 12 is a flow diagram illustrating a method for using handwriting input for the mobile terminal 100 according to an embodiment of the present invention. In what follows, a method for using the handwriting input will be described with reference to related drawings.

Handwriting input is received through a touch screen 151 while a handwriting input mode is activated S120. Then, the controller 180 of the mobile terminal 100 converts the handwriting input into text and/or image and stores the converted handwriting input in a clipboard S140. Depending on settings, the text and/or image can be stored automatically into the clipboard or stored into the clipboard according to the user's selection. A procedure through which the handwriting input is converted can be performed in the same manner as or in a way similar to the method described with reference to FIGS. 2 to 11; therefore, a detailed description thereof will be omitted. If the converted text and/or image is stored in the clipboard, the controller 180 carries out a particular application based on the user's operation S150. At this point, it is desirable for a particular application to be capable of carrying out functions of paste, delete, and copy against text, image, and so on. While the particular application is running, the controller 180 receives a long-touch from the user against an execution screen of the particular application S160. Here, the long-touch of the user corresponds to a right mouse click in a computer system.

If a long-touch against an execution screen of the particular application is received, the controller 180 displays a pop-up window for pasting an execution screen of the particular application with text and/or image stored in the clipboard S170. Next, if the user's touch is received against the pop-up window, the controller 180 performs pasting the stored text and/or image S180.

In the following, one example of a method for using handwriting input illustrated in FIG. 12 will be described with reference to FIGS. 13 to 16. FIGS. 13 to 16 illustrate a procedure of carrying out a method for using handwriting input illustrated in FIG. 12.

Figure 13:
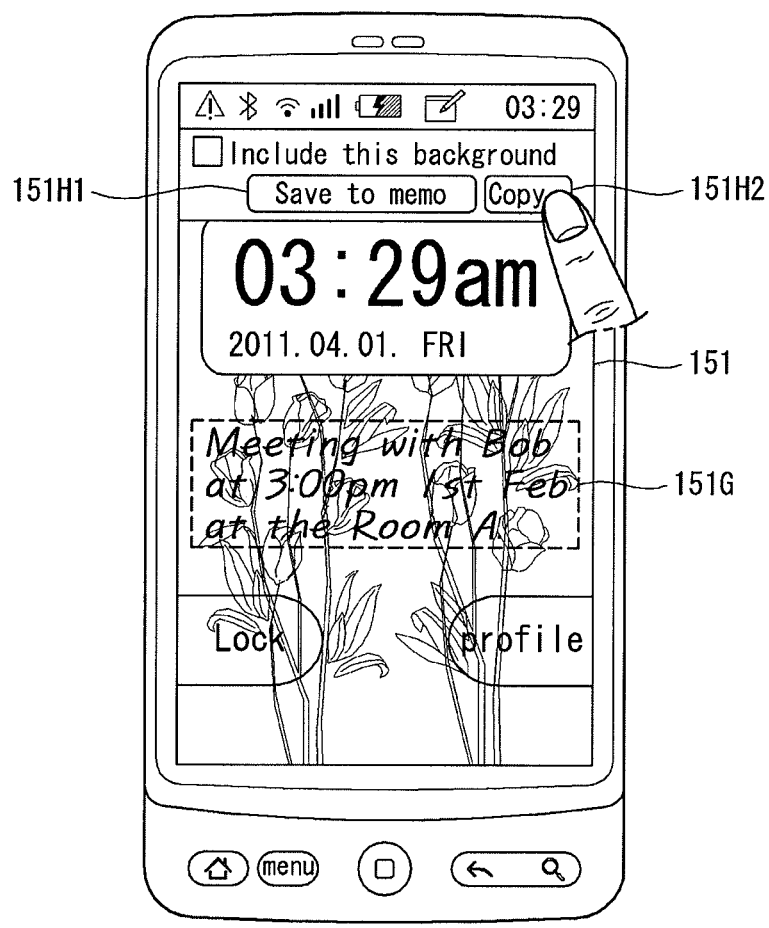
FIGS. 13 to 16 illustrate a procedure of carrying out a method for using handwriting input illustrated in FIG. 12.

Referring to FIG. 13, the user touches a second soft key 151H2 while handwriting input 151G is displayed on the screen 151. Then, the controller 180 converts the handwriting input 151G into text and stores the converted text into a clipboard.

Figure 14:
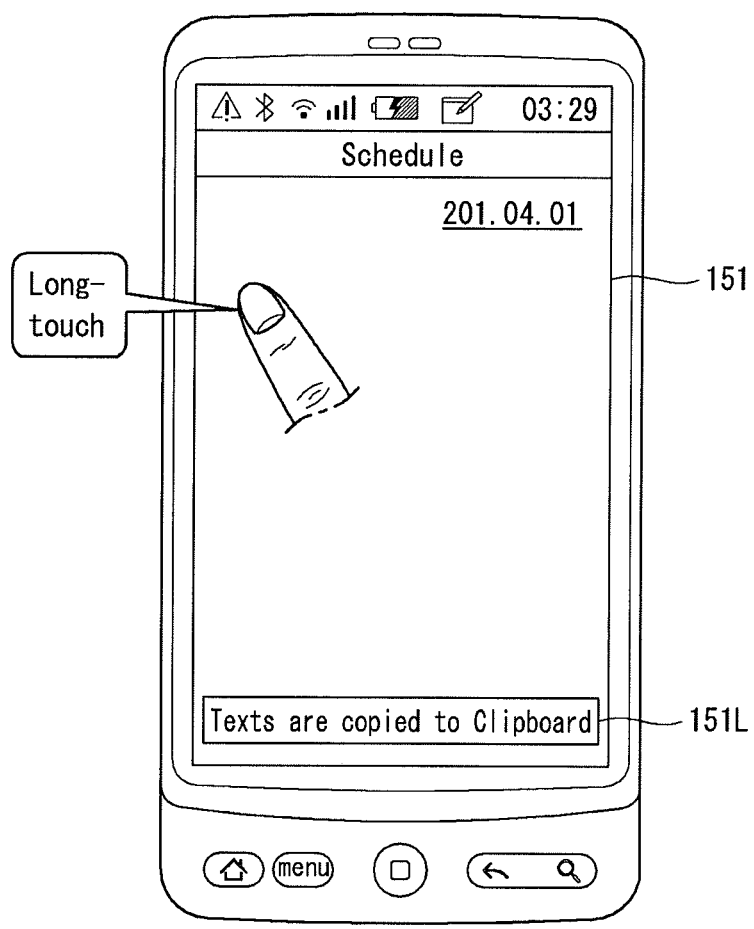

As shown in FIG. 14, while the converted text is stored in the clipboard, the user carries out a schedule application and makes a long-touch against the execution screen of the schedule application. Then, the controller 180, as shown in FIG. 15, displays a pop-up window 151M for pasting the text stored in the clipboard to the execution screen of the schedule application on the execution screen of the schedule application.

Figure 15:
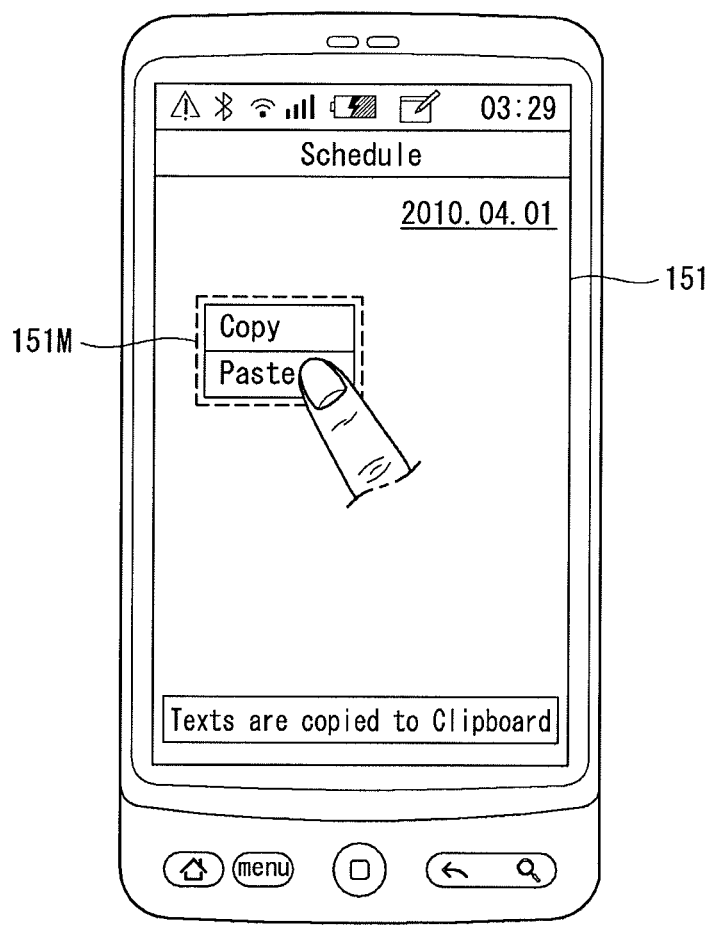
Figure 16:
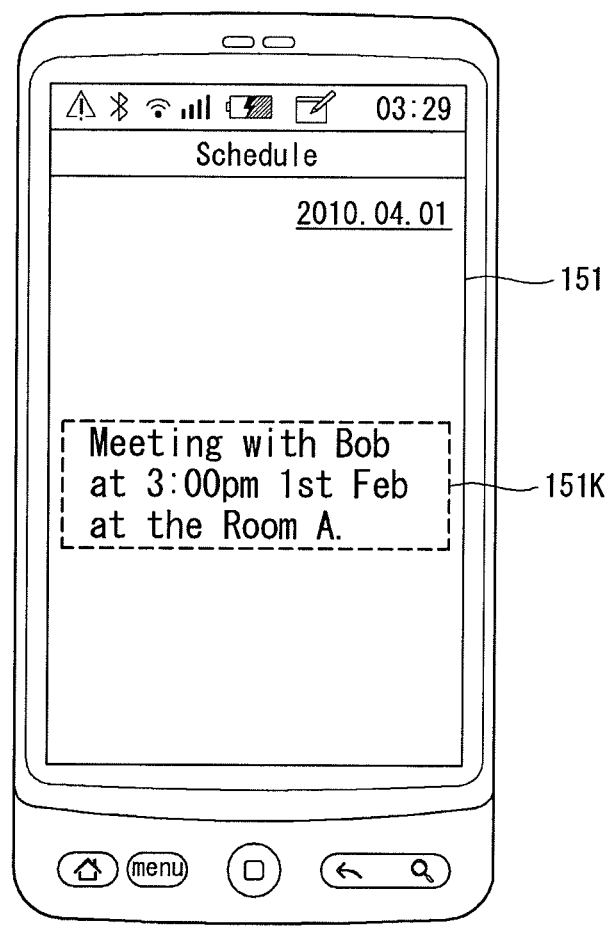

Next, as shown in FIG. 15, if the user touches an area of the pop-up window corresponding to a paste function, the controller 180 pastes the text 151K stored in the clipboard to the execution screen of the schedule application as shown in FIG. 16.

Figure 17:
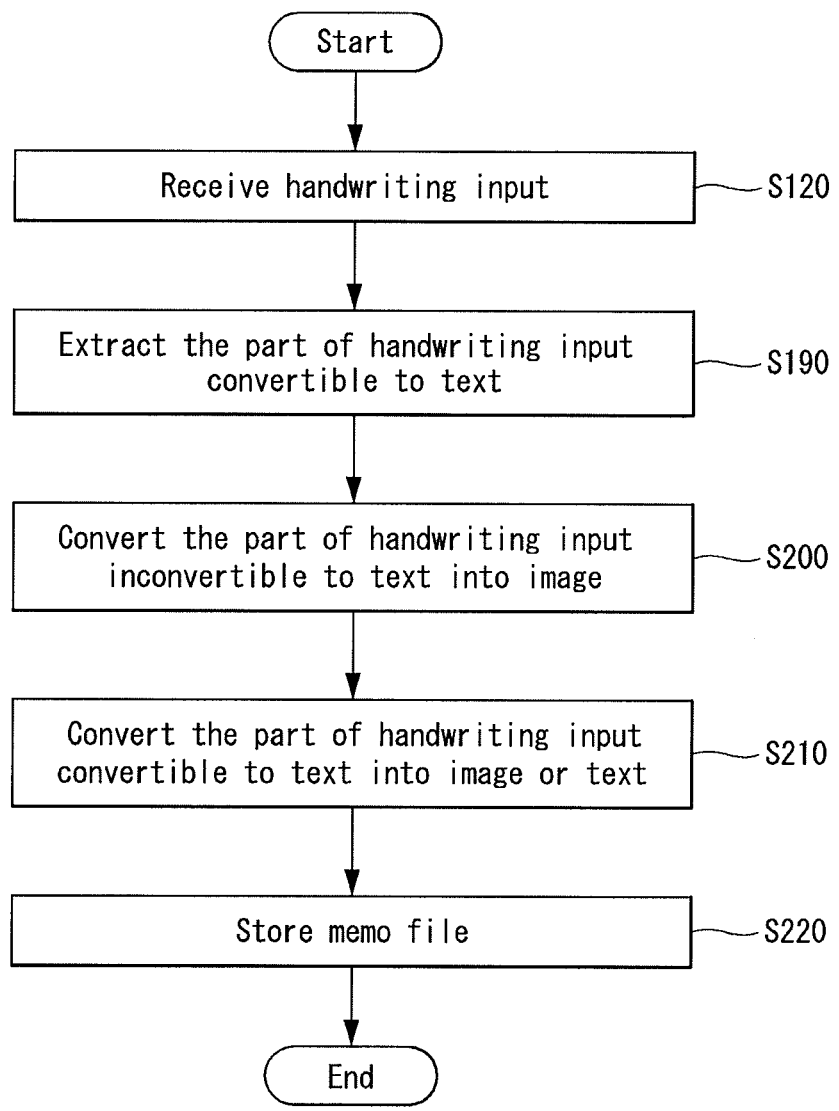
FIG. 17 is a flow diagram illustrating another example of a method for generating a memo file for a mobile terminal according to the present invention illustrated in FIG. 2.

FIG. 17 is a flow diagram illustrating another example of a method for generating a memo file for the mobile terminal 100 according to the present invention illustrated in FIG. 2. More specifically, FIG. 17 is a flow diagram illustrating a method for generating a memo file by using all of handwriting input received through a touch screen 151 and an execution screen of a particular application displayed on the touch screen 151. In what follows, the method for generating a memo file will be described with reference to related drawings.

While a handwriting input mode is activated, handwriting input is received through a touch screen 151, S120. Then the controller 180 of the mobile terminal 100 extracts part of the handwriting input which can be converted into text S190.

Next, the controller 180 converts part of the handwriting input inconvertible to text into an image S200 whereas the part convertible to text is converted into text or image S210. A procedure of converting the part of handwriting input convertible to text into text or image can be performed in the same manner as or in a way similar to the method described with reference to FIGS. 2 to 11; therefore, a detailed description thereof will be omitted.

If conversion of the handwriting input into text and/or image is completed, the controller 180 generates a memo file including the converted text and/or image and stores the generated file S220.

In what follows, examples of the method for generating a memo file will be described with reference to FIGS. 18 to 22. FIGS. 18 to 22 illustrate procedures of generating a memo file according to a method for generating a memo file illustrated in FIG. 17.

Figure 18:
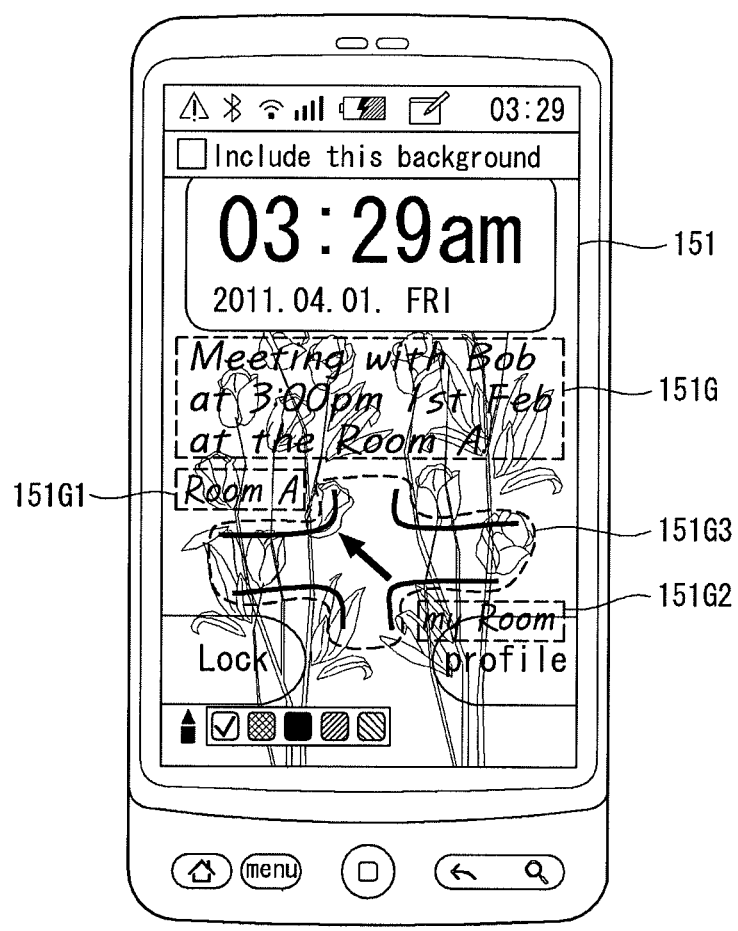
FIGS. 18 to 22 illustrate procedures of generating a memo file according to a method for generating a memo file illustrated in FIG. 17.

With reference to FIG. 18, the user inputs handwriting to the screen 151 of a touch screen 151. Then the controller 180 extracts from the handwriting those parts convertible to text 151G, 151G1, 151G2 and regards the remaining part of the handwriting as the part 151G3 impossible for conversion to text.

Figure 19:
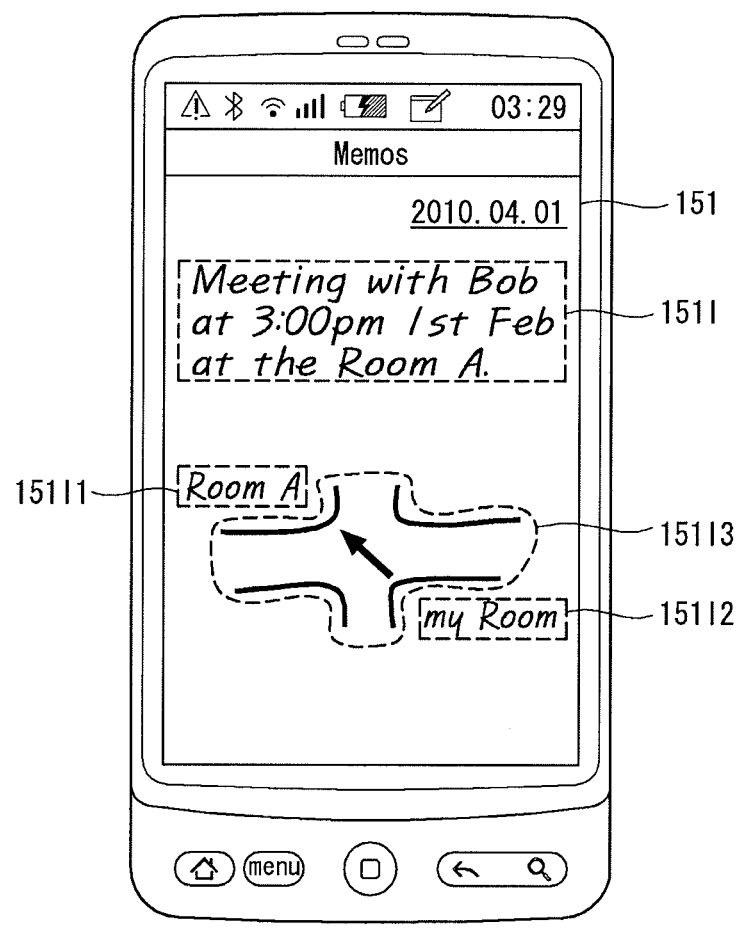

FIG. 19 illustrates a case where the controller 180 converts the whole of handwriting input 151G, 151G1, 151G2, 151G3 into images 151I, 151I1, 151I2, 151I3 and generates a memo file based on the images converted.

Figure 20:
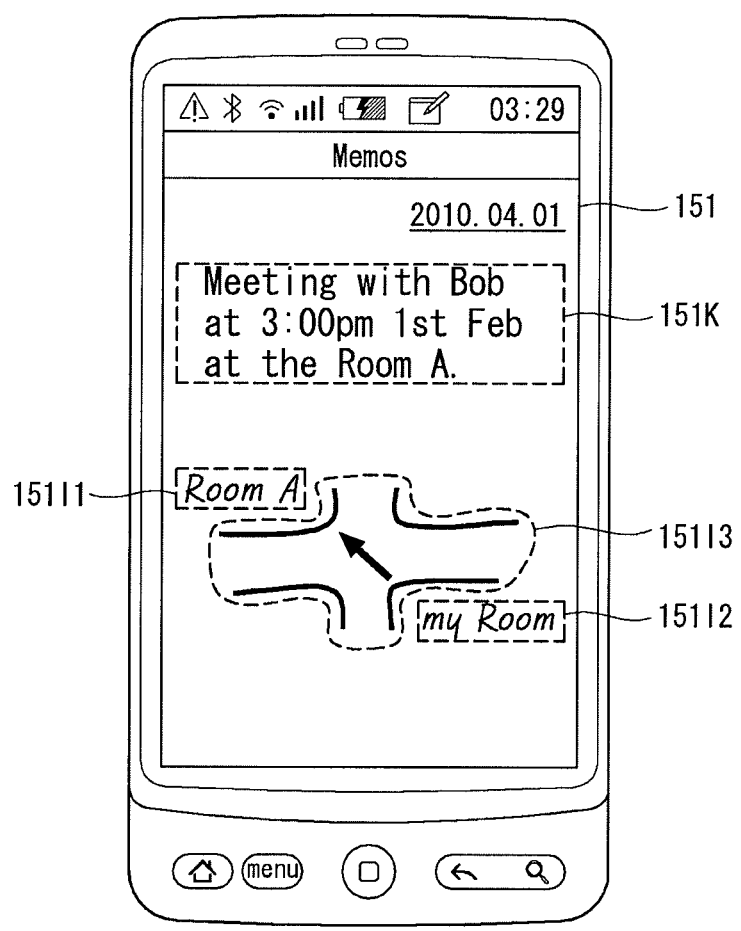

FIG. 20 illustrates a case where the controller 180 converts only part 151G1 of those text convertible handwriting inputs 151G, 151G1, 151G2 into text; converts the remaining part 151G2, 151G3 into images; converts part 151G3 of handwriting input inconvertible to text into an image; and generates a memo file based on the above conversion.

Here, the part converted to text from among those text-convertible handwriting inputs 151G, 151G1, 151G2 may have been selected by the user. In other words, the controller 180 can convert at least part 151G1 of those convertible to text 151G, 151G1, 151G2 from among the handwriting input received 151G, 151G1, 151G2, 151G3 into text according to the user's selection.

Figure 21:
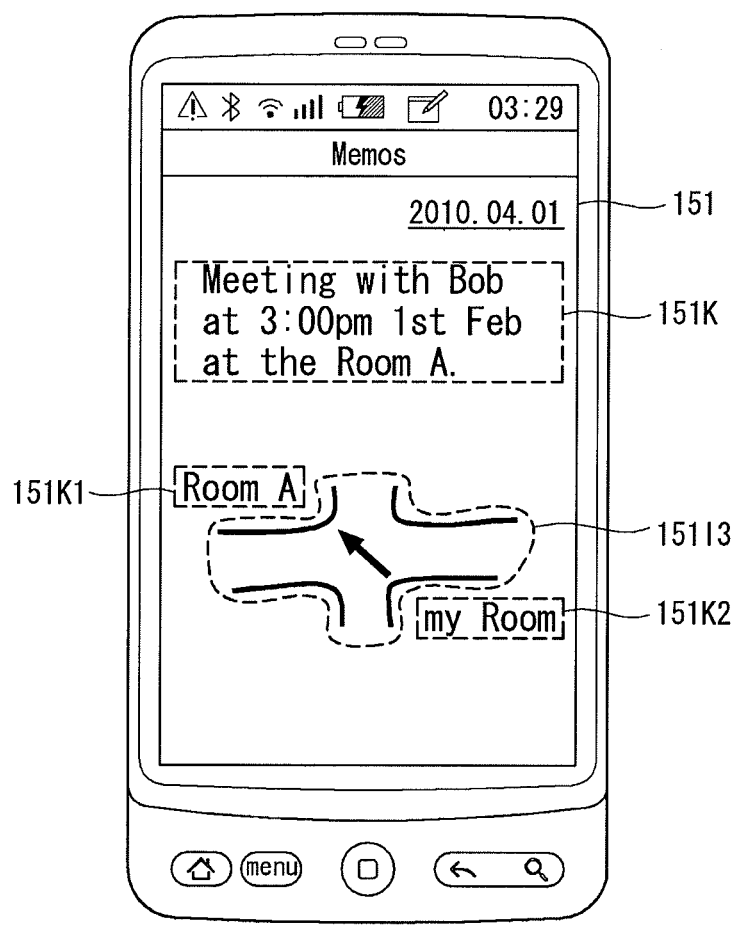

FIG. 21 illustrates a case where the controller 180 converts text-convertible handwriting inputs 151G, 151G1, 151G2 into a plurality of text group 151K, 151K1, 151K2; converts the part 151G3 inconvertible to text into an image 151I3; and generates a memo file based on the above conversion. Also, it can be seen from the FIG. 21 that the controller 180 has generated a memo file by taking account of the position of handwriting.

Figure 22:
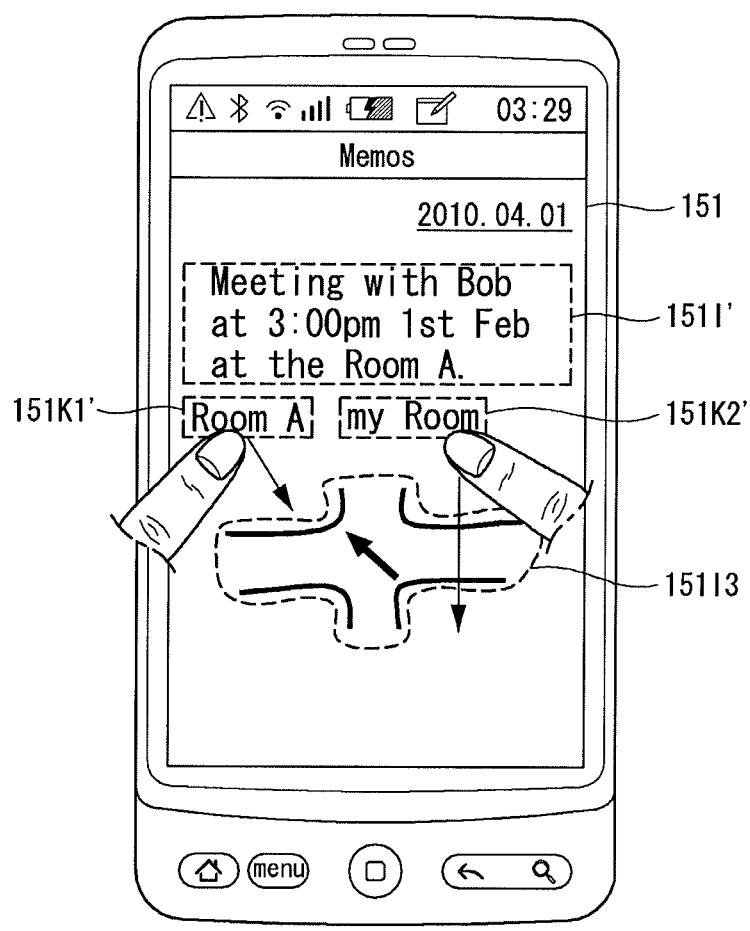

Comparing FIGS. 21 and 22, the controller 180 may not consider the position of handwriting input at the time of converting handwriting input into text and/or image. At this time, as shown in FIG. 22, the user can selectively move a text group converted by taking the position of handwriting input into consideration.

In a method for generating a memo file and a method for using handwriting input in the mobile terminal 100 according to the present invention described above, considered was only the handwriting input obtained through a touch screen 100 by the user. However, the description below with reference to FIGS. 23 to 38 indicates that the mobile terminal 100 can perform a function similar to the method for generating a memo and the method for using handwriting input by using both handwriting input and the execution screen of a particular application displayed on a current touch screen 151.

Figure 23:
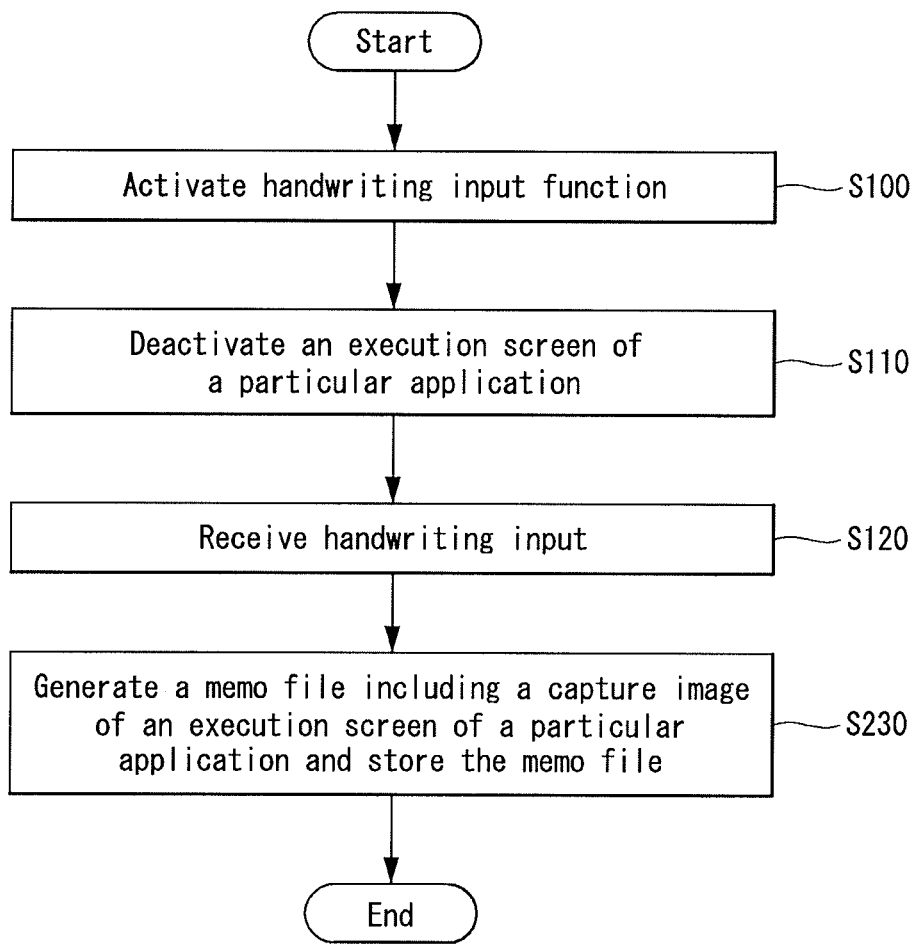
FIG. 23 is a flow diagram illustrating another example of a method for generating a memo file for a mobile terminal according to the present invention illustrated in FIG. 2.

FIG. 23 is a flow diagram illustrating another example of a method for generating a memo file for the mobile terminal 100 according to the present invention illustrated in FIG. 2. More specifically, FIG. 23 is a flow diagram illustrating a method for generating a memo file by using both handwriting input received through a touch screen 151 and an execution screen of a particular application displayed on a touch screen 151. In what follows, a method for generating a memo file will be described with reference to related drawings.

In response to the user's operation, the controller 180 of the mobile terminal 100 activates a handwriting function which uses a touch screen 151 of the mobile terminal 100, S100. If a handwriting function is activated, the controller 180 deactivates the execution screen of a particular application displayed on a touch screen 151, S110.

After the execution screen of the particular application is deactivated, the touch screen 151 receives handwriting input generated based on the user's touch input S120. Then, the controller 180 generates a memo file including a capture image of the execution screen of the particular application and stores the memo files S230. At this time, the handwriting input received can be included in the memo file after being converted into text or image according to the description provided with reference to FIGS. 2 to 22. In what follows, examples of a method for generating a memo file illustrated in FIG. 23 will be described with reference to FIGS. 24 to 29.

FIGS. 24 to 27 illustrate one example of generating a memo file according to a method for generating a memo file illustrated in FIG. 23.

Figure 24:
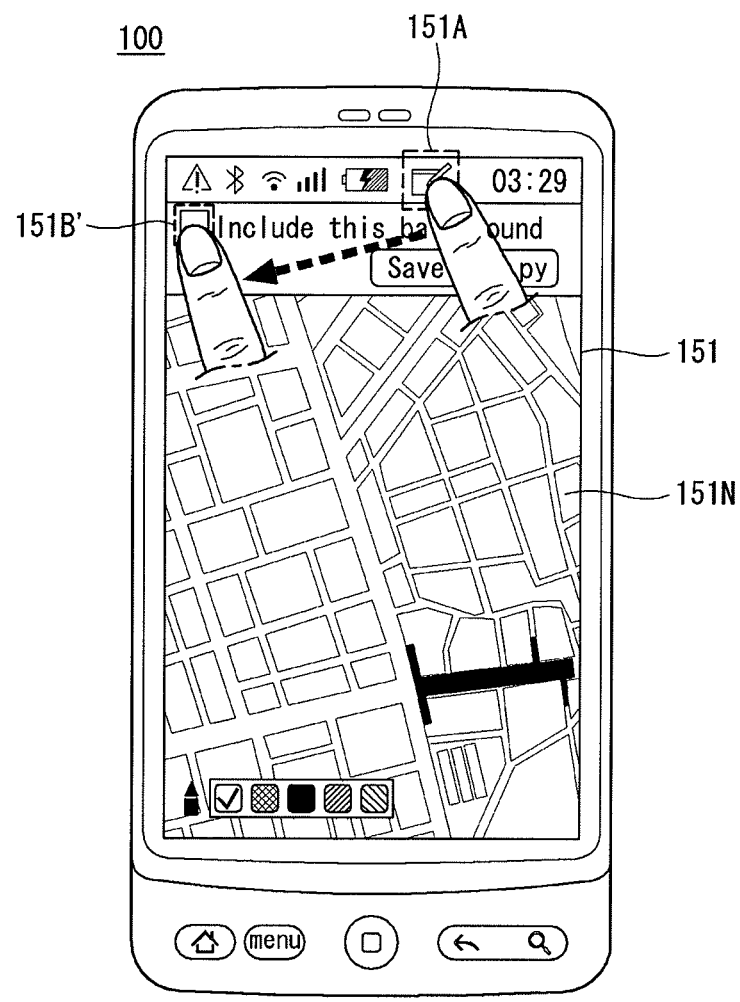
FIGS. 24 to 27 illustrate one example of a procedure of generating a memo file according to a method for generating a memo file illustrated in FIG. 23.

As shown in FIG. 24, if the user touches a soft key 151A corresponding to handwriting input, the controller 180 activates a handwriting input function and deactivates the execution screen 151N of a particular application. Next, the controller 180 can display a message window on the screen 151, inquiring whether to generate a memo file by using the execution screen 151N of the particular application.

Figure 25:
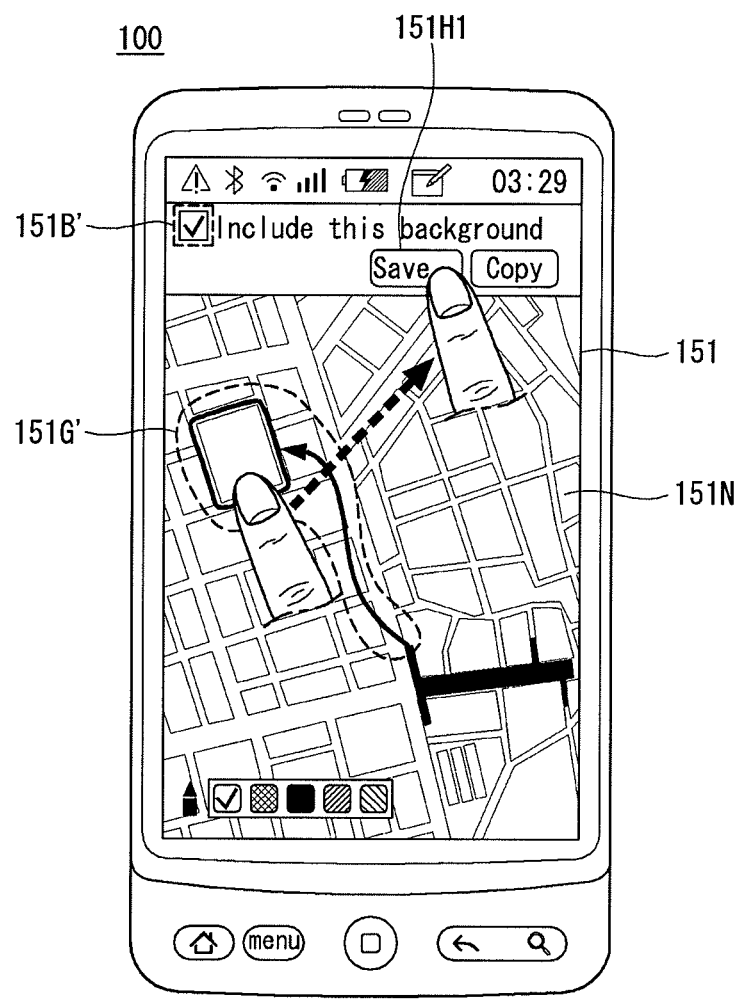

If the user selects a selection button 151B' of the message window, the selection button 151B' is displayed as shown in FIG. 25. Then, the controller 180 can use both handwriting input received through the touch screen 151 and the execution screen 151N of the particular application for generating a memo file.

Figure 26:
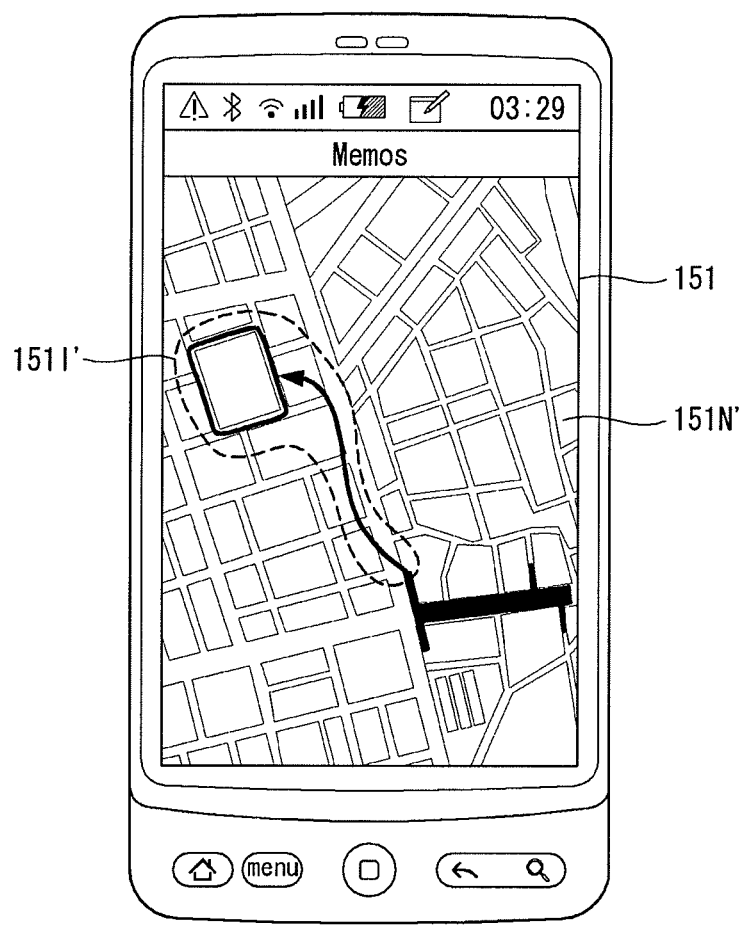

FIG. 25 illustrates that the user provides handwriting 151G' overlapping the execution screen of the particular application and touches a first soft key 151H1 to store the handwriting. Then, as shown in FIG. 26, the controller 180 generates a memo file including both a capture image 151N' of the execution screen of the particular application and the image 151I' converted from the handwriting; and stores the memo file.

Figure 27:
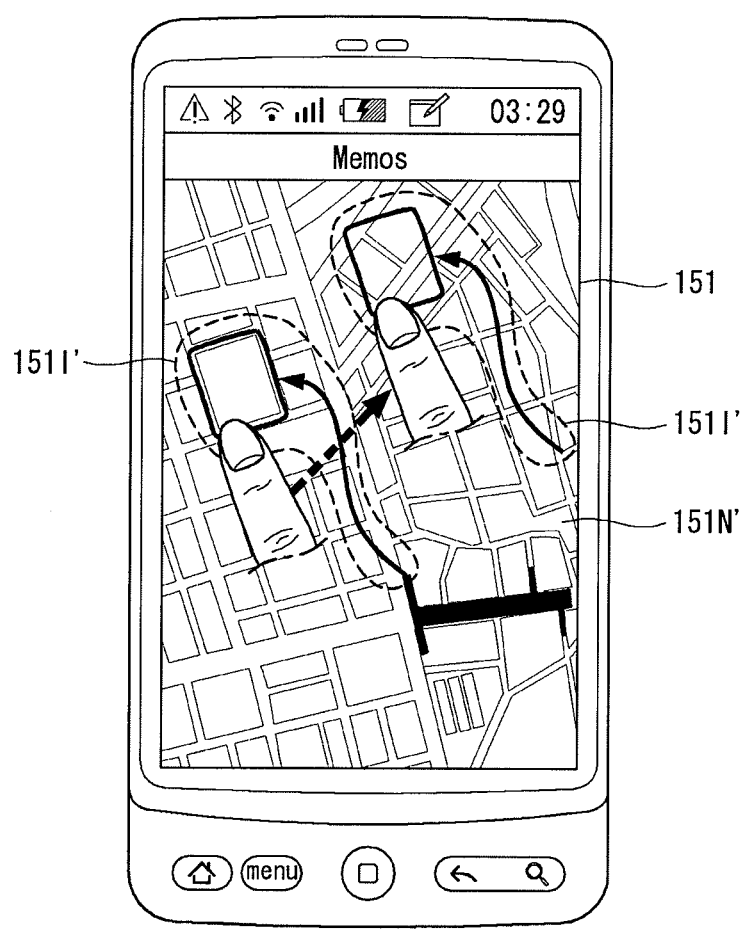

At this time, the capture image 151N' of the execution screen of the particular application and the image 151I' converted from handwriting input can be stored as a single combined image; as shown in FIG. 27, they can be included in the memo file while retaining the respective independence.

Referring to FIG. 27, it can be seen that if the capture image 151N' of the execution screen of the particular application and the image 151F converted from the handwriting input are independent of each other, the user can select the image 151I' converted from the handwriting input and move the selected image. Though not shown in the figure, the user can perform the function of copy, paste, and so on by selecting the image 151I' converted from the handwriting input. This applies the same to the capture image 151N' of the execution screen of the particular application.

Figure 28:
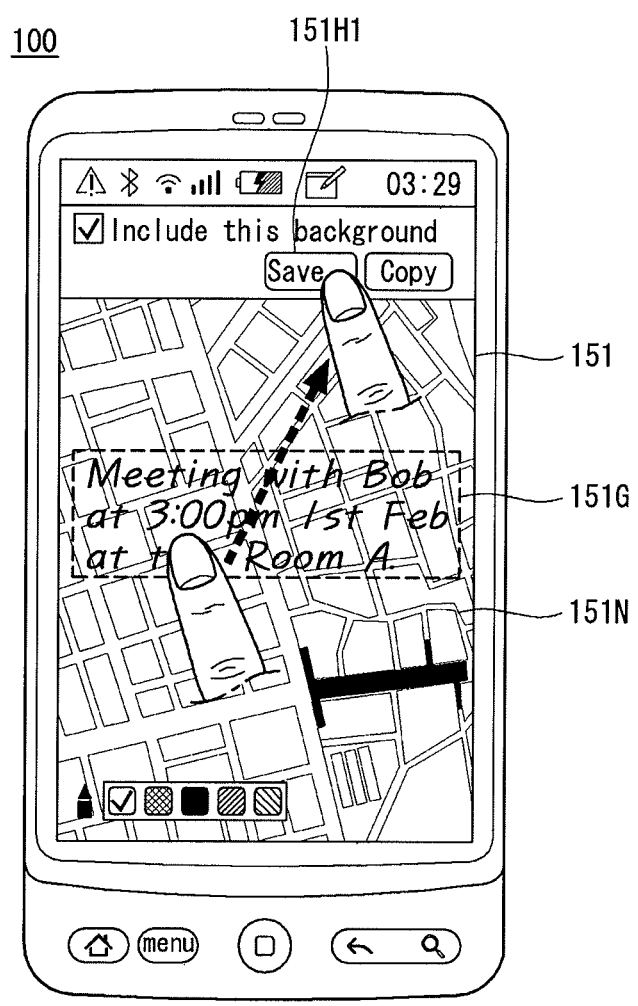
FIGS. 28 to 29 illustrate another example of a procedure of generating a memo file according to a method for generating a memo file illustrated in FIG. 23.
Figure 29:
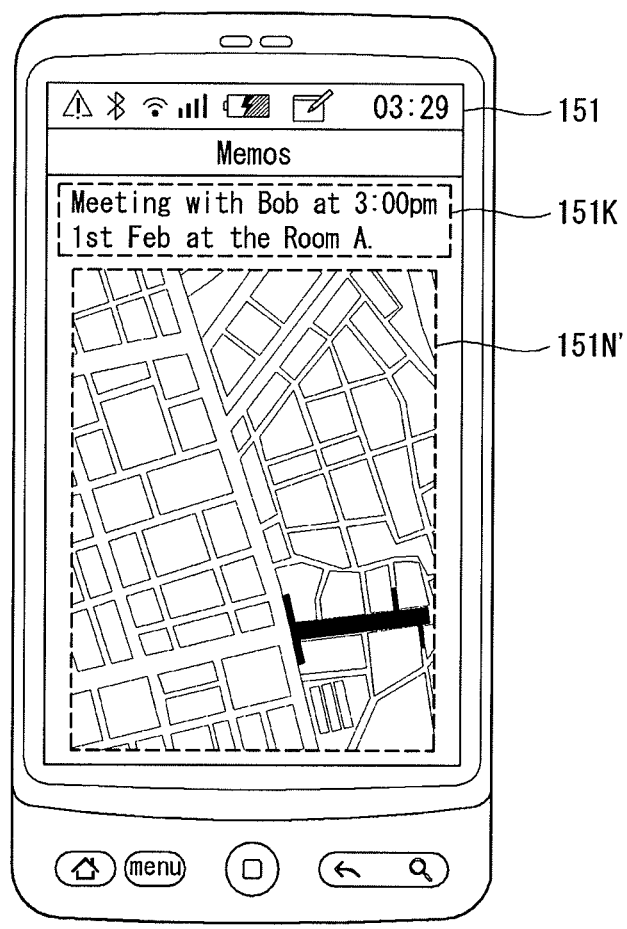

FIGS. 28 to 29 illustrate another example of a procedure of generating a memo file according to a method for generating a memo file illustrated in FIG. 23.

FIG. 28 illustrates a case where the user inputs handwriting 151G overlapping the execution screen of the particular application and a first soft key 151H1 to store the handwriting input. Then, as shown in FIG. 29, the controller 180 generates a memo file including both the capture image 151N' of the execution screen of the particular application and the text 151K converted from handwriting input; and stores the memo file. At this time, as described with reference to FIGS. 26 to 27, the handwriting input 151G can also be incorporated into a memo file in the form of being combined with a capture image 151N' of the execution screen of the particular application or as an image independent of the capture image.

Figure 30:
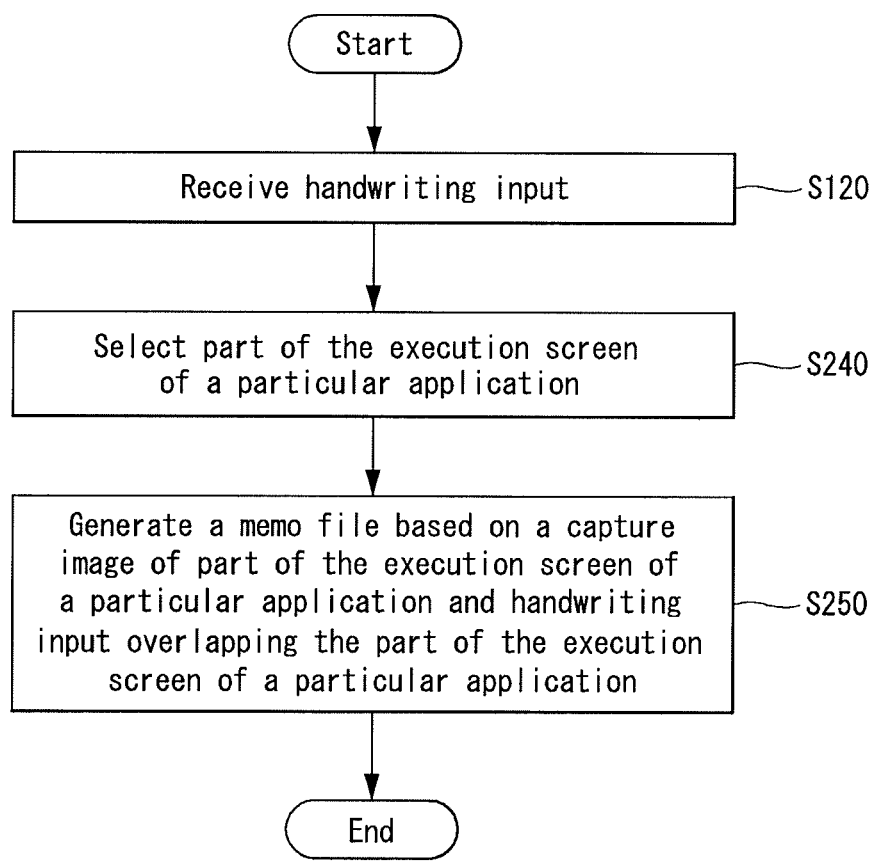
FIG. 30 is a flow diagram illustrating one example of a method for generating a memo file illustrated in FIG. 23.

FIG. 30 is a flow diagram illustrating one example of a method for generating a memo file shown in FIG. 23. In what follows, the method for generating a memo file will be described with reference to related drawings.

While a handwriting input function is activated, handwriting input is received through a touch screen 151, S120. After handwriting is received, the controller 180 of the mobile terminal 100 selects part of an execution screen of a particular application displayed on the touch screen 151 in response to the user's operation S240.

If part of an execution screen of the particular application is selected, the controller 180 generates a memo file based on a capture image of part of an execution screen of the particular application and handwriting input overlapping the part of an execution screen of the particular application S250. At this time, the handwriting input overlapping the part of an execution screen of the particular application can be included into the memo file after being converted into text and/or image based on whether the handwriting input can be converted to text.

Figure 31:
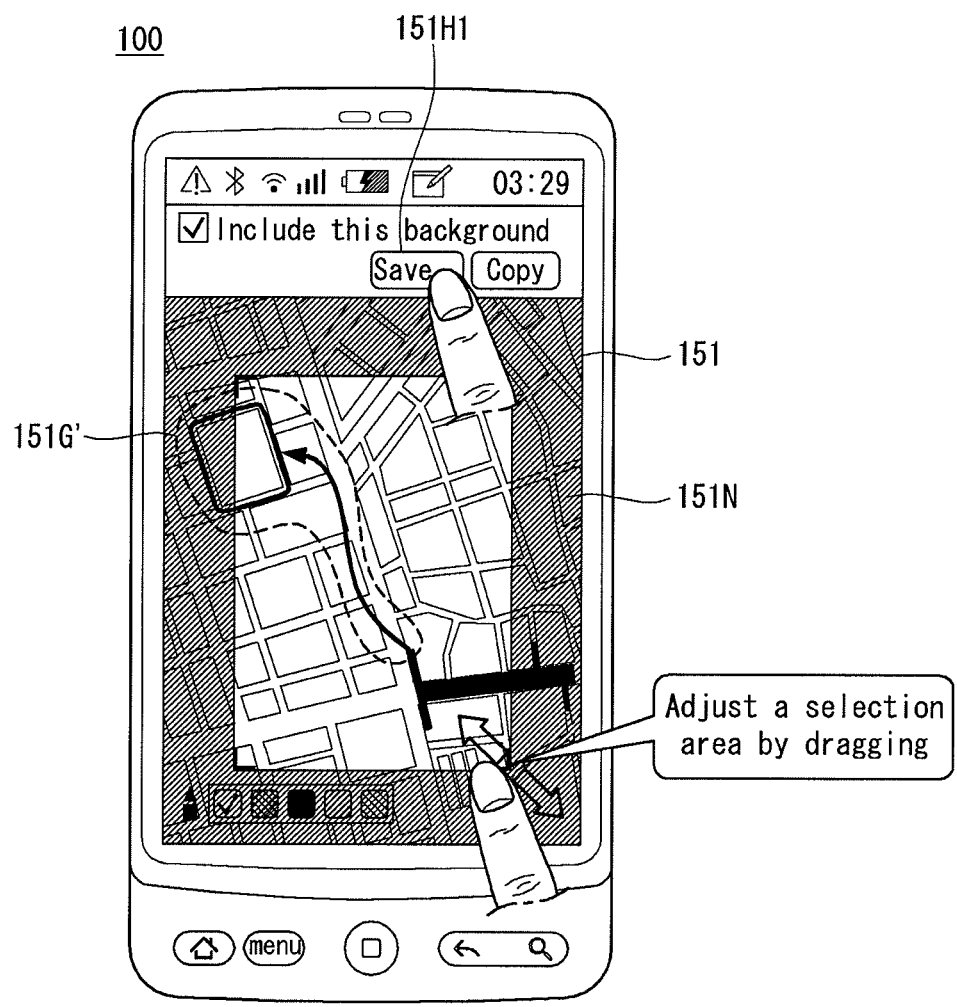
FIGS. 31 to 32 illustrate a procedure of generating a memo file including a capture image of part of the execution screen of a particular application according to a method for generating a memo file illustrated in FIG. 30.
Figure 32:
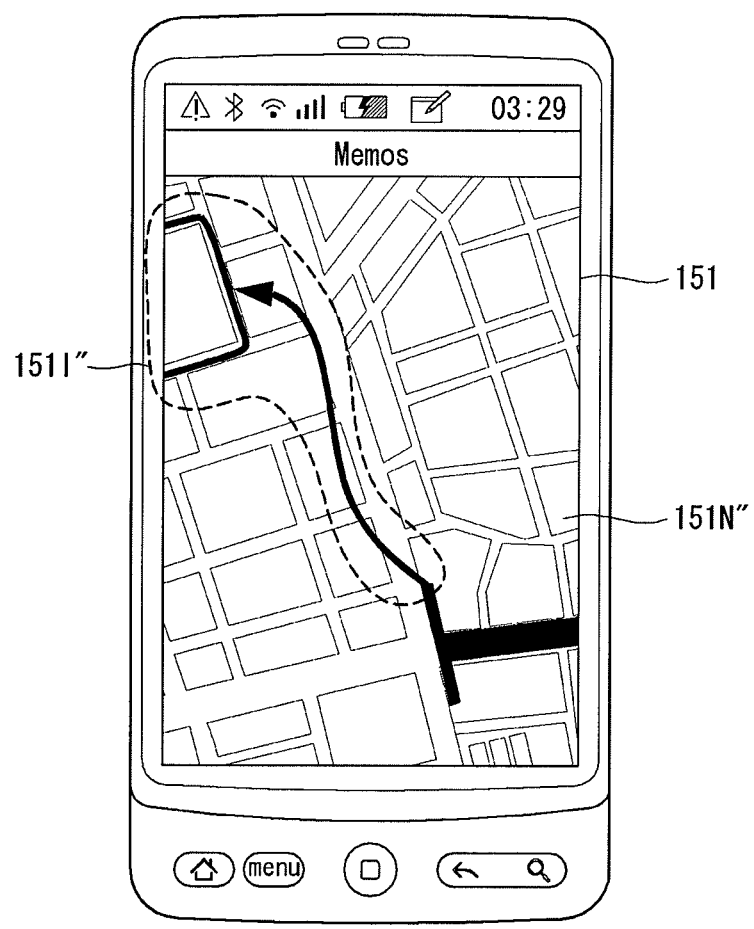

FIGS. 31 to 32 illustrate a procedure of generating a memo file including a capture image of part of the execution screen of a particular application according to a method for generating a memo file illustrated in FIG. 30.

FIG. 31 illustrates a case where the user inputs handwriting 151G' to an execution screen 151N of the particular application and selects part of the execution screen 151N of the particular application by using a drag motion and touches a first soft key 151H1 for generating a memo file.

Referring to FIG. 31, it can be seen that the part not selected from the execution screen of the particular application is processed to be opaque. Therefore, the user can easily recognize the selected part from the execution screen 151N of the particular application. Also, referring to FIG. 31, it can be seen that the user can change a selected area by dragging the corner part of the selected area.

As shown in FIG. 32, if the user touches a first soft key 151H1, the controller 180 generates a memo file including a capture image 151N" for the part selected from an execution screen of the particular area and an image 151I" converted from the handwriting; and stores the memo file. Also, comparing FIGS. 26 and 32, the memo file illustrated in FIG. 32 has such a difference from that of FIG. 26 that the part of handwriting input not overlapping the selected area from an execution screen of the particular application has not been reflected for generation of a memo file.

Figure 33:
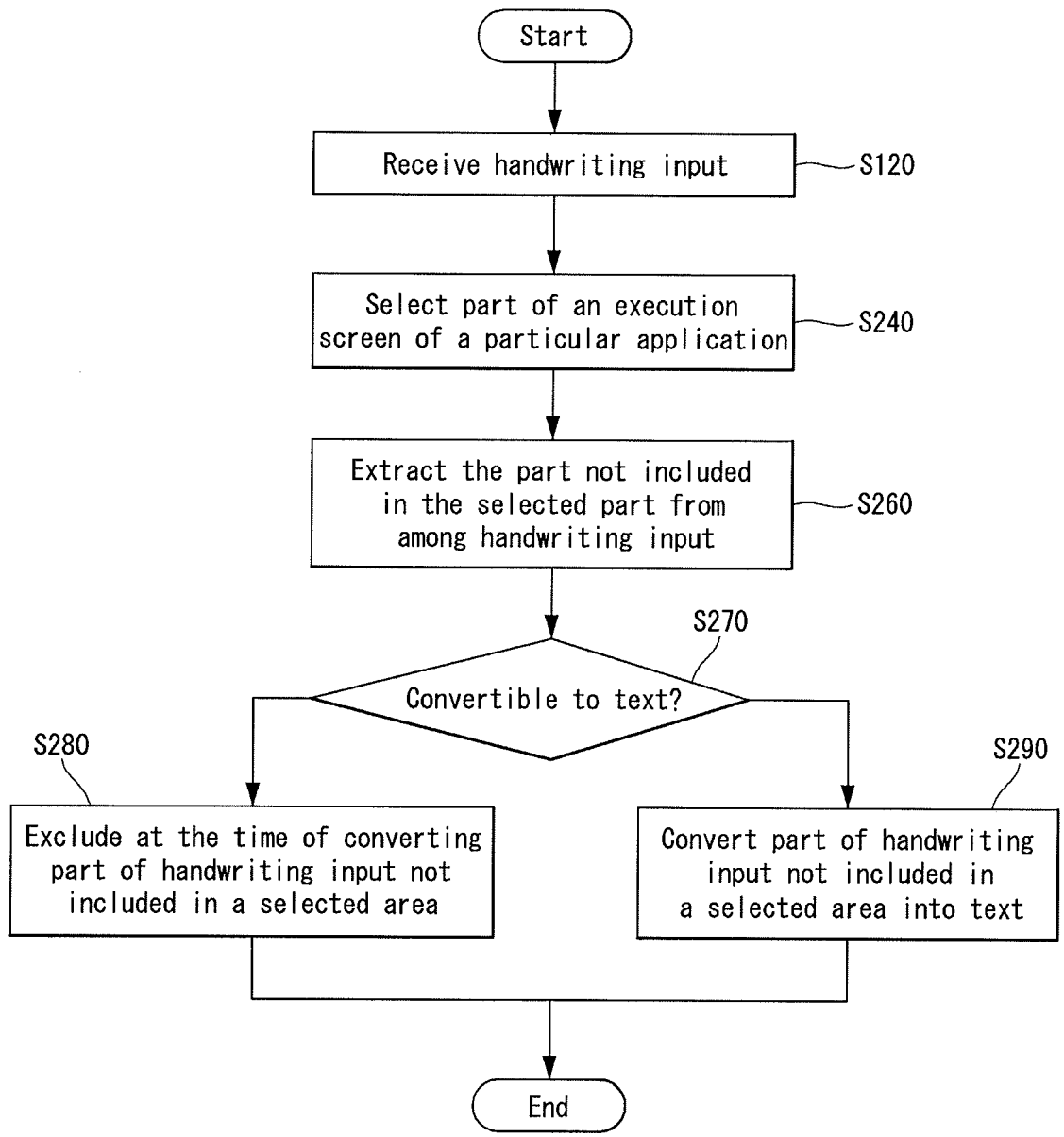
FIG. 33 is a flow diagram illustrating one example of a method for generating a memo file illustrated in FIG. 23.

FIG. 33 is a flow diagram illustrating one example of a method for generating a memo file illustrated in FIG. 23. In what follows, the method for generating a memo file will be described with reference to related drawings.

Handwriting input is received through a touch screen 151 while a handwriting input function is activated. If handwriting input is received, the controller 180 of the mobile terminal 100 selects part of an execution of a particular application displayed on the touch screen 151 in response to the user's operation S240.

If part of the execution screen of the particular application is selected, the controller 180 extracts the area not included in the part of an execution screen of a particular application S260 and determines whether the handwriting input not included in the selected part of an execution screen of the particular application can be converted into text S270.

If handwriting input not included in the part of an execution screen of a particular application is inconvertible to text, the controller 180 performs image conversion for the handwriting input excluding the handwriting input not included in the part of an execution screen of the particular application S280.

Figure 34:
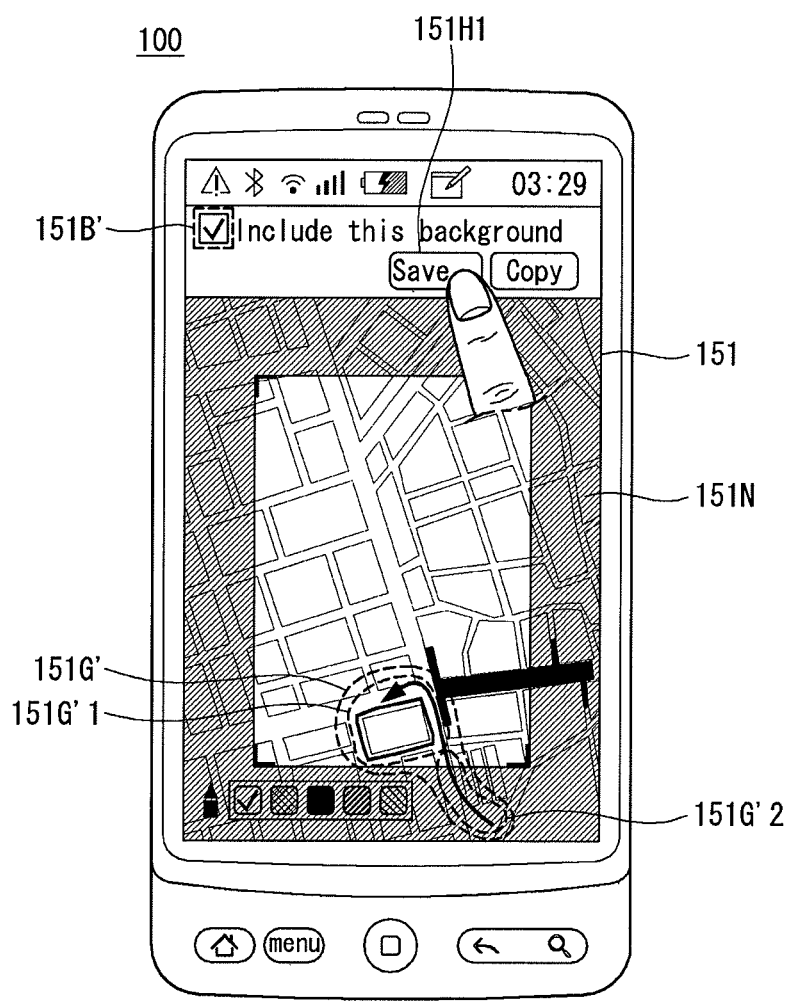
FIGS. 34 to 35 illustrate one example of carrying out a method for generating a memo file illustrated in FIG. 33.
Figure 35:
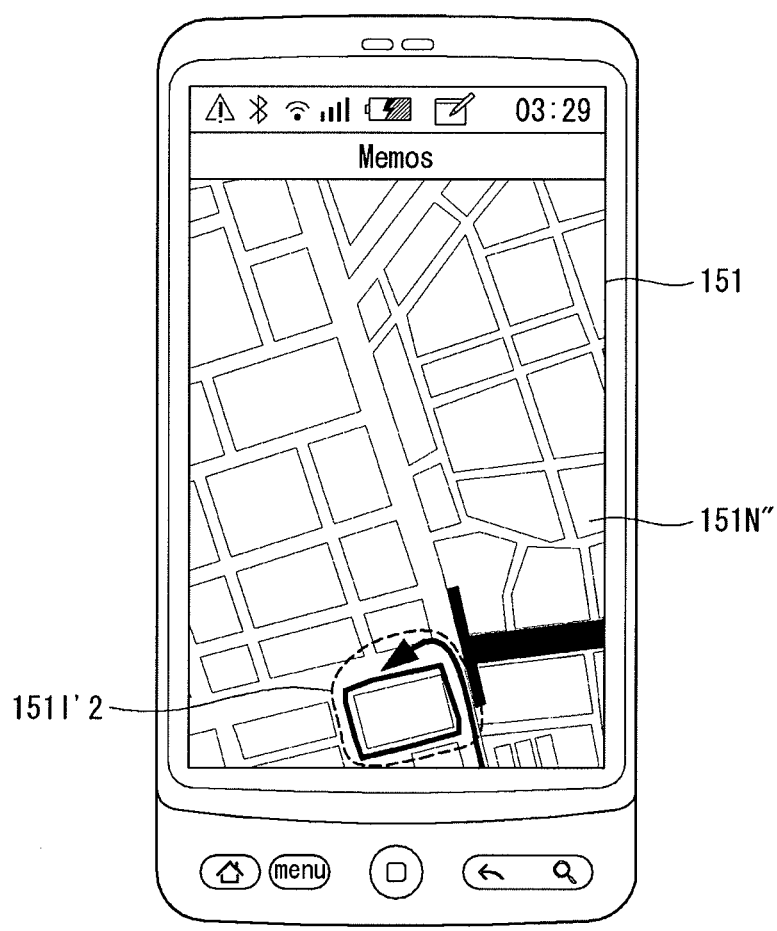

However, if handwriting input not included in the part of an execution screen of a particular application is convertible to text, the controller 180 converts handwriting input not included in the part of an execution screen of a particular application into text S290 and include the converted text in a memo file being generated. In what follows, examples of a method for generating a memo file illustrated in FIG. 33 will be described with reference to FIGS. 34 to 37. FIGS. 34 to 35 illustrate one example of carrying out a method for generating a memo file shown in FIG. 33.

FIG. 34 illustrates a case where the user selects part of an execution screen 151N of a particular application while handwriting input 151G' is displayed on a screen of the mobile terminal 100 being overlapped with the execution screen of the particular application. Then, handwriting input 151G' is classified into the portion 151G'1 overlapping the selected part of the execution screen of the particular application and that 151G'2 not overlapping the selected part of the execution screen of the particular application. While the handwriting input 151G' is classified accordingly, the user touches a first soft key 151H1 for generating a memo file.

Then, referring to FIG. 35, it can be known that the controller 180 of the mobile terminal 100 generates a memo file including a capture image 151N" for the selected part of the execution screen of the particular application and an image 151I'2 converted from handwriting input 151G'1 being overlapped with the selected part of the execution screen of the particular application; and stores the generated memo file. The above indicates that since the portion 151G'2 of handwriting input not overlapping the selected part of the execution screen of the particular application is inconvertible to text, the corresponding portion is excluded at the time of conversion to image.

Figure 36:
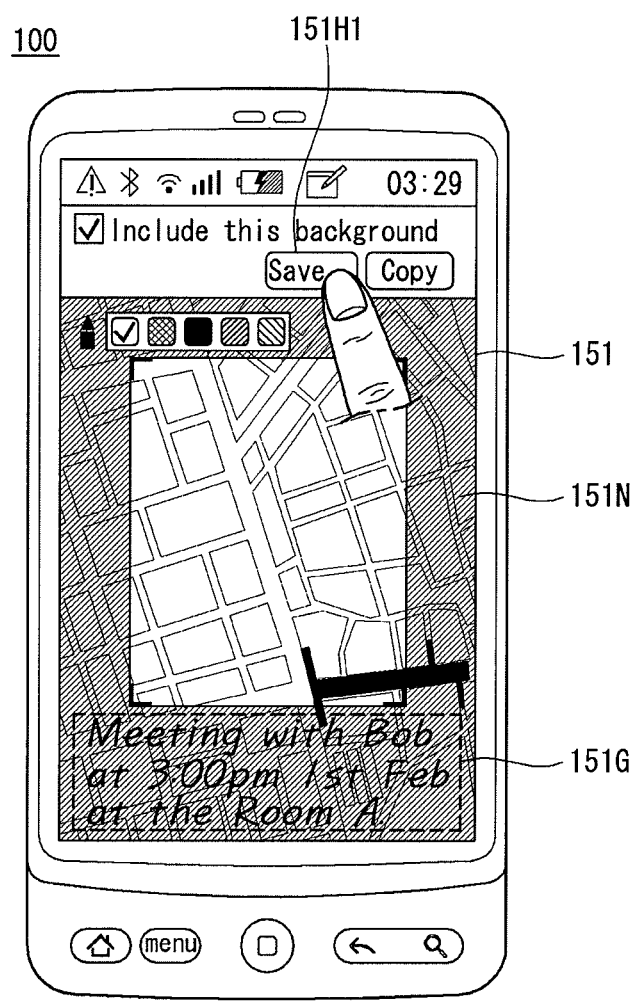
FIGS. 36 to 37 illustrate another example of carrying out a method for generating a memo file illustrated in FIG. 33.
Figure 37:
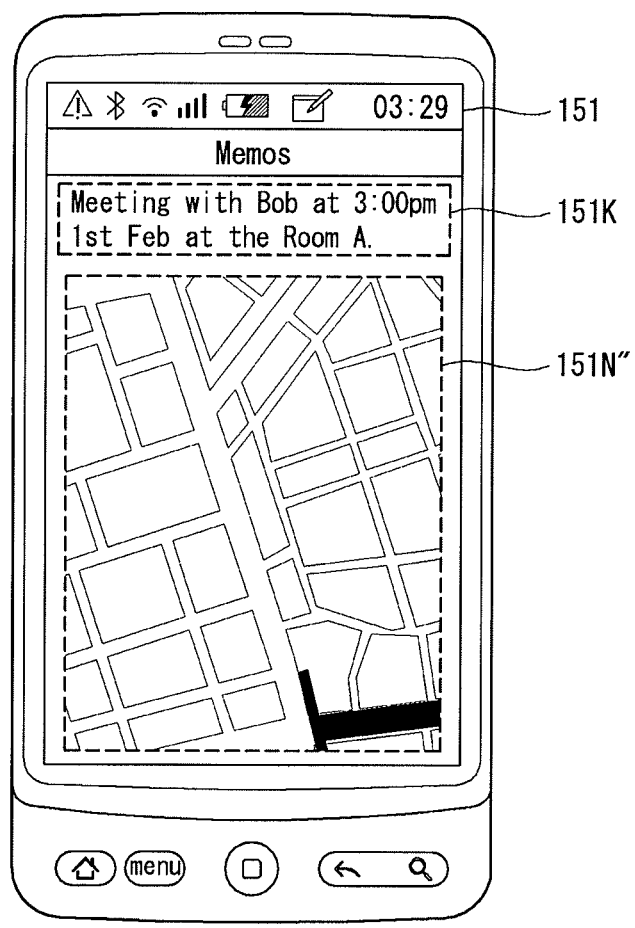

FIGS. 36 to 37 illustrate another example of carrying out a method for generating a memo file illustrated in FIG. 33.

FIG. 36 illustrates a case where the user selects part of an execution screen 151N of a particular application while handwriting input 151G' is displayed on a screen of the mobile terminal 100 being overlapped with the execution screen of the particular application. Referring to FIG. 36, the handwriting input 151G does not overlap the selected part of the execution screen of the particular application. Under the above state, the user touches a first soft key 151H1 to generate a memo file.

Referring to FIG. 37, then, it can be known that the controller 180 of the mobile terminal 100 generates a memo file including a capture image 151N" for the selected part of the execution screen of the particular application and text 151K converted from handwriting 151G1; and stores the generated memo file. The above indicates that since the handwriting input 151G can be converted to text, the handwriting input 151G has been converted into text and included in a memo file even though the handwriting input 151G does not overlap the selected part of the execution screen of the particular application. Different from the illustration of FIGS. 36 to 37, at the time of generating a memo file, the controller 180 may not consider handwriting input convertible to text, not overlapping the selected part of the execution screen of the particular application.

Figure 38:
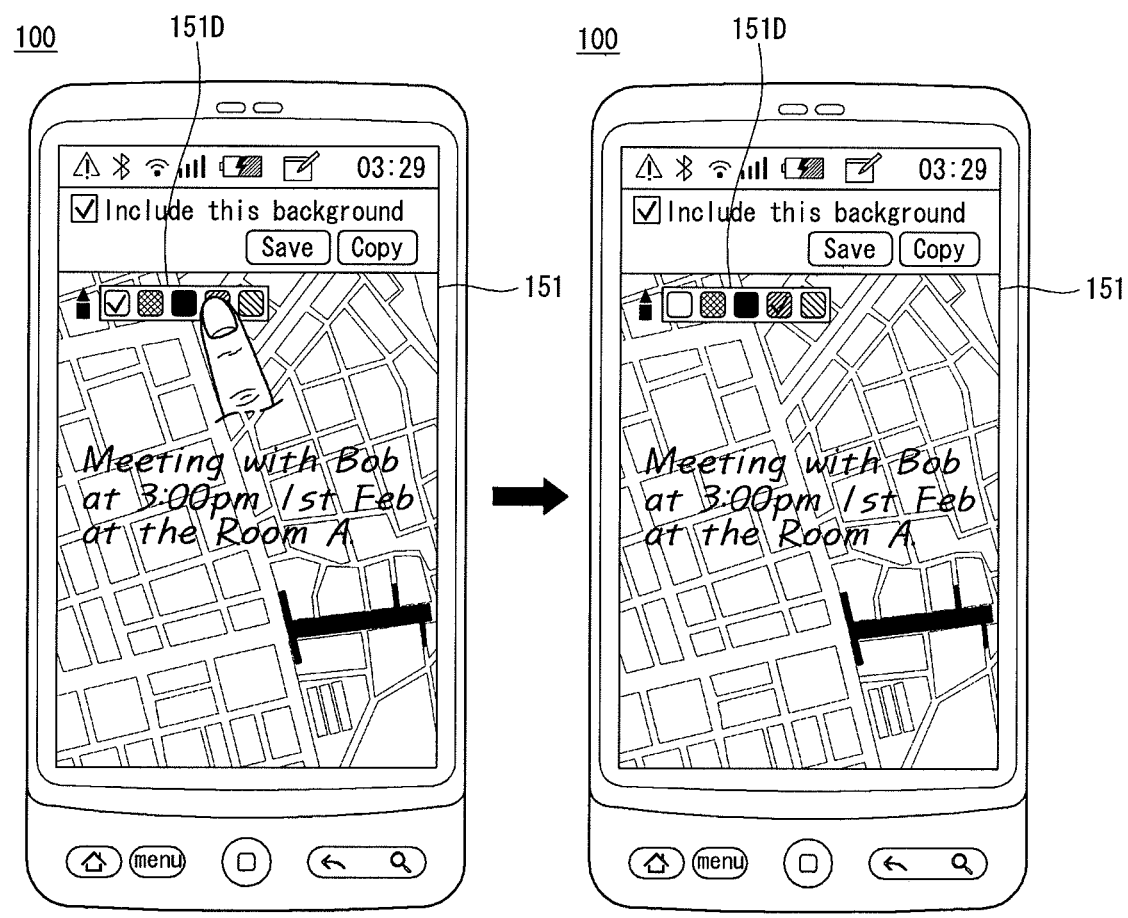
FIG. 38 illustrates a procedure of setting a style for handwriting input in response to a user's operation.

FIG. 38 illustrates a procedure of setting a style for handwriting input in response to a user's operation. More specifically, FIG. 38 illustrates a procedure of changing the color of a line displayed on the screen 151 at the time of the user's handwriting input.

With reference to the setting area 151D illustrated in FIG. 38, it can be seen that the mobile terminal 100 illustrated in FIG. 38 can display handwriting according to the color selected by the user among four colors. Also, if the user selects a particular color displayed in the setting area 151*d*, the color of a line displaying handwriting can be changed accordingly.

Though not shown in the figure, the mobile terminal 100 according to the present invention can provide a setting area for selecting thickness, texture, transparency, and the like of the line generated through handwriting input. Furthermore, the mobile terminal 100 can provide a setting area for selecting font, size, color, and thickness of text when handwriting input is converted to text.

Figure 39:
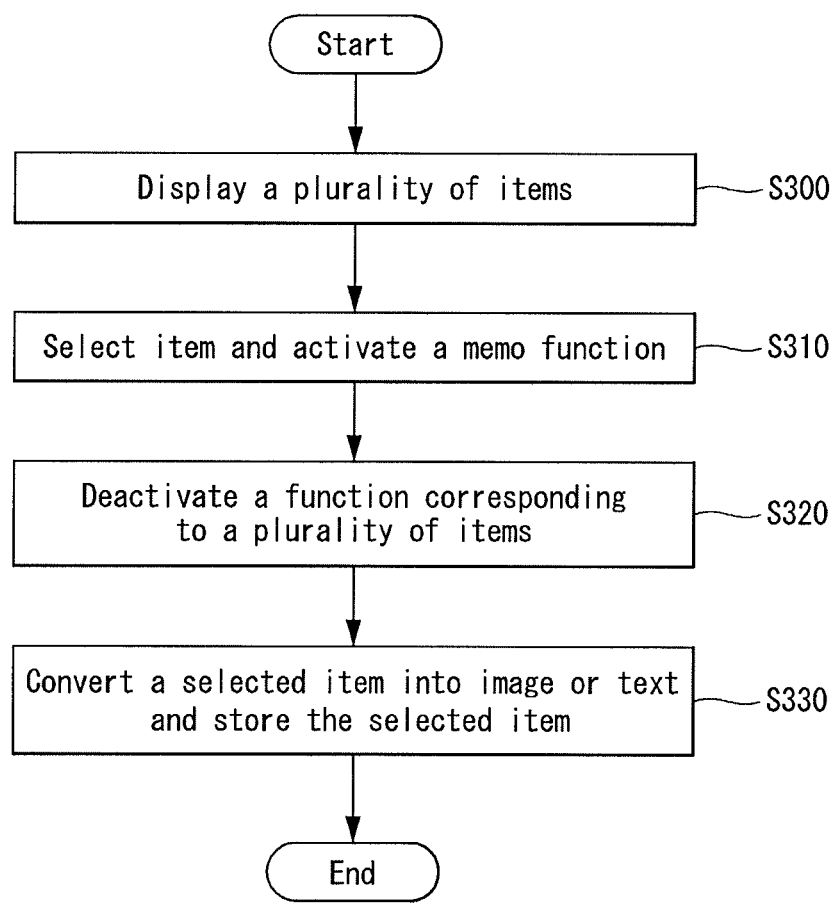
FIG. 39 is a flow diagram illustrating a method for generating a memo file according to another embodiment of the present invention.

FIG. 39 is a flow diagram illustrating a method for generating a memo file according to another embodiment of the present invention. More specifically, FIG. 39 is a flow diagram illustrating a method for selecting items displayed on the screen 151 of the mobile terminal 100 and generating a memo file by using the selected items. In what follows, the method for generating a memo file will be described with reference to related drawings.

The controller 180 of the mobile terminal 100 displays a plurality of items on the screen 151, S300. While the plurality of items are displayed on the screen 151, if the user selects a particular item and activates a memo function S310, the controller 180 deactivates the function corresponding to each of the plurality of items S320.

For example, if a particular item displayed on the screen 151 is an item linked to a particular web site and a memo function is activated, the controller 180 does not perform the operation linking to the predetermined web site even if the user selects the particular item. This is because the link function of the particular item with a memo function activated has been deactivated.

If the plurality of items correspond to the items included in an execution screen of a particular application, the controller 180 can update the execution screen (namely, a plurality of items) of the particular application according to the execution procedure of the particular application while keeping the execution screen of the particular application (in other words, a plurality of items) in a deactivated state.

Meanwhile, activation of selection of a particular item and a memo function can be performed at the same time; or the memo function can be activated after the particular item is selected. Also, the particular item can be selected after the memo function is activated.

After selection of a particular item and activation of a memo function are performed, the controller 180 converts the selected item into image or text S330 and generates a memo file including the converted image or text; and stores the generated memo file. As described above, whether to convert the selected item into a memo file including text or image can be determined based on the convertibility of the selected item into text. According to a method for generating a memo file illustrated in FIG. 39, the memo file generated can also be stored into at least one of storage space associated with a memo application and a clipboard.

FIGS. 40 to 43 illustrate a procedure of carrying out one example of a method for generating a memo file illustrated in FIG. 39.

Figure 40:
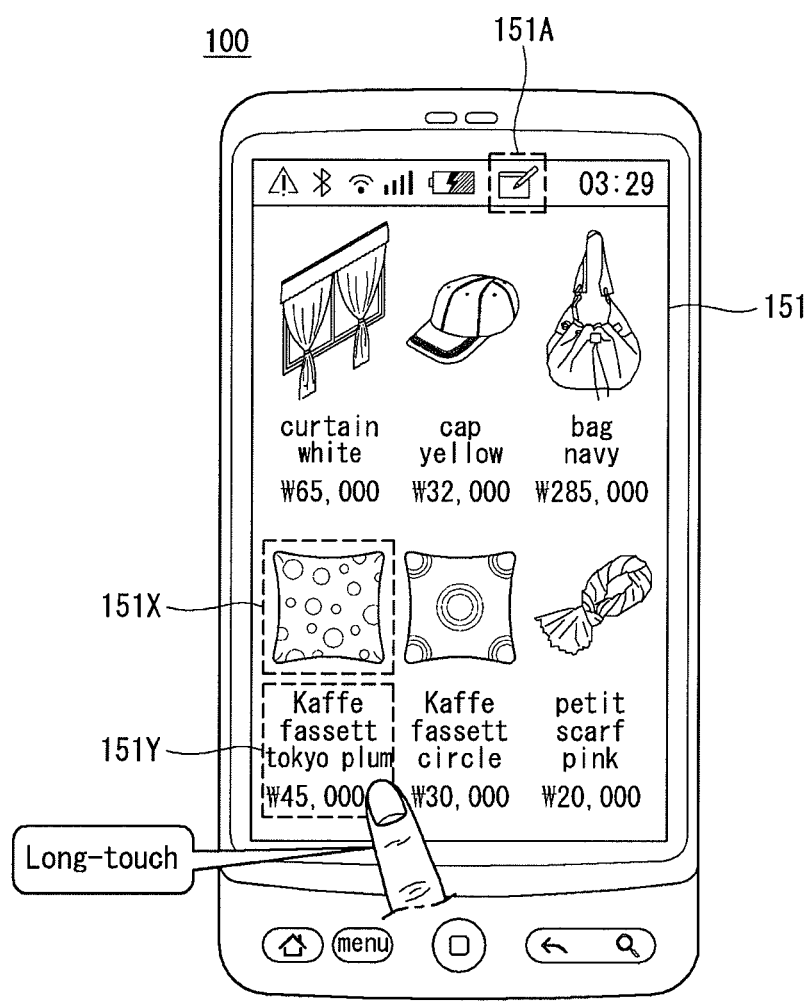
FIGS. 40 to 43 illustrate a procedure of carrying out one example of a method for generating a memo file illustrated in FIG. 39.
Figure 41:
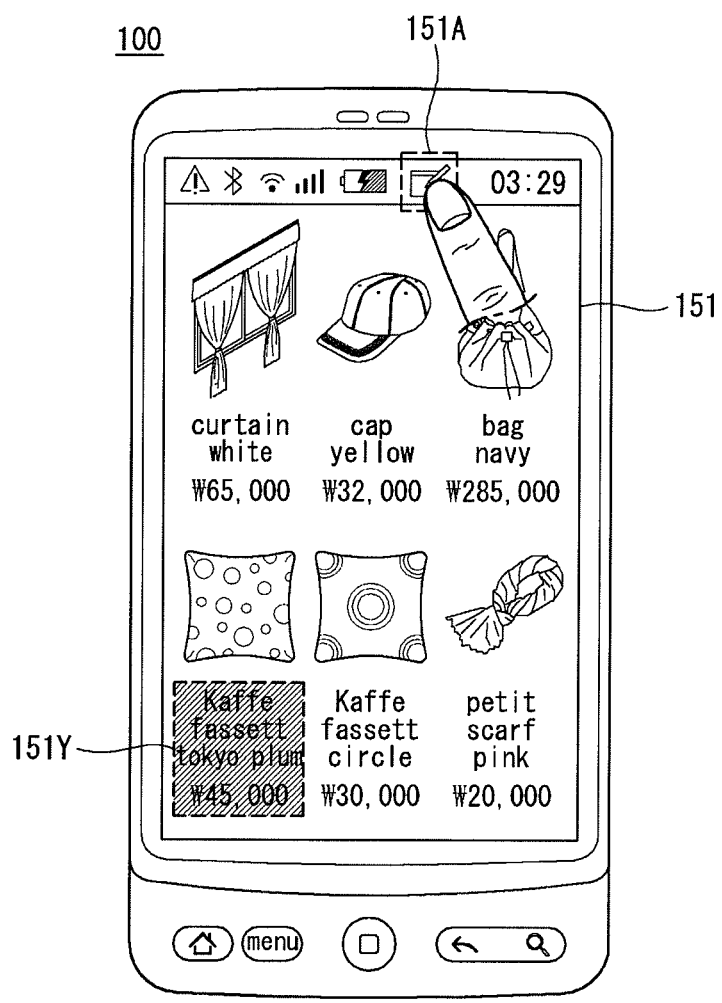

FIG. 40 illustrates a case where the user make a long-touch on a description part 151Y of a particular product corresponding to an image 151X of the particular project from among a plurality of items displayed on a screen, the controller 180 of the mobile terminal 100 selects the description part 151Y of the particular product. With reference to FIG. 41, it can be known that the description part 151Y of the particular product has been selected and the selected part is displayed with a dark color.

As shown in FIG. 41, if the user touches a soft key 151A for activating a memo function while the description part 151Y of the particular product has been selected, the controller 180 activates a memo function and deactivates a function corresponding to each of the plurality of items.

Figure 42:
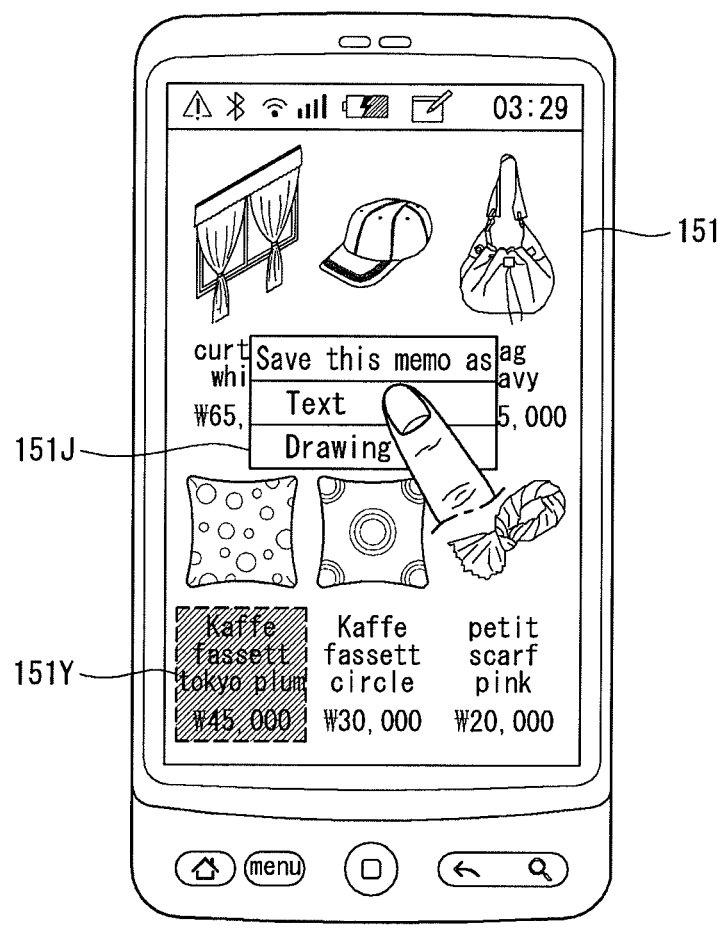

As shown in FIG. 42, the controller 180 displays on the screen 151 a pop-up window 151J for determining whether to store the description part of the selected particular product into text or image. This is because the description part 151Y of the particular product has an attribute which enables the description part to be converted into text.

Figure 43:
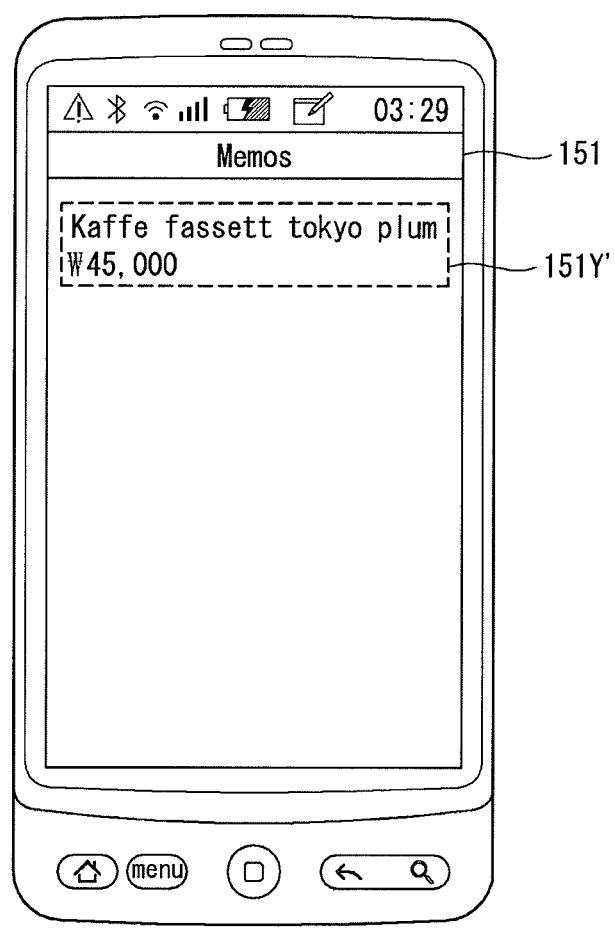

FIG. 42 illustrates a case where the user selects the description part 151Y of the particular product to be converted into text. As shown in FIG. 43, then the controller 180 converts the description part 151Y of the particular product into text and generates a memo file including the converted text 151Y'.

It should be note that depending on embodiments of the present invention, different from the procedures of FIGS. 40 to 41, the user can also obtain the same result as the performance result of procedures illustrated in FIGS. 40 to 41 by activating a memo function by making a touch on a soft key 151A intended for activating a memo function and selecting the description part 151Y of the product.

Meanwhile, since the method for generation a memo file illustrated in FIG. 39 generates a memo file other than handwriting, a screen in which items are displayed doesn't have to be implemented in the form of a touch screen. If a screen for displaying items is not implemented as a touch screen, the user can select an item displayed on the screen by using a mouse, a remote controller, and the like; and operate a soft key displayed on the screen. This applies the same to a method for generating a memo file illustrated in FIG. 47.

Figure 44:
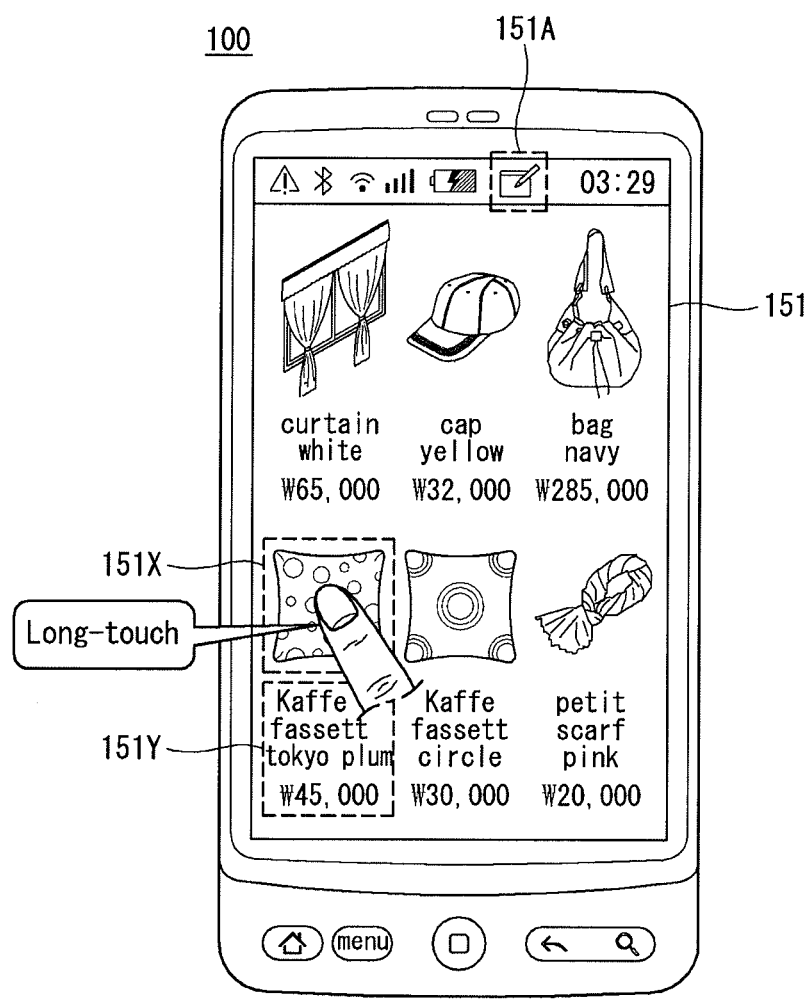
FIGS. 44 to 46 illustrate a procedure of carrying out another example of a method for generating a memo file illustrated in FIG. 39.
Figure 45:
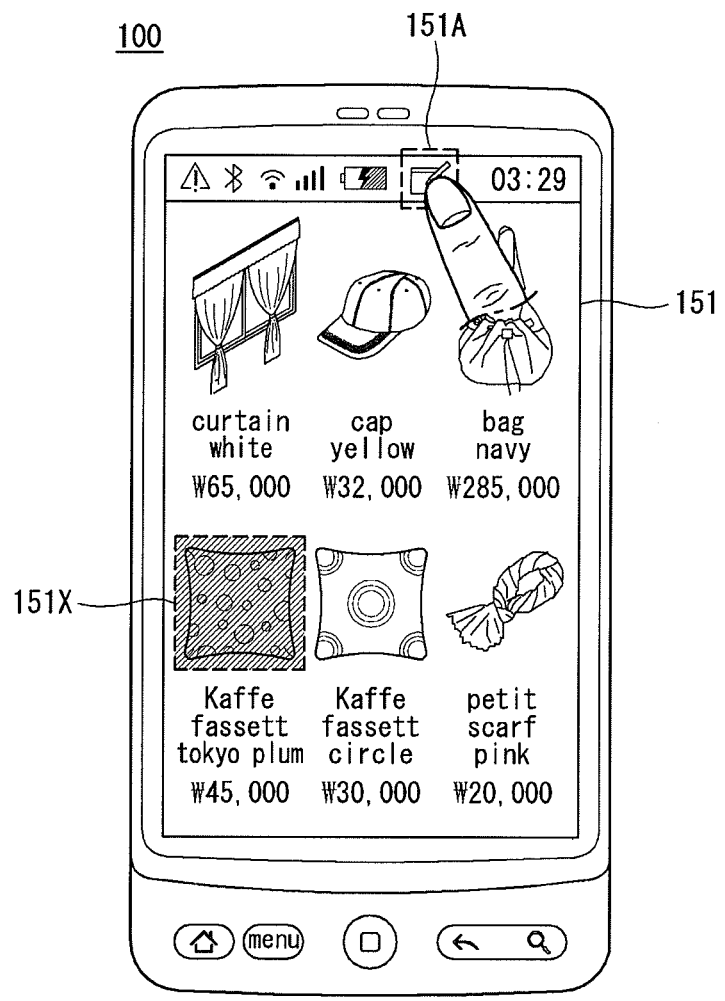
Figure 46:
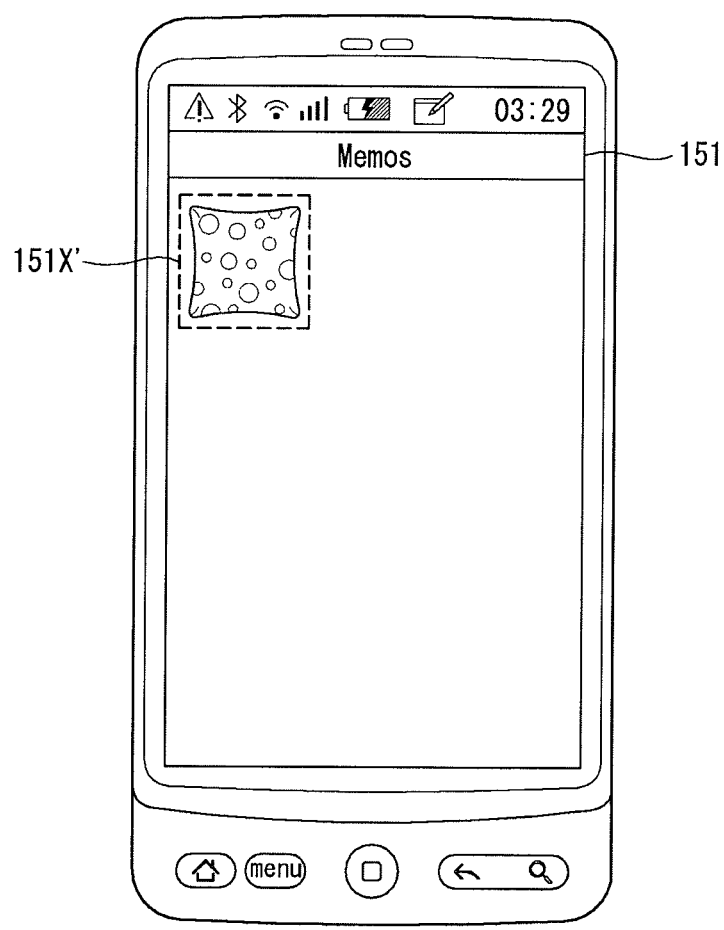

FIGS. 44 to 46 illustrate a procedure of carrying out another example of a method for generating a memo file illustrated in FIG. 39.

FIG. 44 illustrates a case where if the user makes a long-touch on an image 151X of a particular product from among a plurality of items displayed on a screen, the controller 180 of the mobile terminal 100 selects the image 151X of the particular product. With reference to FIG. 45, it can be known that the image 151X of the particular product has been selected and the selected part is displayed with a dark color.

As shown in FIG. 45, the user touches a soft key 151A for activating a memo function while the image 151A of the particular product is selected. Then, as shown in FIG. 46, the controller 180 converts the image 151X of the particular product into an image and generates a memo file including the converted image 151X'.

Figure 47:
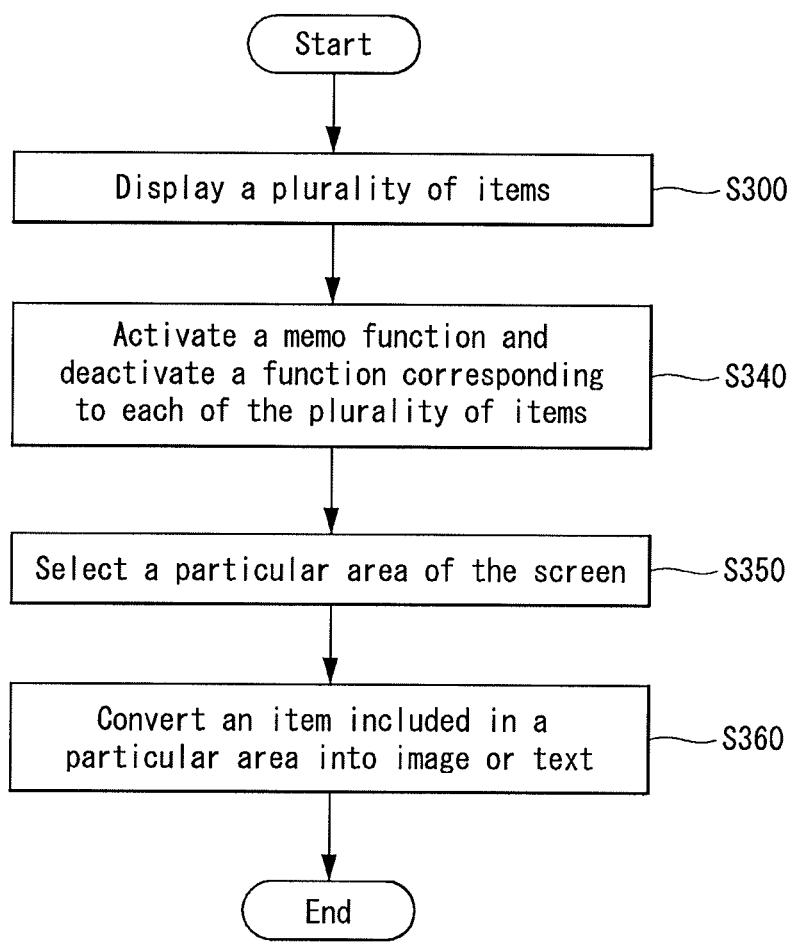
FIG. 47 is a flow diagram illustrating a method for generating a memo file according to yet another embodiment of the present invention.

FIG. 47 is a flow diagram illustrating a method for generating a memo file according to yet another embodiment of the present invention. In what follows, the method for generating a memo file will be described with reference to related drawings.

The controller 180 of the mobile terminal 100 displays a plurality of items on the screen 151, S300. While the plurality of items is displayed in the screen 151, the controller 180 activates a memo function in response to the user and deactivates a function corresponding to each of the plurality of items S340.

After a memo function is activated, the controller 180 selects a particular area of the screen 151 based on the drag motion of the user against the screen S350. Next, the controller 180 can convert an item included in the particular area into image or text S360 and generate a memo file including the converted image or text.

As described above, whether to convert an item into text and/or image can be determined based on convertibility of the selected item into text and a generated memo file can be stored at least one of storage space associated with a memo application or a clipboard.

Figure 48:
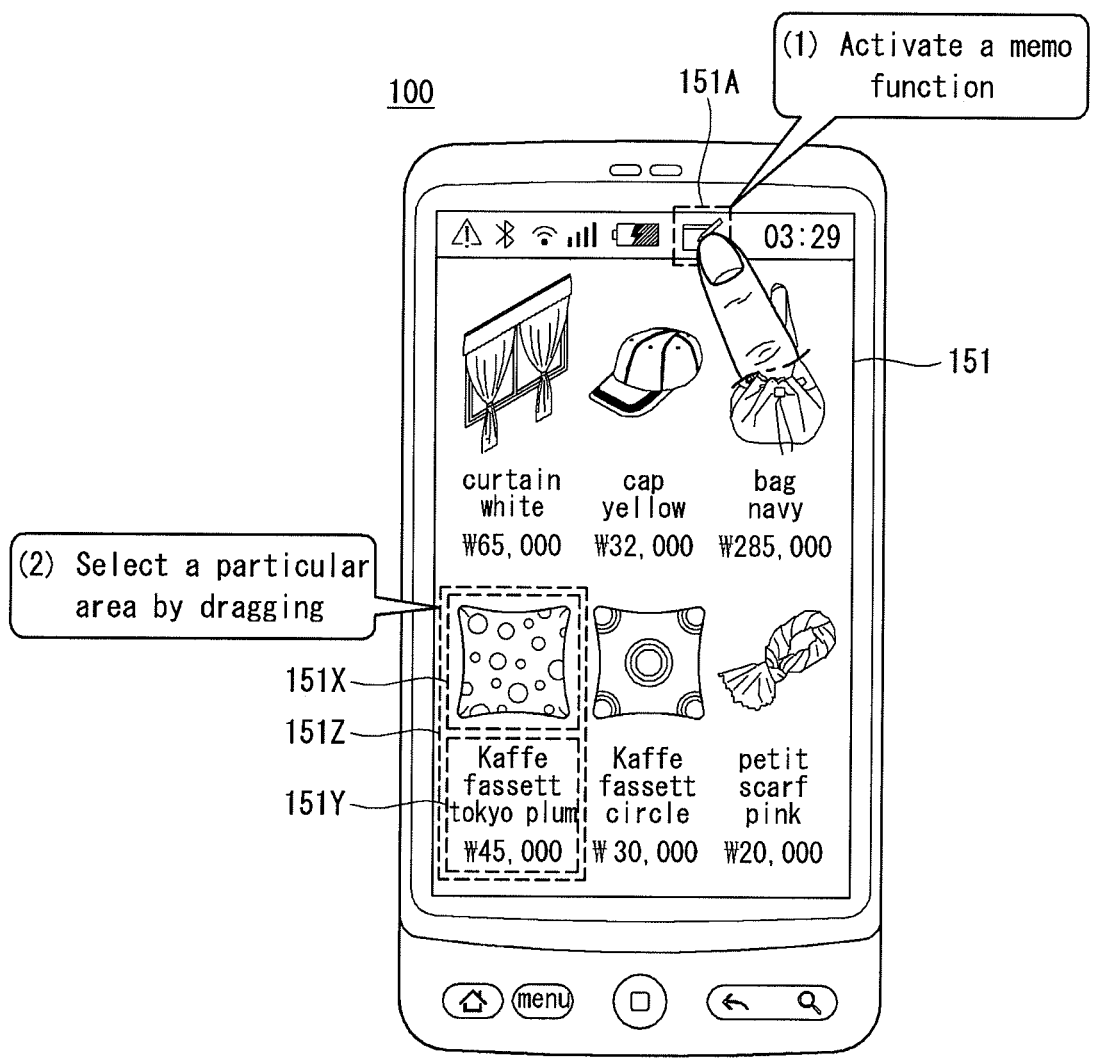
FIGS. 48 to 50 illustrate a procedure of carrying out a method for generating a memo file illustrated in FIG. 47.
Figure 49:
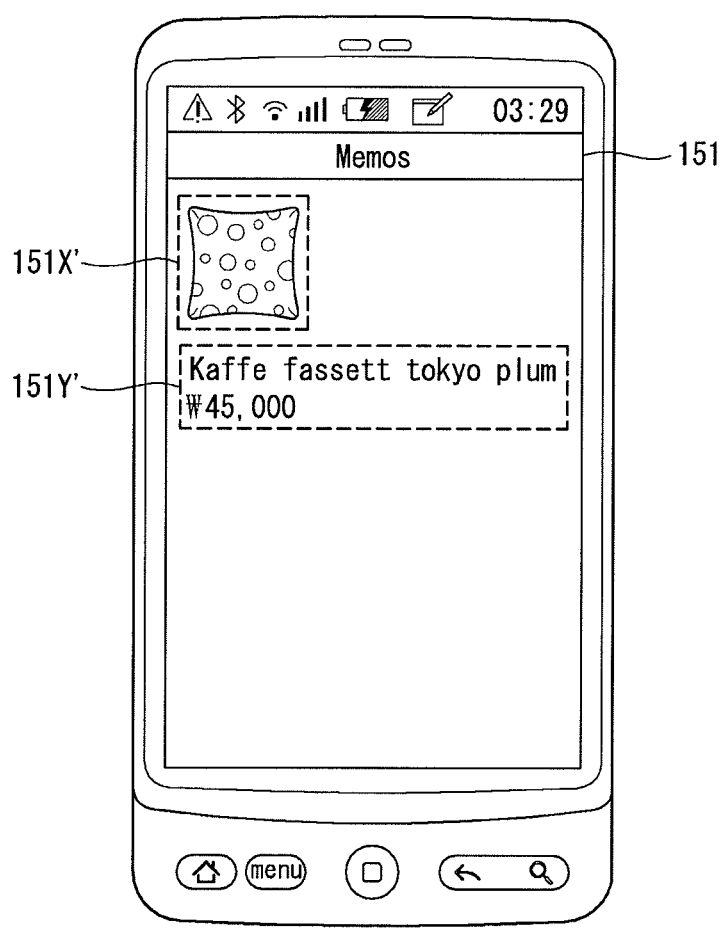
Figure 50:
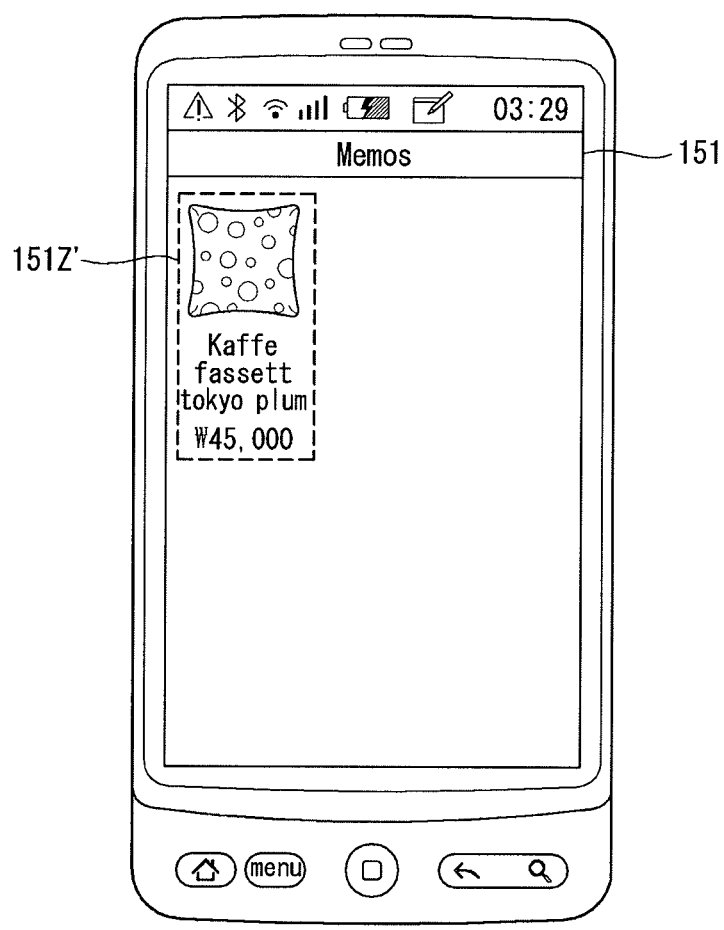

FIGS. 48 to 50 illustrate a procedure of carrying out a method for generating a memo file illustrated in FIG. 47.

FIG. 48 illustrates a case where the user touches a soft key 151A for activating a memo function. Then the controller of the mobile terminal 100 activates a memo function and deactivates a function corresponding to each of the plurality of items. Next, the user selects a particular area 151Z displayed on the screen 151 by applying a drag motion. Then the controller 180, as shown in FIG. 48, converts an image 151X of a particular product included in the particular area selected 151Z and the description part 151Y of a particular product into image or text.

Referring to FIG. 49, it can be known that the controller 180 generates a memo file including an image 151X' converted from the image of a particular product included in the particular area 151Z and text 151Y' converted from the description part of a particular product included in the particular area 151Z.

Also, referring to FIG. 50, it can be known that the controller 180 can generate a memo file including a capture image 151Z' for the particular area 151Z.

Figure 51:
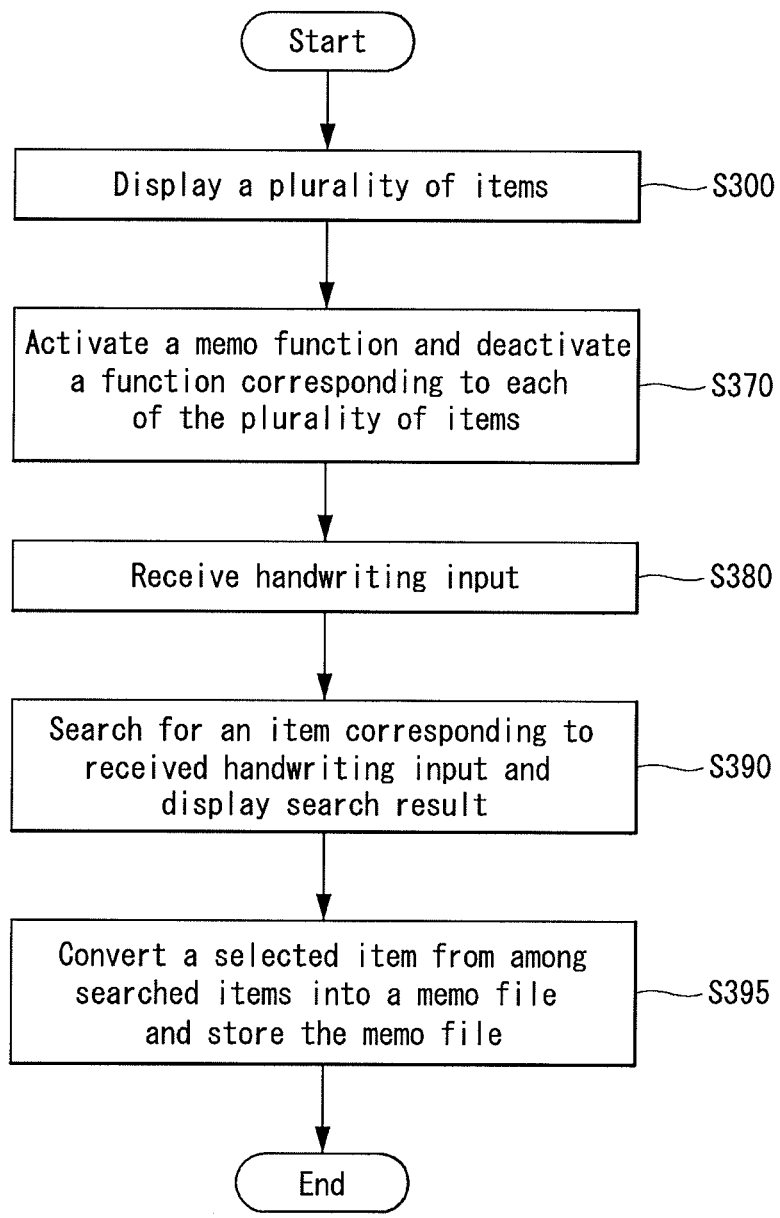
FIG. 51 is a flow diagram illustrating a method for generating a memo file according to still another embodiment of the present invention.

FIG. 51 is a flow diagram illustrating a method for generating a memo file according to still another embodiment of the present invention. In what follows, the method for generating a memo file will be described with reference to related drawings.

The controller 180 of the mobile terminal 100 displays a plurality of items on a touch screen 151, S300. While the plurality of items are displayed on a touch screen 151, the controller activates a memo function in response to the user's operation and deactivates a particular function corresponding to each of the plurality of items S370.

If handwriting input provided by the user through the touch screen 151 is received after a memo function is activated S380, the controller 180 searches for an item corresponding to the received handwriting input from among the plurality of items and displays the search result on the touch screen 151, S390.

If the user selects for a searched item displayed on the touch screen 151, the controller 180 converts the selected item into a memo file and stores the memo file S395. As described above, whether to convert the selected item into text and/or image can be determined based on convertibility of the selected item into text and a generated memo file can be stored in at least one of storage space associated with a memo application and a clipboard.

FIGS. 52 to 57 illustrate a procedure of searching for an item displayed on a touch screen 151 based on handwriting input received through the touch screen 151 and storing the searched item in the form of a memo file according to a method for generating a memo file illustrated in FIG. 51.

Figure 52:
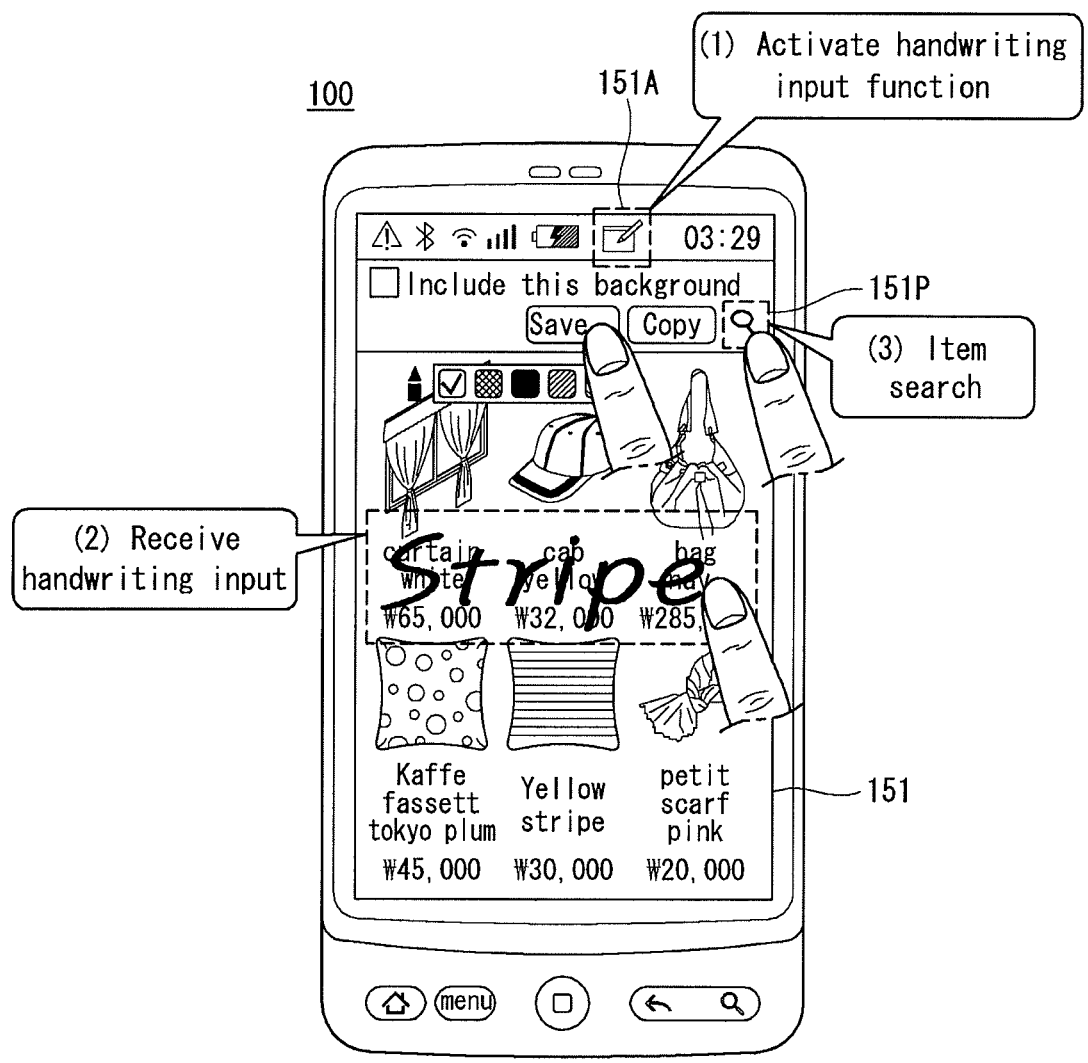
FIGS. 52 to 57 illustrate a procedure of searching for an item displayed on a touch screen based on handwriting input received through the touch screen and storing the searched item in the form of a memo file according to a method for generating a memo file illustrated in FIG. 51.

FIG. 52 illustrates a case where the user touches a soft key 151A for activating a memo function. Then the controller 180 of the mobile terminal 100 activates a memo function and deactivates a function corresponding to each of the plurality of items. Next, the user enters handwriting of "stripe" through the touch screen 151 and touches a search soft key 151P.

Figure 53:
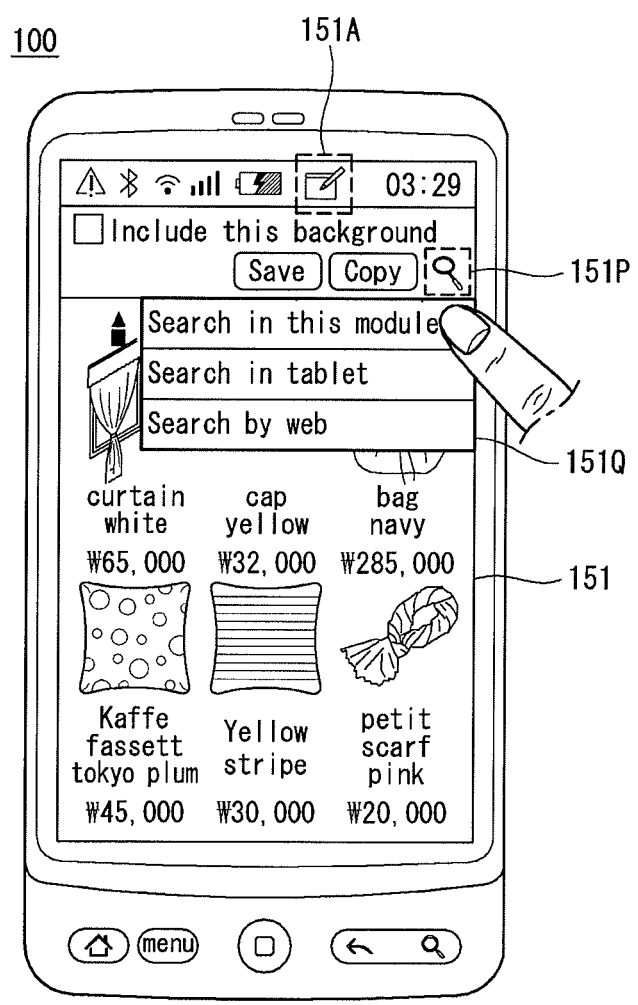

Then, the controller 180, as shown in FIG. 53, displays a pop-up window 151Q for determining the scope of a search for the contents corresponding to the received handwriting input on the touch screen 151.

Referring to FIG. 53, the object of contents search corresponding to the received handwriting input may be an application running in a current mobile terminal 100, a storage unit 160 of the mobile terminal 100, worldwide web, and the like. However, the scope of the present invention is not limited to the object mentioned above. For example, the item can be searched in other electronic devices including a server of a network to which the mobile terminal 100 is connected, another mobile terminal, personal computers, and the like.

Figure 54:
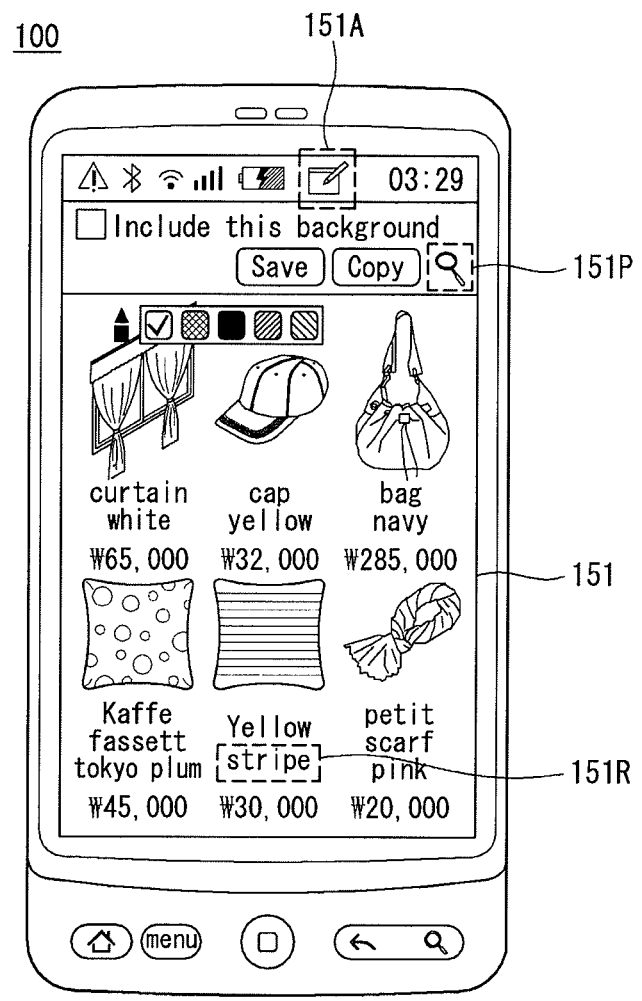

As shown in FIG. 53, the user selects an application running in a current mobile terminal 100 as an object of contents search corresponding to the received handwriting. Then, the controller 180, as shown in FIG. 54, searches for an item corresponding to the received handwriting input of 'stripe' from among a plurality of items included in an execution screen of the application and displays the search result on the touch screen 151. In other words, the touch screen 151 shows a searched item 151R including the received handwriting input of 'stripe' from the plurality of items.

Figure 55:
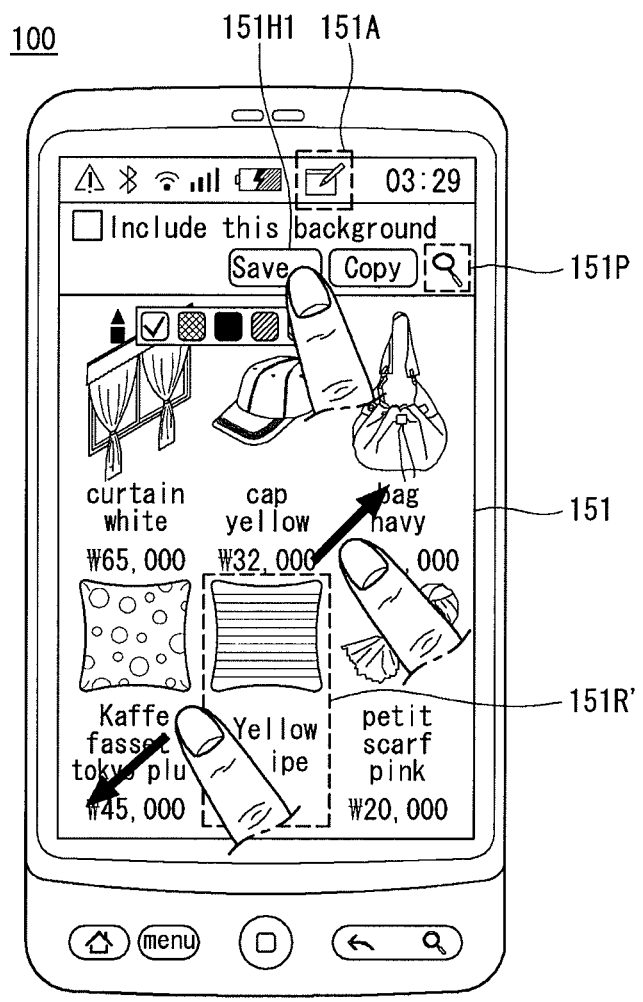
Figure 56:
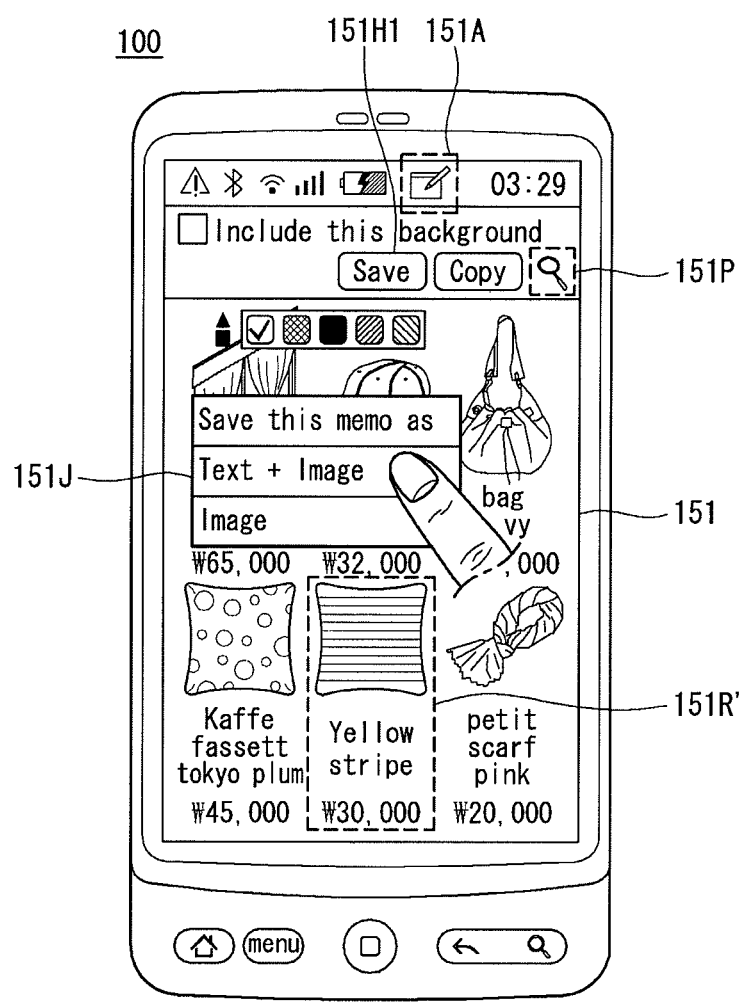

Different from what is illustrated in FIG. 53, if multiple items are searched, the controller 180 can display the search result for the multiple items on the touch screen 151. At this time, the controller 180, according to an embodiment of the present invention, can collect searched items and display the items on the touch screen 151. FIG. 55 illustrates a case where the user selects an area 151R' including an item 151R including the received handwriting input of 'stripe' by using a multi-touch drag and touches a first soft key 151H1 for generating a memo file. Then, the controller 180, as shown in FIG. 56, displays a pop-up window 151J for selecting a conversion scheme for handwriting input on the touch screen 151. Different from what is illustrated in FIG. 55, the user, after an item is searched, can reduce the area forming the basis for generating a memo file.

Figure 57:
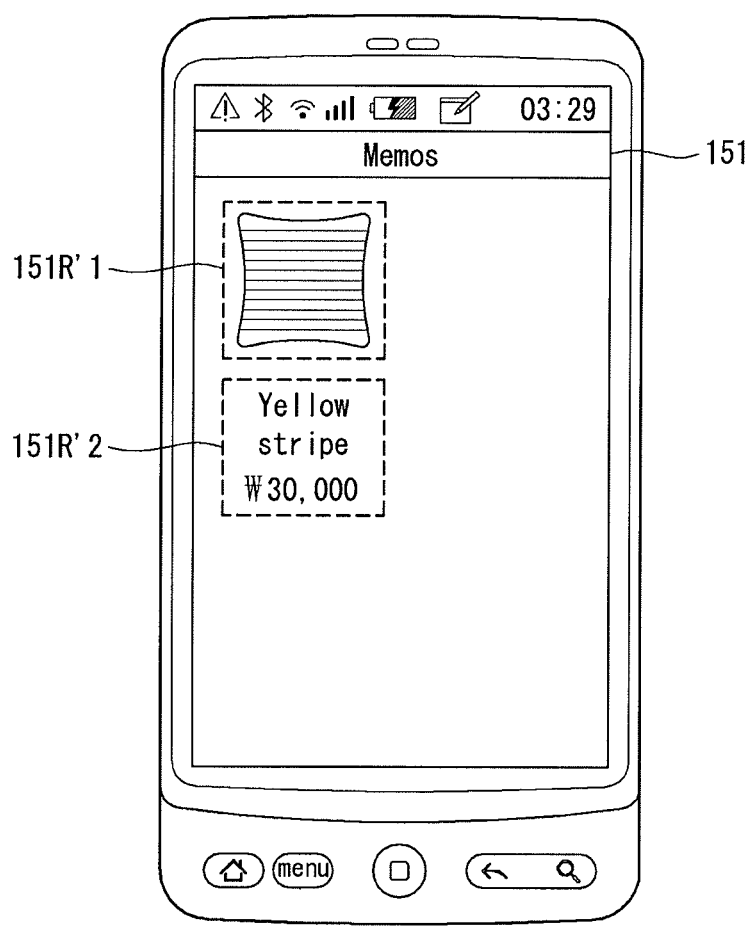

FIG. 56 illustrates a case where the user selects an area and uses the selected area 151R' for storing a memo comprising text and image through the pop-up window 151J. Then, the controller 180, as shown in FIG. 57, can store the selected area 151R' in the form of a memo file comprising a cushion image 151R'1 and text of 'yellow stripe' 151R'2. Though the corresponding examples are not shown in the figure, as described above, whether to convert the item selected through a method for generating a memo file illustrated in FIG. 52 into text and/or image can be determined based on convertibility of the selected item into text; and the generated memo file can be stored in at least one of storage space associated with a memo application and a clipboard.

According to a method for generating a memo file described with reference to FIGS. 52 to 57 above, the item corresponding to received handwriting input can be an item including characters recognized by the received handwriting input. However, the scope of the present invention is not limited to the above description.

According to an embodiment of the present invention, the item corresponding to the received handwriting input can be an item including meaning of a recognized character by the received handwriting input. For example, if a character string 'pink' is recognized from the received handwriting input, the controller 180 can search for an item with a 'pink' color from among multiple items displayed on a touch screen 151 as an item corresponding to the received handwriting input. Also, if a character string of 'stripe' is recognized from the received handwriting input, the controller 180 can search for an item with a 'stripe' pattern from among multiple items displayed on a touch screen 151 as an item corresponding to the received handwriting input.

According to another embodiment of the present invention, an item corresponding to the received handwriting input can be searched by a figure recognized from the received handwriting input. For example, if a heart shape is recognized from the received handwriting input, the controller 180 can search for an item with a heart shape as the item corresponding to the received handwriting input.

Figure 58:
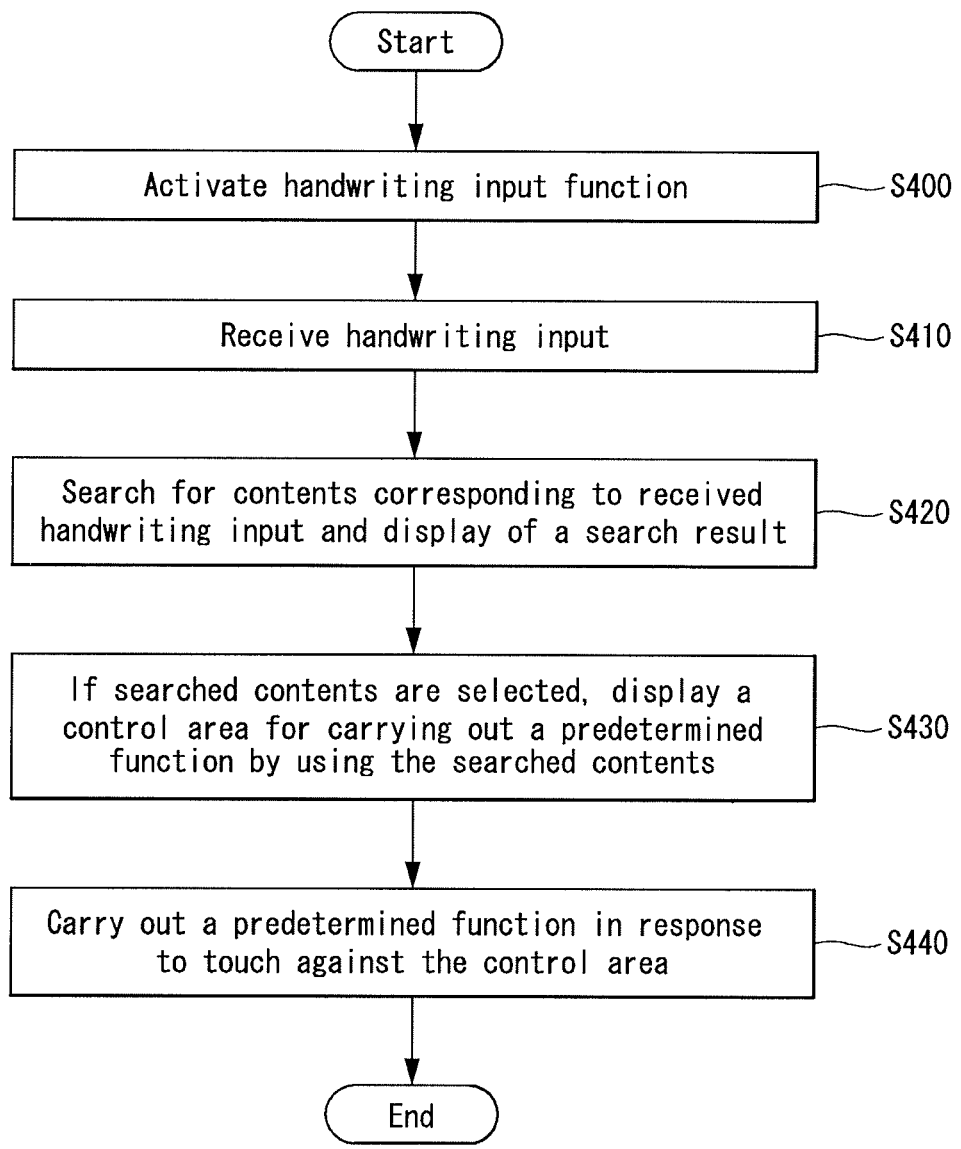
FIG. 58 is a flow diagram illustrating a method for using handwriting input according to an embodiment of the present invention.

FIG. 58 is a flow diagram illustrating a method for using handwriting input according to an embodiment of the present invention. In what follows, the method for using handwriting input will be described with reference to related drawings.

The controller 180 of the mobile terminal 100 activates a handwriting input function of a touch screen 151 based on the user's operation S400. If the handwriting input function of the touch screen 151 is activated, the controller 180 can deactivate a particular function corresponding to at least one item displayed in an area intended as a handwriting input area. According to an embodiment of the present invention, the handwriting input area can correspond to the entire touch screen 151 or part of the touch screen 151.

In other words, when a handwriting input function of the touch screen 151 is activated, even if the user touched an item displayed in a handwriting input area of the touch screen 151, the function corresponding to the item touched by the user is not performed. To be more specific, if an execution icon of a particular application is displayed in a handwriting input area of the touch screen 151 and the handwriting input function of the touch screen 151 is activated, the particular application is not performed even when the user touches the execution icon.

At this time, if an item displayed in a handwriting input area of the touch screen 151 is an item included in an execution screen of a particular application, the controller 180 can update the item according to the execution procedure of the particular application. For example, if the running application is a navigation application, the controller 180 can update the execution screen of the navigation application according to the procedure of guiding a path of the navigation application, though a touch function for the execution screen of the navigation application displayed in the handwriting input area may be deactivated.

If the execution screen of the navigation application is not displayed in the handwriting input area of the touch screen 151, the controller 180 may not deactivate the function corresponding to a touch on the execution screen of the navigation application. Then, the user of the mobile terminal 100 can control the execution of the navigation application through a touch motion as well as running a contents search by using handwriting input.

If handwriting input is received through the touch screen 151 after the handwriting input function of the touch screen 151 is activated S410, the controller 180 searches for the contents corresponding to the received handwriting input and displays the search result on the touch screen 151, S420. Here, the contents corresponding to the handwriting input can be searched inside the mobile terminal 100, namely, in the storage unit 160 of the mobile terminal 100. More specifically, the contents corresponding to the handwriting can be searched in the storage unit 160 corresponding to the application currently running in the mobile terminal 100.

Also, the contents corresponding to the handwriting input can be searched in a different electronic device on a network to which the mobile terminal 100 is connected in a wired/wireless manner. In other words, the controller 180 can search a server, another mobile terminal, or a PC on a network to which the mobile terminal 100 is connected in a wired/wireless manner for the contents corresponding to the received handwriting input. For example, the controller 180 can search the worldwide web to which the mobile terminal 100 is connected in a wired/wireless manner for the contents corresponding to the handwriting input.

If the contents corresponding to the received handwriting input have been searched and are displayed on the touch screen 151 and the searched contents are selected by the user's touch motion, the controller 180 displays a control area for carrying out a predetermined function corresponding to the attributes of the search contents S430. Then, the controller 180 performs a predetermined function in accordance to the attributes of the searched contents in response to the touch on the control area S440.

Figure 59:
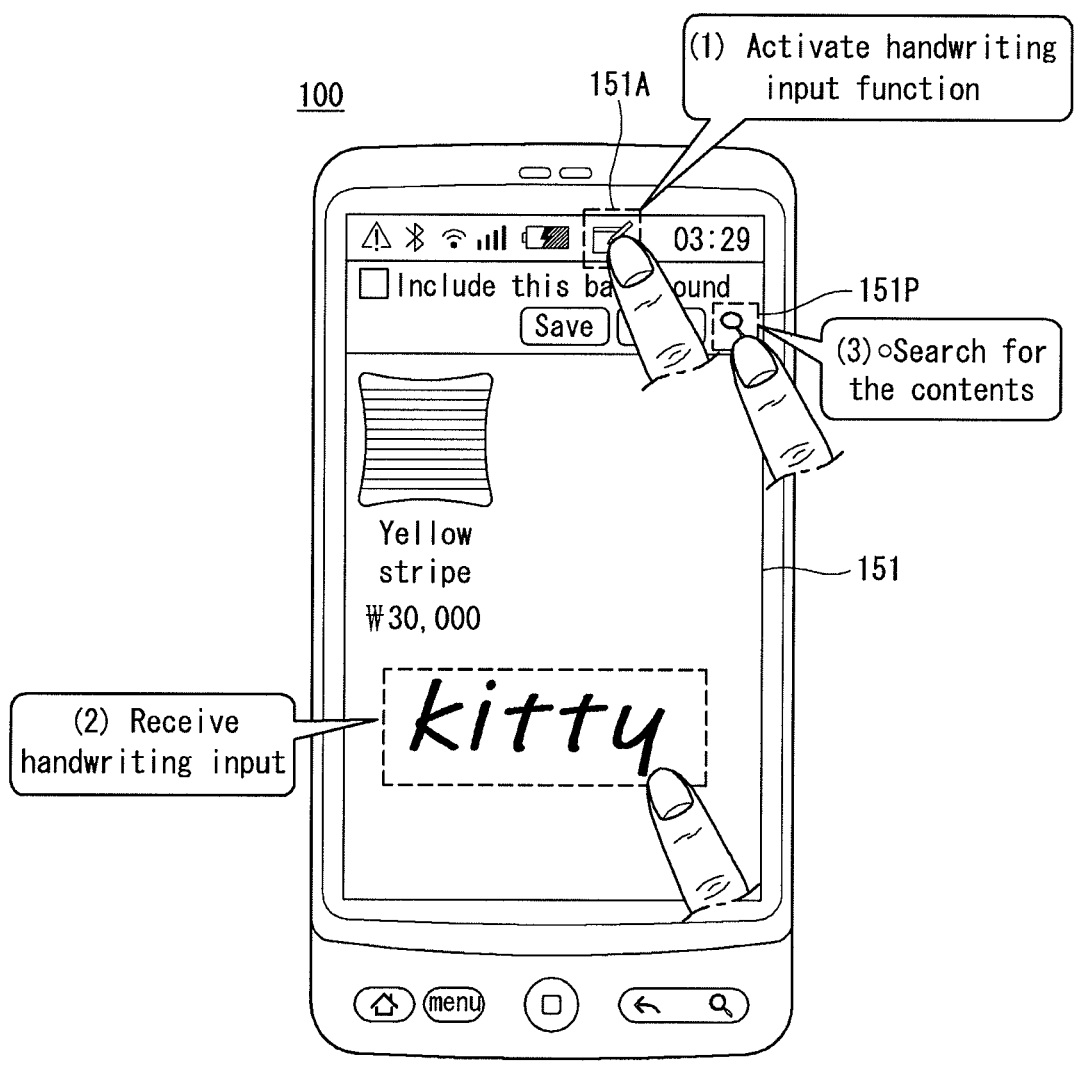
FIGS. 59 to 61 illustrate one example of a procedure through which the contents corresponding to handwriting input are searched according to a method for using handwriting input illustrated in FIG. 58.
Figure 60:
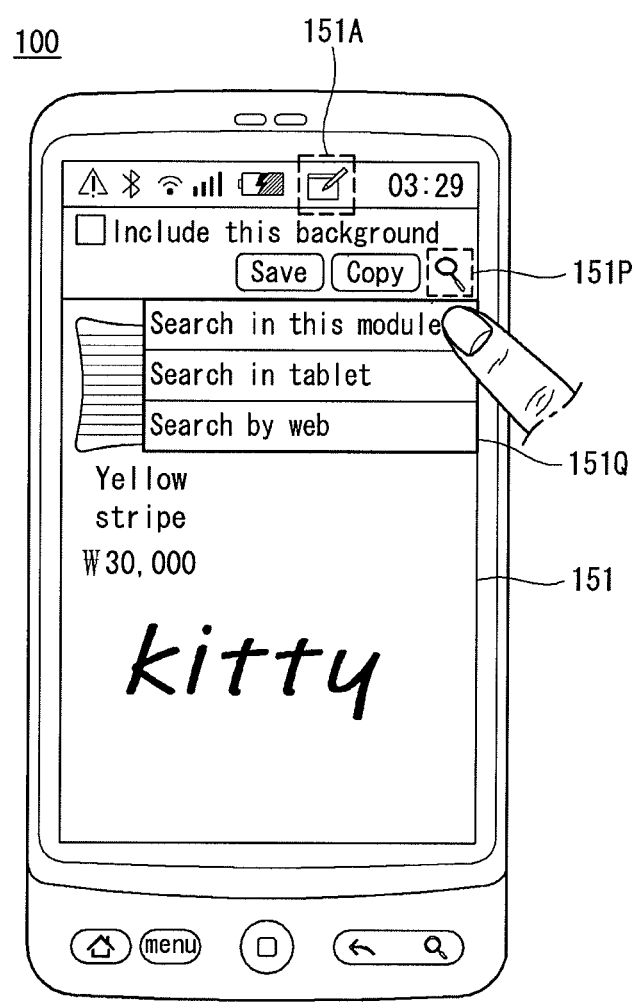
Figure 61:
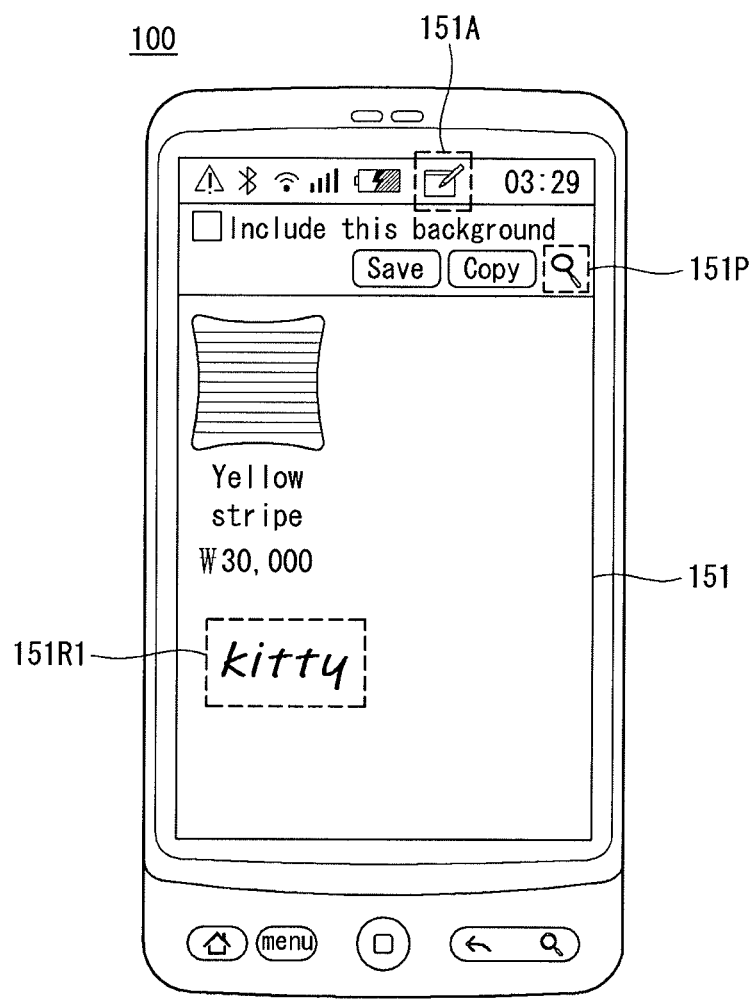

FIGS. 59 to 61 illustrate one example of a procedure through which the contents corresponding to handwriting input are searched according to a method for using handwriting input illustrated in FIG. 58.

FIG. 59 illustrates a case where the user touches a soft key 151A for activating a memo function. Then the controller 180 of the mobile terminal 100 activates a handwriting input function. Next, the user inputs handwriting of 'kitty' through the touch screen 151 and touches a search soft key 151P.

Then, as shown in FIG. 60, the controller 180 displays a pop-up window 151Q for determining the scope of search for the contents corresponding to the received handwriting input and displays the pop-up window on the touch screen 151.

As shown in FIG. 60, the user selects an application currently running in the mobile terminal 100 as a search object of the contents corresponding to the received handwriting input. Then, the controller 180, as shown in FIG. 60, searches a memo file 151R1 which corresponds to the contents stored based on the handwriting input and displays the search result on the touch screen 151.

Figure 62:
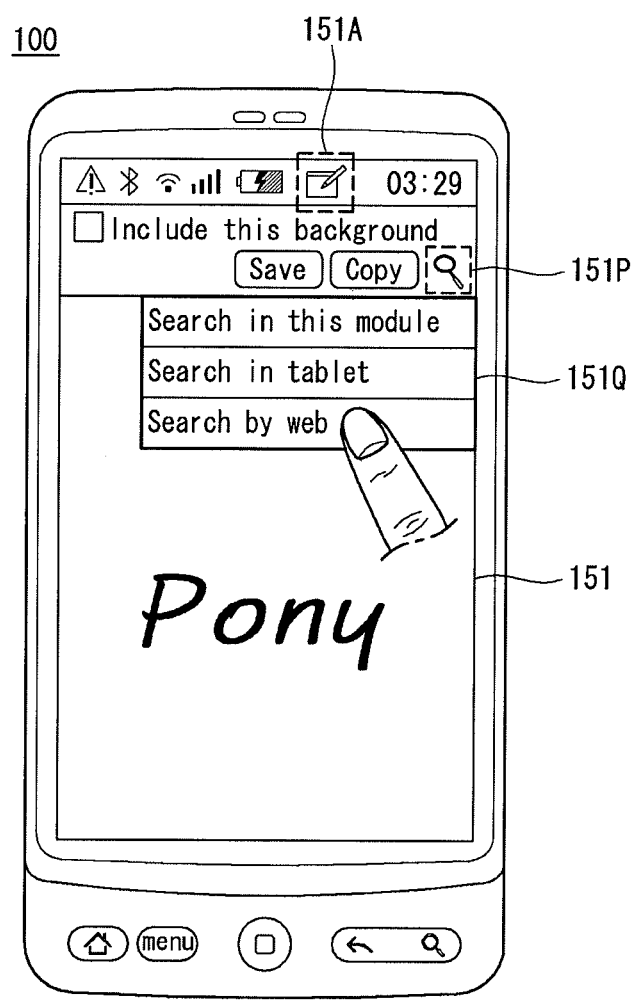
FIGS. 62 to 63 illustrate another example of a procedure through which the contents corresponding to handwriting input are searched according to a method for using handwriting input illustrated in FIG. 58.
Figure 63:
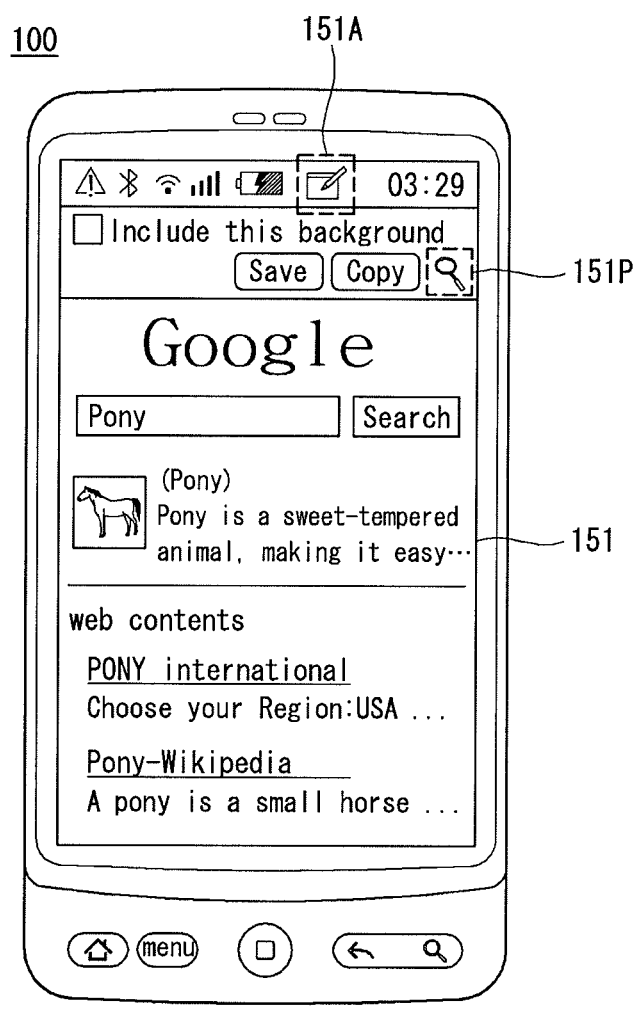

FIGS. 62 to 63 illustrate another example of a procedure through which the contents corresponding to handwriting input are searched according to a method for using handwriting input illustrated in FIG. 58.

FIG. 62 illustrates a case where the user inputs handwriting of 'Pony' while the handwriting input function of a touch screen 151 is activated and selects the web as a search object for the contents corresponding to the handwriting input. Then the controller 180, as shown in FIG. 63, displays a search result from the web for the handwriting input of 'Pony' on the touch screen 151. At this time, a web browser with which to search for the contents corresponding to the handwriting input may be predetermined.

Figure 64:
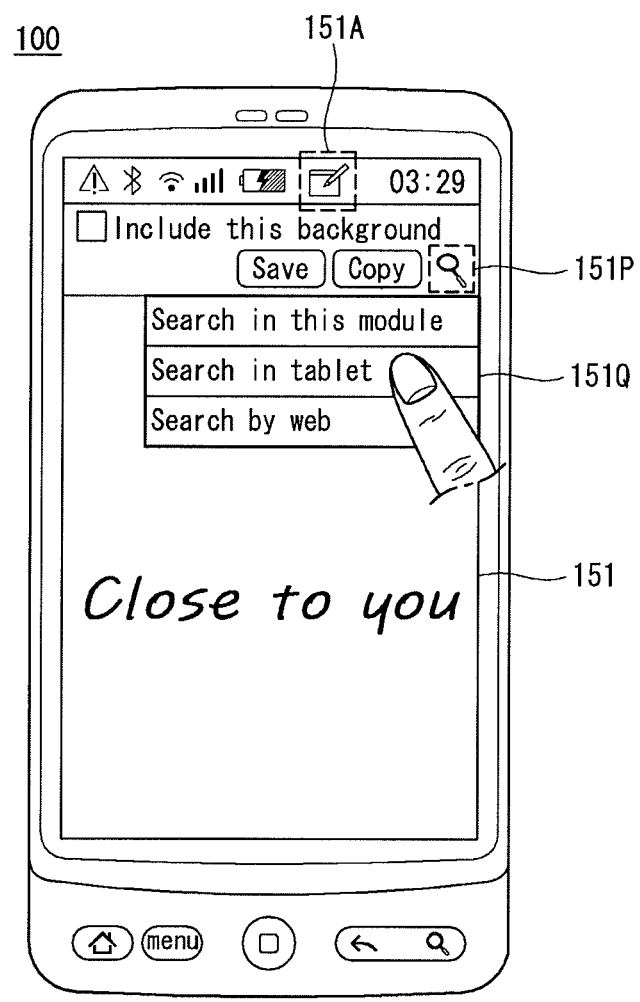
FIGS. 64 to 66 illustrate one example of a procedure through which the contents corresponding to handwriting input are searched and a particular function predetermined according to the searched contents is performed according to a method for using handwriting input illustrated in FIG. 58.
Figure 65:
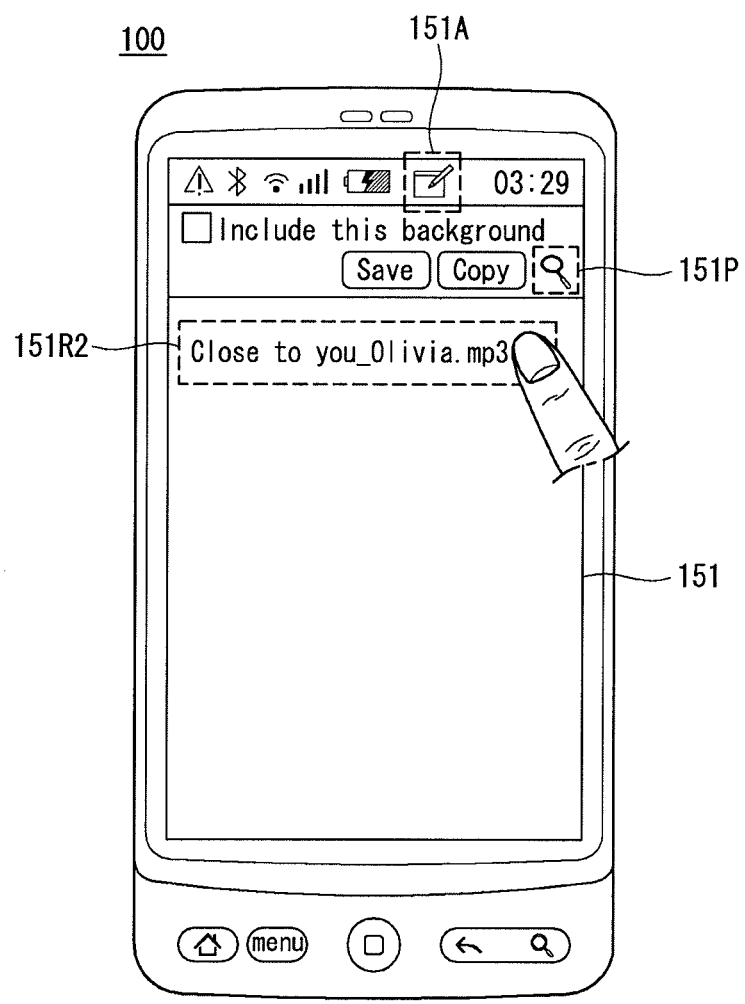
Figure 66:
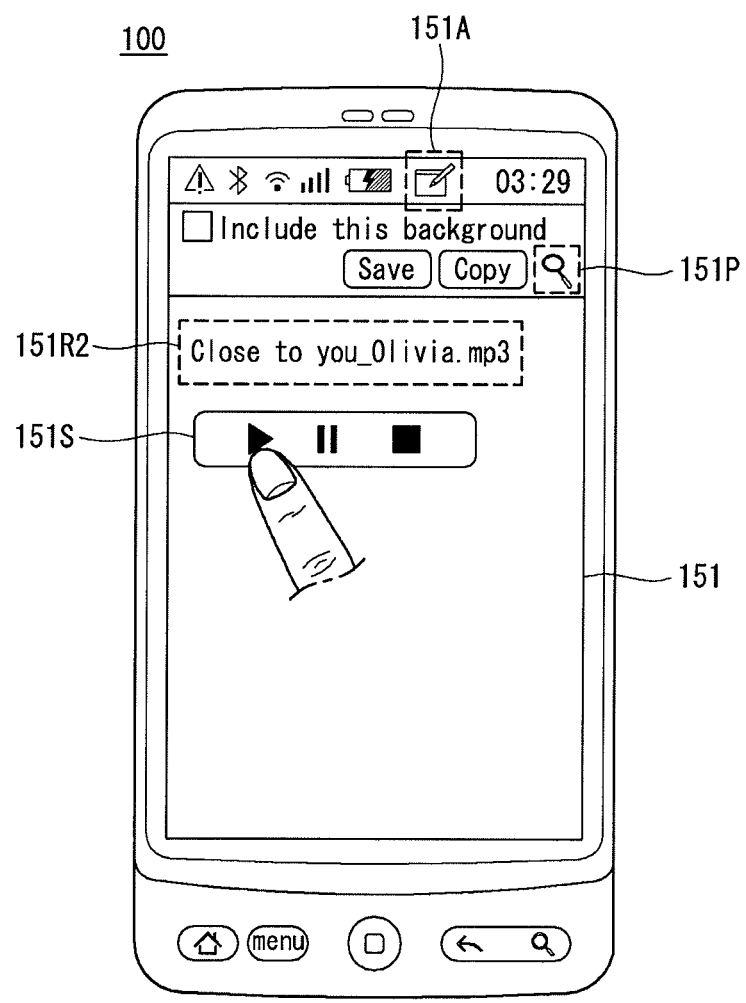

FIGS. 64 to 66 illustrate one example of a procedure through which the contents corresponding to handwriting input are searched and a particular function predetermined according to the searched contents is performed according to a method for using handwriting input illustrated in FIG. 58.

FIG. 64 illustrates a case where the user inputs handwriting of 'Close to you' while the handwriting input function of a touch screen 151 is activated and selects through a pop-up window 151Q the mobile terminal 100 which is a tablet PC as a search object for the contents corresponding to the handwriting input. As shown in FIG. 63, then, the controller 180 displays on the touch screen 151 music files 151R2 searched in the storage unit 160 of the mobile terminal 100 corresponding to the handwriting input of 'Close to you'. At this time, the search scope in the storage unit 160 for the contents corresponding to the handwriting input may be further confined to the storage area corresponding to a particular application.

FIG. 65 illustrates a case where the user selects the searched music file 151R2 by touching the music file. As shown in FIG. 66, then, the controller 180 displays a control area 151S for controlling play of the searched music file 151R2 on a touch screen 151. Then the user can control the play of the searched music file 151R2 by touching the control area 151S.

If the search contents are a music file, the controller 180, different from what are illustrated in FIG. 66, can display a control area on the touch screen 151, the control area including an execution icon of at least one application capable of playing the music file.

Figure 67:
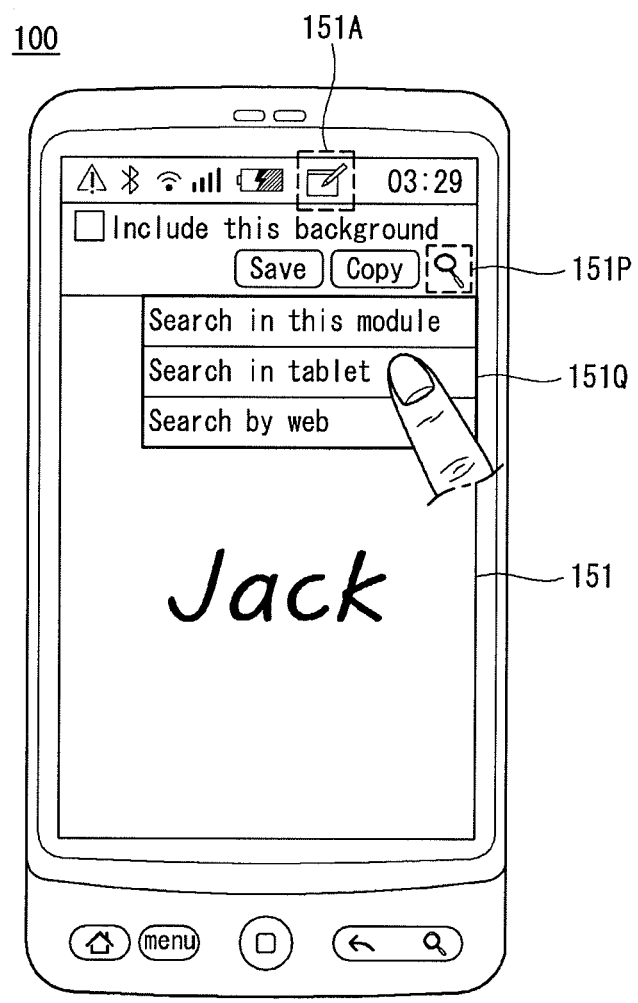
FIGS. 67 to 69 illustrate another example of a procedure through which the contents corresponding to handwriting input are searched and a particular function predetermined according to the searched contents is performed according to a method for using handwriting input illustrated in FIG. 58.
Figure 68:
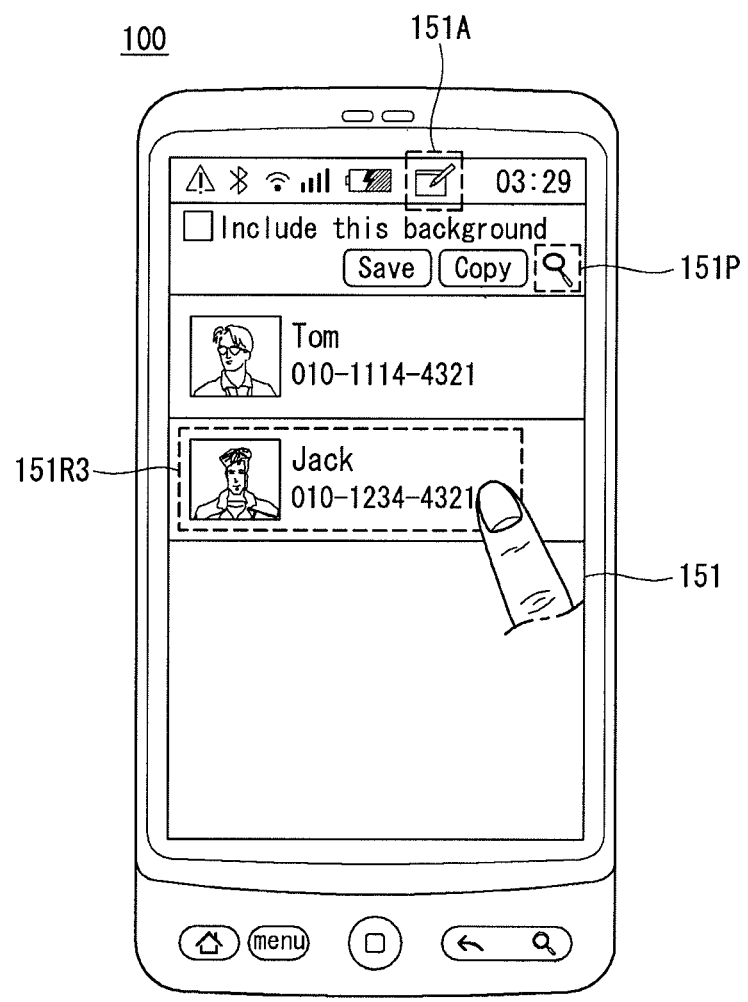
Figure 69:
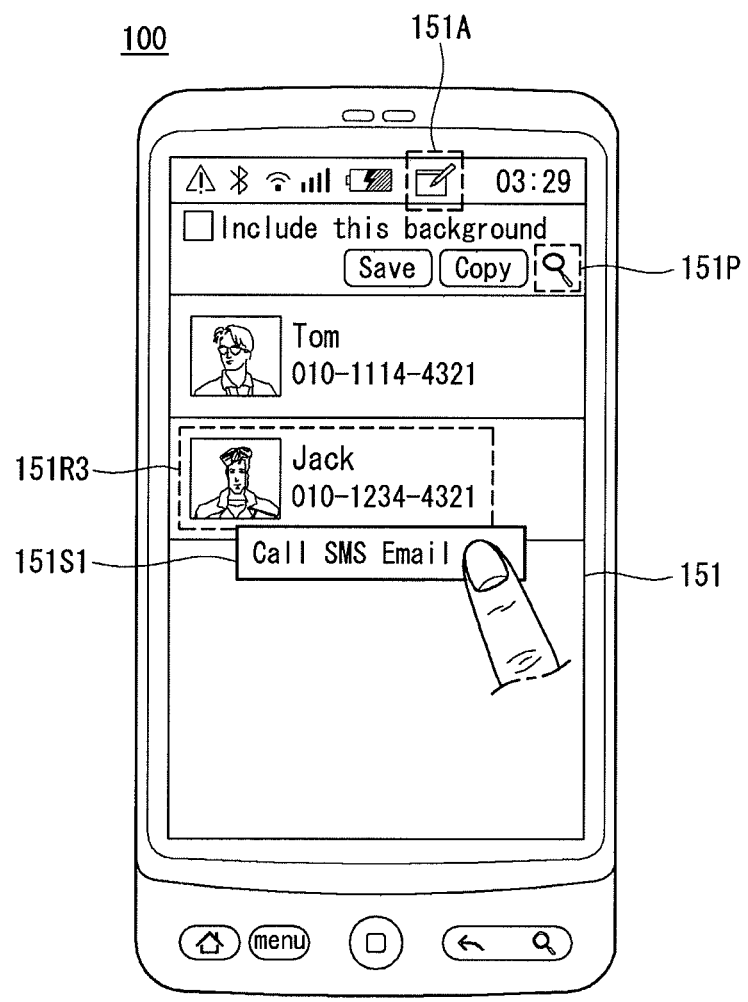

FIGS. 67 to 69 illustrate another example of a procedure through which the contents corresponding to handwriting input are searched and a particular function predetermined according to the searched contents is performed according to a method for using handwriting input illustrated in FIG. 58.

FIG. 67 illustrates a case where the user inputs handwriting of 'Jack' while the handwriting input function of a touch screen 151 is activated and selects through a pop-up window 151Q the mobile terminal 100 which is a tablet PC as a search object for the contents corresponding to the handwriting input. As shown in FIG. 68, then, the controller 180 displays on the touch screen 151 a phonebook file 151R3 searched in the storage unit 160 of the mobile terminal 100 corresponding to the handwriting input of 'Jack'.

FIG. 68 illustrates a case where the user selects the searched phonebook file 151R3 by touching the phonebook file. As shown in FIG. 69, then, the controller 180 displays a control area 151S1 for carrying out functions of phone call, SMS message writing, and e-mail sending on a touch screen 151 by using the searched phonebook file 151R3. Then the user can make a phone call to a person corresponding to the searched phone book 151R3, write an SMS message, or write an e-mail by touching the control area 151S.

If the search contents are a phonebook file, the controller 180, different from what are illustrated in FIG. 69, can display a control area on the touch screen 151, the control area including an execution icon of at least one application capable of carrying out functions of a phone call, SMS message writing, e-mail writing, etc. by using the phonebook file.

Though not shown in the figure, if the searched contents are a text file or a document of particular style, the controller 180 can display a control area on the touch screen 151, the control area including an execution icon of an application capable of activating and editing the text file or the document file of particular style.

If the search contents are a video file, the controller 180 can display a control area on the touch screen 151, the control are including an execution icon of an application capable of playing the video file. The examples of a control area above according to the attributes of searched contents follow the exemplary embodiments of a method of handwriting input according to the present invention and the scope of the present invention is not limited by the above description.

Figure 70:
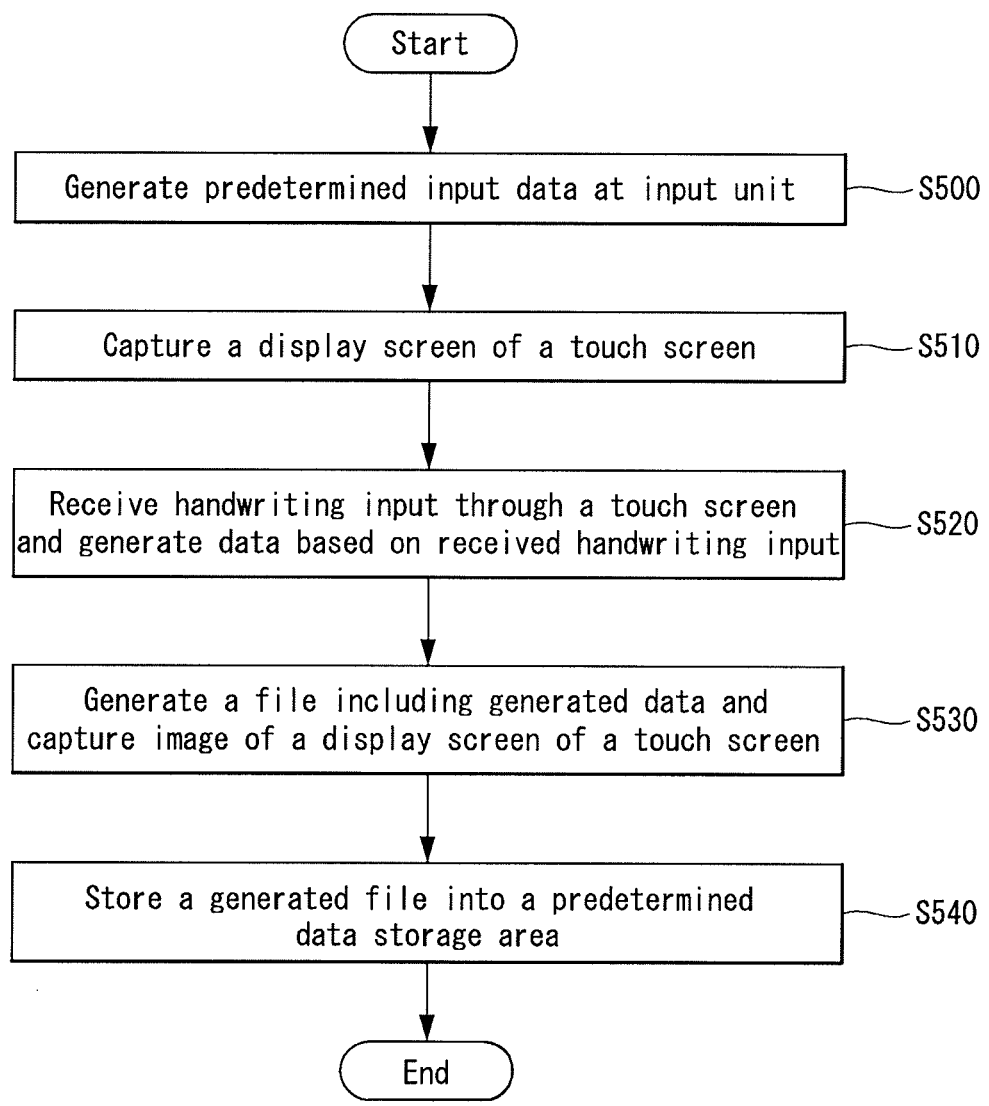
FIG. 70 is a flow diagram illustrating a further example of a method for generating a memo file for a mobile terminal according to the present invention.

FIG. 70 is a flow diagram illustrating a further example of a method for generating a memo file for the mobile terminal 100 according to the present invention. In what follows, the method for generating a memo file will be described with reference to related drawings.

Predetermined input data are generated in the input unit 116 in response to the user's operation S500. Here, the predetermined input data can be generated in response to operation of multiple, predetermined hardware hot keys included in the input unit 116. Also, the predetermined input data can be generated based on a particular gesture of the user recognized by the image captured through a camera 121 included in the input unit 116. In addition, the predetermined input can be generated based on a predetermined, particular voice command of the user received through a microphone 122 included in the input unit 116.

If the predetermined input data are generated, the controller 180 of the mobile terminal 100 captures S510 a display screen of the touch screen 151 and generates a capture image of the display screen. Next, the controller 180 sets the touch screen 151 as a handwriting input means.

If handwriting input is received through the touch screen 151, the controller 180 generates data based on the received handwriting input S520. Here, the generated data can be an image corresponding to handwriting input, or text including a character recognition result against the handwriting input, or combination of image and text generated based on the handwriting input.

Next, the controller 180 generates S530 a memo file including the generated data and a capture image of a display screen of the touch screen 151. Here, the memo file may correspond to a single image file including the capture image and the generated data. Also, the memo file may correspond to a file including the generated data which do not constitute a single image together with the capture image. For example, the memo file may be a file including text generated based on the capture image and the handwriting input. However, types of memo file of the present invention are not limited to the examples described above.

When a memo file is generated, the controller 180 stores the generated memo file in a predetermined data storage area S540. Here, the predetermined data storage area may be a particular area of a storage unit 160 predetermined for a memo file generated after performing the handwriting input function. Also, the predetermined data storage area may be a particular area of the storage unit 160 assigned for a particular application displayed on the touch screen 151. In addition, the predetermined data storage area may be a particular area of the storage unit 160 assigned by the user. However, the predetermined storage area of the present invention is not limited to the examples above.

Different from what are illustrated in FIG. 70, the controller 180 can activate a handwriting input function using the touch screen 151 based on a predetermined type of touch received through the touch screen 151. Also, the controller 180 can activate a handwriting input function using the touch screen 151 based on touching soft keys displayed on the touch screen 151.

The memo file used in this document does not indicate a file generated after carrying out a memo application but the file generated based on handwriting input (namely, a handwriting memo of the user) by using a touch screen 151 as a handwriting input means.

Different from what are illustrated in FIG. 70, the controller may activate a function of generating a memo file using the voice of the user received through the micro phone 122. However, the scope of the present invention for the memo file generating method is not limited to the above examples.

Figure 71:
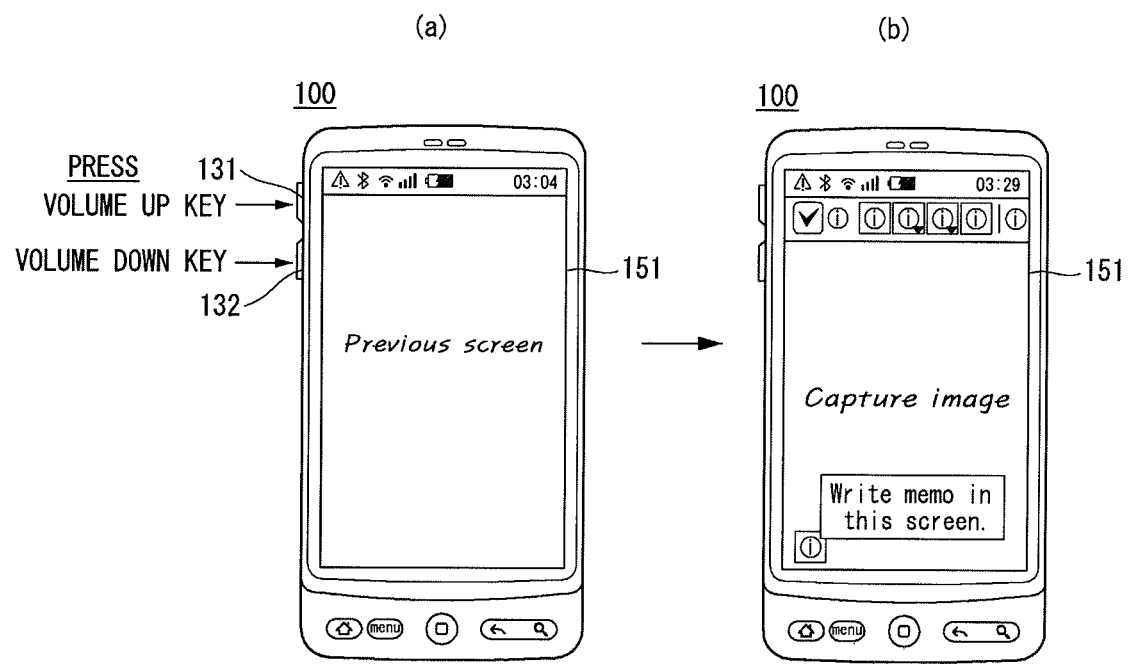
FIG. 71 is an example where a handwriting input function using a touch screen is activated in response to the user's hardware hot key operation according to a method for generating a memo file illustrated in FIG. 70.

FIG. 71 is an example where a handwriting input function using a touch screen 151 is activated in response to the user's hardware hot key operation according to a method for generating a memo file illustrated in FIG. 70.

FIG. 71(*a*) illustrates a case where the user simultaneously presses a volume-up key 131 and a volume-down key 132 which are predetermined hardware hot keys. Then the controller 180 of the mobile terminal 100 recognizes hot key operation and activates a handwriting input function employing the touch screen 151 and as shown in FIG. 71(*a*), displays a handwriting input screen on the touch screen 151. Referring to FIG. 71(*b*), it can be known that a capture image of a previous screen is displayed as a background image of the handwriting input screen. While in the state of FIG. 71(*b*), the user can use the touch screen 151 as a handwriting input means.

According to another embodiments of the present invention, the hardware hot key operation may include various other operation types for one or more hardware keys included in the user input unit 130. The hardware hot key operation may include operation for only the volume-up key 131 or the volume-down key 132.

First, the hardware hot key operation may include press operation for the volume-up key 131 when the volume is max level or press operation for the volume-down key 132 when the volume is min level. Second, the hardware hot key operation may include press operation for the volume-up key 131 or the volume-down key 132, when the state of the mobile terminal is a specific state in which audio output is restricted. For example, the specific operation state of the mobile terminal 100 may include the silent mode or the vibration mode. Third, the hardware hot key operation may include long-press operation for only the volume-up key 131 or the volume-down key 132. If the user press the volume-down key 132 for a long time, the mobile terminal 100 may decrease the volume then the operation mode Fourth, the hardware hot key operation may include simultaneous press operation the volume-up key 131 and back-key or simultaneous press operation for the volume-down key 132 and the back key. Fifth, the hardware hot key operation may include press operations according to the predetermined sequence for a plurality of hardware keys. However, the scope of the present invention for the hardware hot key is not limited to the above examples.

Figure 72:
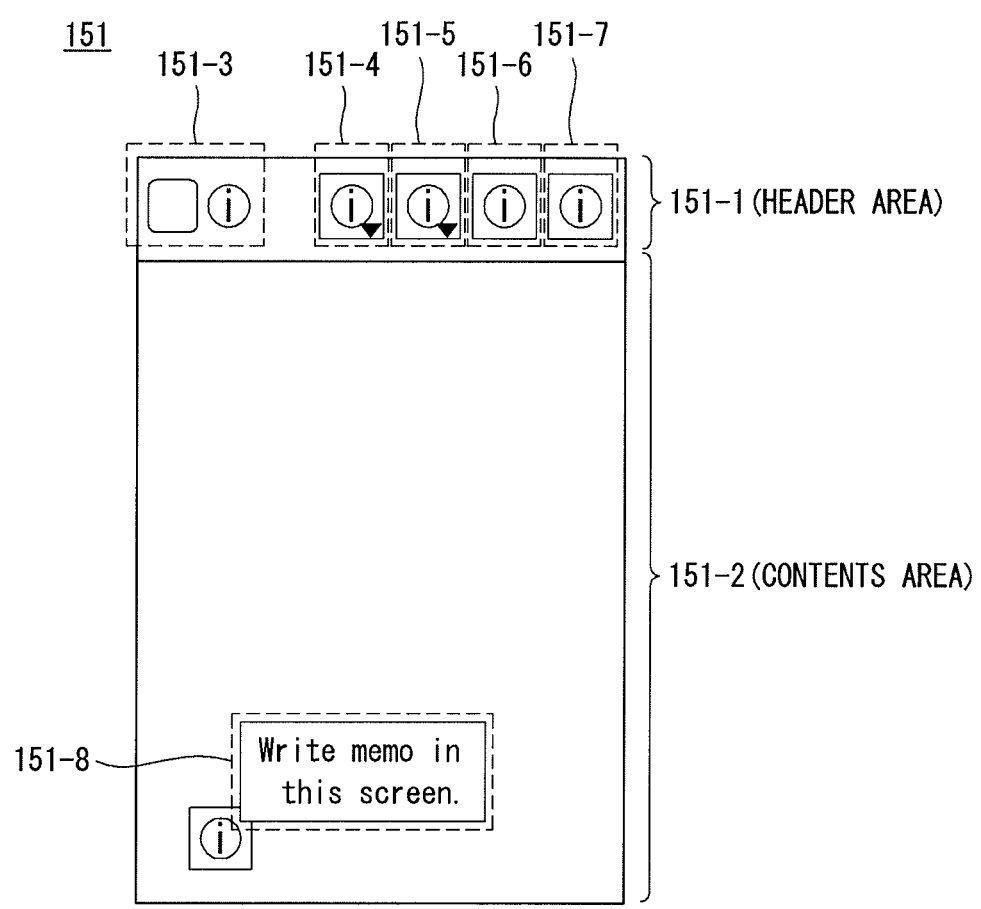
FIG. 72 is a detailed view of a handwriting input screen illustrated in FIG. 71.

FIG. 72 is a detailed view of a handwriting input screen illustrated in FIG. 71. Referring to FIG. 72, the handwriting input screen includes a header area 151-1 and a contents area 151-2. The header area 151-1 comprises a plurality of icons 151-4 to 151-7 and a selection area 151-3 for selecting and carrying out a corresponding function.

The selection area 151-3 is intended for determining whether to use an image of a display screen of a touch screen 151 as a background of a memo file, the image being captured as a handwriting input function is activated. A default setting for the mobile terminal 100 according to the present invention may be not to use the capture image as a background at the time of generating a memo file. The mobile terminal 100 may retain the last setting through the selection area 151-3 at the time of activating a handwriting input function.

A first icon 151-4 among the plurality of icons may be the icon for carrying out a function of setting a color, thickness, etc. of a virtual pen used for displaying a trajectory of handwriting input. A second icon 151-5 among the plurality of icons may be the icon for deleting handwriting input displayed in the handwriting input area. A third icon 151-6 among the plurality of icons may be the icon for carrying out a function for sharing a generated memo file with other electronic devices. A fourth icon 151-7 may be the icon for storing the generated memo file.

The contents area 151-2 may be the area receiving handwriting input (namely, a handwriting input area). As shown with reference to FIG. 71, the contents area 151-2 may have the capture image of a display screen of a touch screen 151 as a background. Also, as shown in FIG. 72, the handwriting input screen may have a user interface 151-8 displayed, indicating handwriting input can be performed through the handwriting input screen. The user interface 151-8 can be displayed in the contents area 151-8 for a predetermined time period. The icon adjacent to the user interface 151-8 with its corresponding area partly overlapping the user interface in FIG. 72 may be the icon for determining whether to activate a hardware key disposed in the front of the mobile terminal 100. A detailed description of the icon will be provided in more detail with reference to FIG. 91.

Even if the mobile terminal 100 allows switching between a horizontal view and vertical view and allows a view direction at the time of activating a handwriting input function into another direction, the handwriting input screen can still maintain the orientation determined at the time of activating a handwriting input function.

The handwriting input function can be deactivated by the user's operation of home key or back key. Also, the handwriting input function can be deactivated in response to re-touching the hot key used for activating the handwriting input function. At this time, even if the handwriting input function is terminated, a file generated through the handwriting input screen can still be stored. A method for deactivating a handwriting input function of the present invention is not limited to the examples described above.

Figure 73:
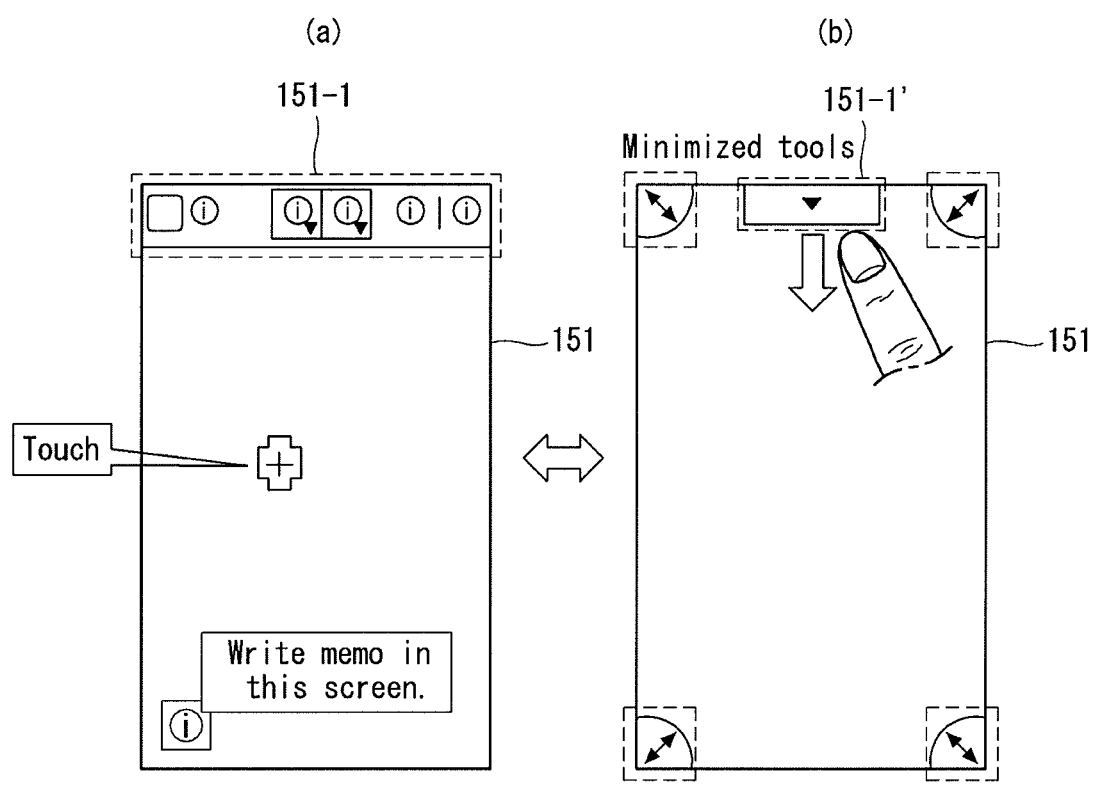
FIG. 73 illustrates a case where a crop tool changing the size of a capture image in the background is provided while a handwriting function is activated for a mobile terminal according to the present invention.

FIG. 73 illustrates a case where a crop tool changing the size of a capture image in the background is provided while a handwriting function is activated for the mobile terminal 100 according to the present invention.

As shown in FIG. 73(a), the user touches a particular point of a handwriting input area. Then, the controller 180 of the mobile terminal 100, as shown in FIG. 73(b), can display on a touch screen 151 a header area 151-1 by minimizing the header area and a crop button for changing the size of a capture image set as a background at four corners of a handwriting input area.

As shown in FIG. 73(b), if the user touches the minimized header area 151-1' and drags in the downward direction, the controller 180 can convert the display screen of a touch screen 151 again to the handwriting input screen of FIG. 73(a). Different from what are illustrated in FIG. 73(b), even if the user simply touches the minimized header area 151-1', the controller 180 can convert the display screen of a touch screen 151 again to the handwriting input screen of FIG. 73(a).

Figure 74:
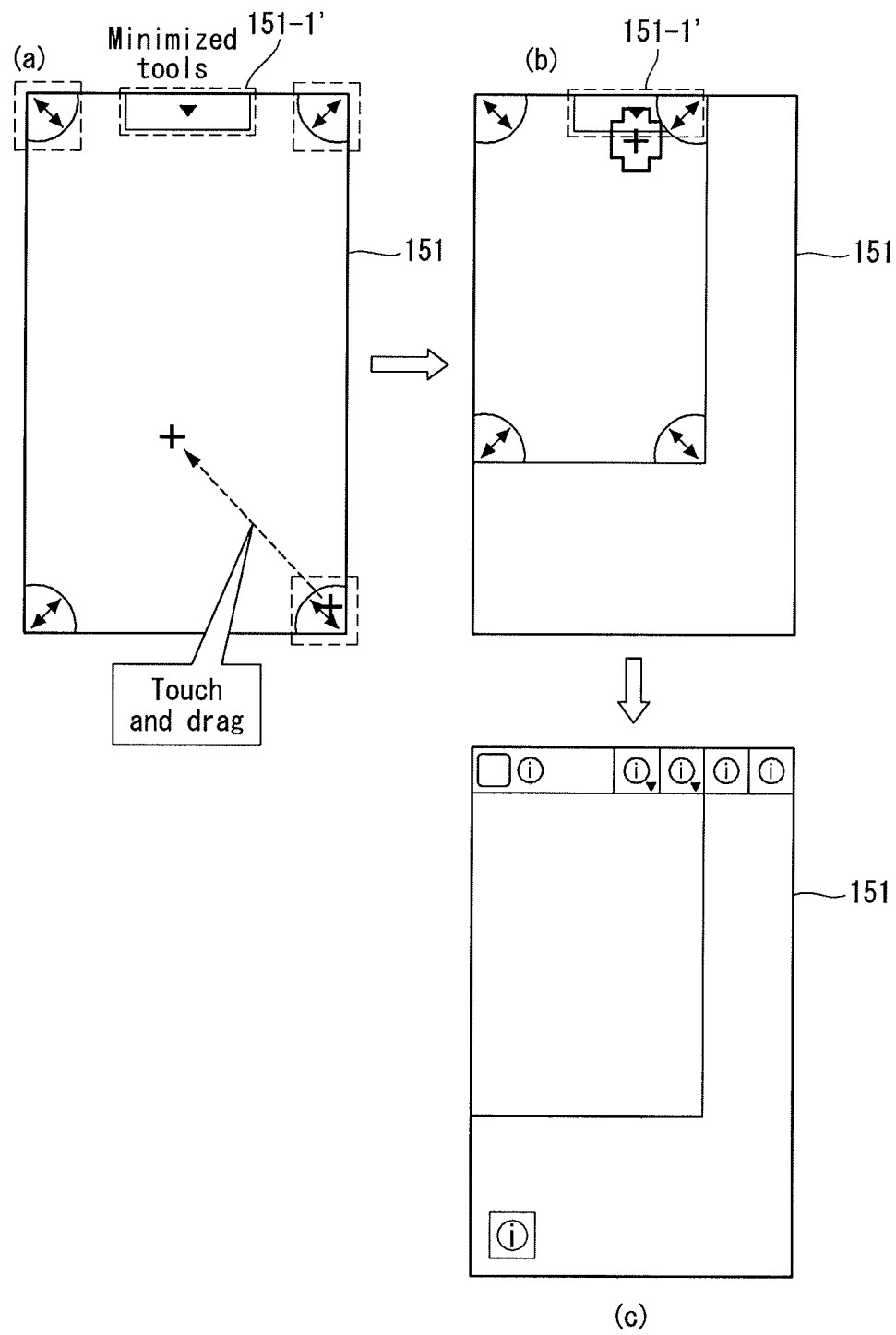
FIG. 74 illustrates a procedure of changing the size of a capture image provided as a background for a memo file based on a user's crop button operation in a mobile terminal where a handwriting input function is activated according to the present invention.

FIG. 74 illustrates a procedure of changing the size of a capture image provided as a background for a memo file based on a user's crop button operation in the mobile terminal 100 where a handwriting input function is activated according to the present invention.

FIG. 74 illustrates a case where the user touches a crop button at the lower right-hand corner and drags the crop button toward the screen center while a handwriting input function is activated, and crop tools for changing the size of a background screen are displayed at the four corners of the screen. Then, as shown in FIG. 74(b), the controller 180 can change the size of a background screen. Then, when a generated file is stored finally, the size-changed capture image is set as a background of the generated file. At this time, the controller 180 can dim the area outside of the size-changed capture image.

After the size of the capture image has been changed, the user, as shown in FIG. 74(b), touches the minimized header area 151-1'. Then, the controller 180 displays on a touch screen 151 a handwriting input screen where a size-changed capture image is set as its background; and restores the header area to its original size.

Figure 75:
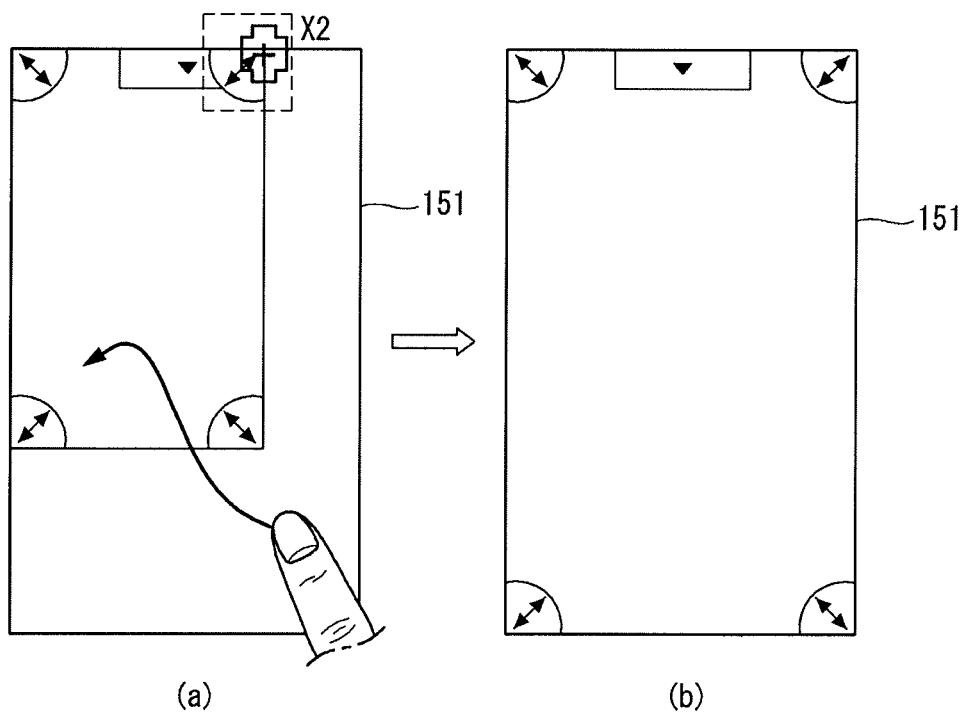
FIG. 75 is an example of converting the background whose size has been changed according to the user's operation back to cover the whole area.

FIG. 75 is an example of converting the background whose size has been changed according to the user's operation back to cover the whole area. As shown in FIG. 75(a), if the user doubly touches a crop button displayed at a particular corner of a screen or moves a touch on the area outside the size-changed background to the size-changed background area, the controller 180 can extend the background back again to the entire screen area as shown in FIG. 75(b).

Figure 76:
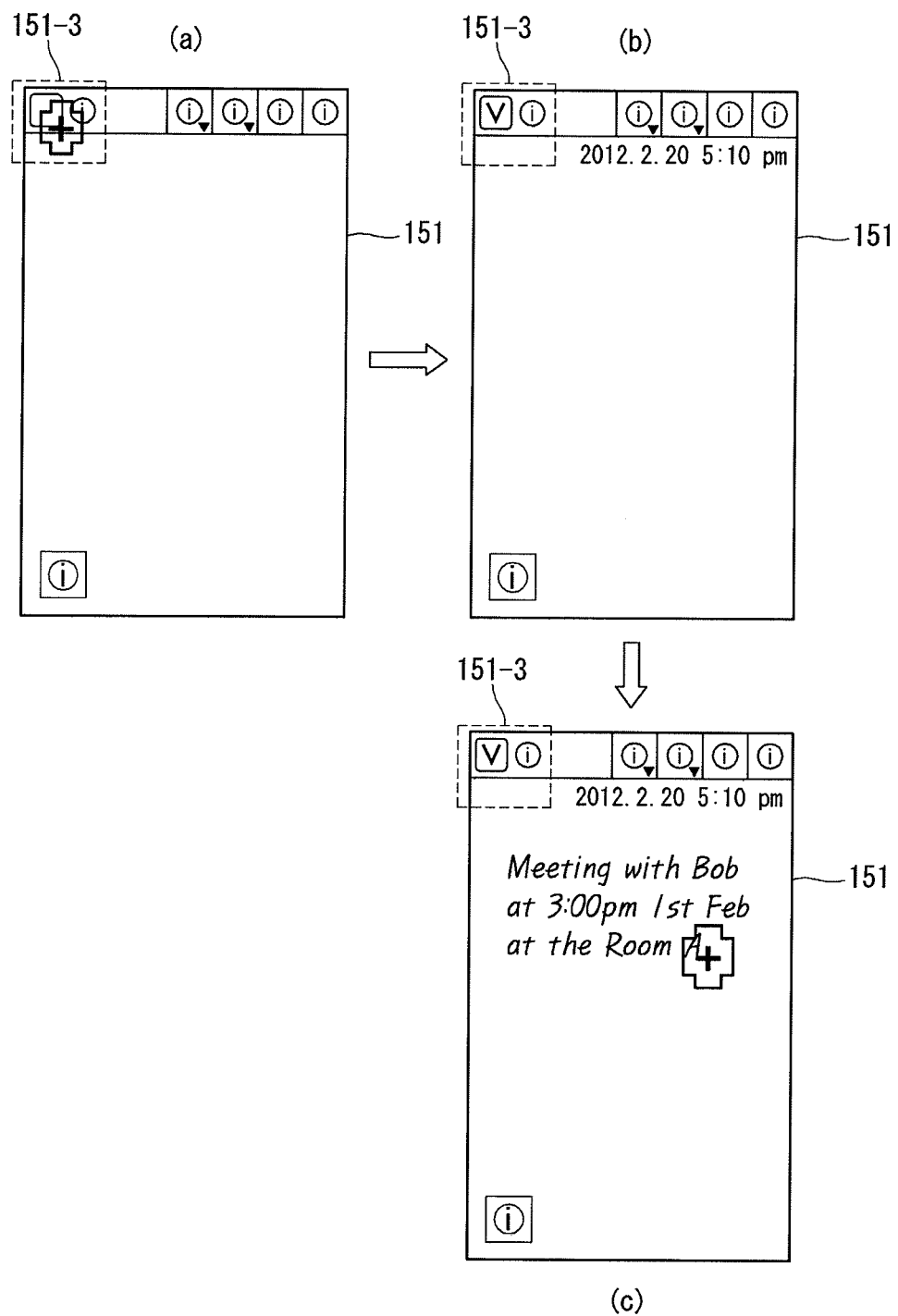
FIG. 76 is an example of including a capture image of a display screen of a touch screen as a background of a memo file while a handwriting input function is activated in a mobile terminal according to the present invention.

FIG. 76 is an example of including a capture image of a display screen of a touch screen 151 as a background of a memo file while a handwriting input function is activated in the mobile terminal 100 according to the present invention.

FIG. 76 illustrates a case where the user touches a selection area 151-3 meant for determining whether to include the capture image as a background of a memo file. Then, as shown in FIG. 76(b), the controller 180 of the mobile terminal 100 displays a mark of 'V' shape on a selection display box in the selection area 151-3, indicating that a function including the capture image as a background of the memo file has been activated. Then, as shown in FIG. 76(c), the user can perform handwriting input in a handwriting input area while the capture image of a display screen of a touch screen 151 is incorporated as a background. If the user re-touches the selection area 151-3, the controller 180 turns off the function and remove the mark of 'V' shape in the selection display box. Also, the controller 180 can display on the handwriting input screen time information corresponding to the time point at which the function has turned on.

Figure 77:
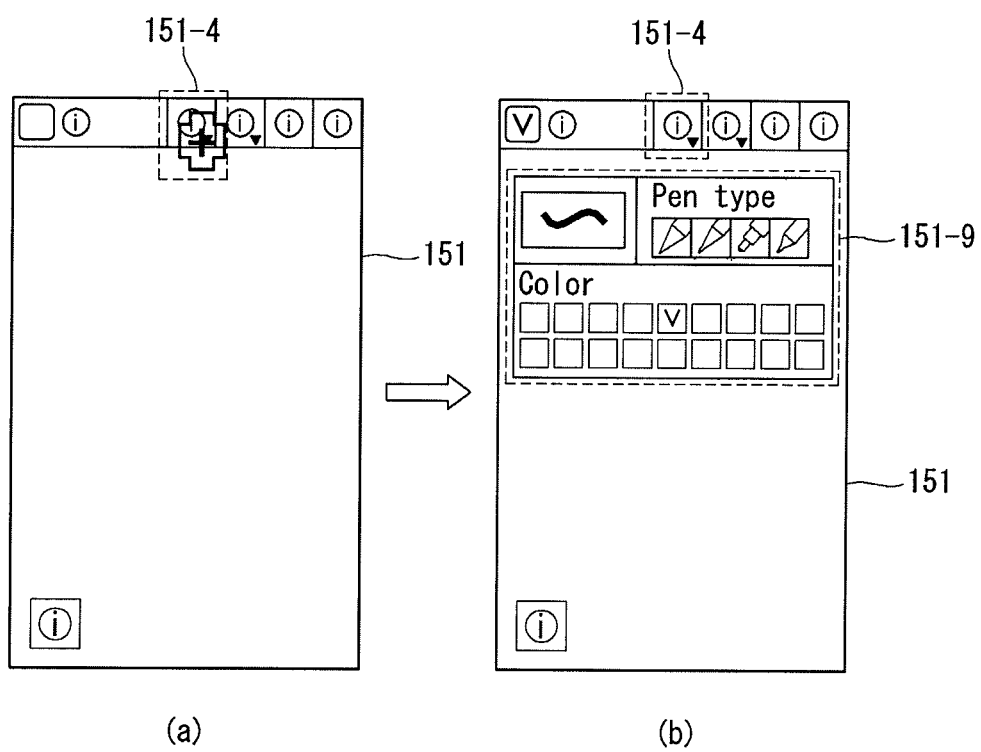
FIG. 77 illustrates a screen for setting related to a virtual pen used for displaying a trajectory of handwriting input while a handwriting input function is activated in a mobile terminal according to the present invention.

FIG. 77 illustrates a screen for setting related to a virtual pen used for displaying a trajectory of handwriting input while a handwriting input function is activated in the mobile terminal 100 according to the present invention.

FIG. 77(a) illustrates a case where the user touches a first icon 151-4 of a header area 151-1. Then, as shown in FIG. 77(b), the controller 180 of the mobile terminal 100 can display on a touch screen 151 a user interface 151-9 for setting a color and shape for the virtual pen. Then the user can choose a color and shape of the virtual pen by touching the user interface 151-9. If the user re-touches the first icon 151-4 or touches a handwriting input area other than the user interface 151-9 while in a state illustrated in FIG. 77(*b*), the controller 180 can convert the screen status of a touch screen 151 into that of FIG. 77(*a*).

FIG. 78 illustrates the types of virtual pens, thickness and transparency of each pen used for showing the trajectory of handwriting and shape and opacity of a virtual eraser provided by the mobile terminal 100 according to the present invention. It can be seen from FIG. 78 that the mobile terminal 100 can provide various types of virtual pens having different thickness or transparency from each other. Also, with reference to FIG. 78, the mobile terminal 100 provides a virtual eraser providing a function of erasing by using a circle of particular size. However, the virtual pen and eraser according to the present invention is not limited to the examples shown in FIG. 78.

Figure 79:
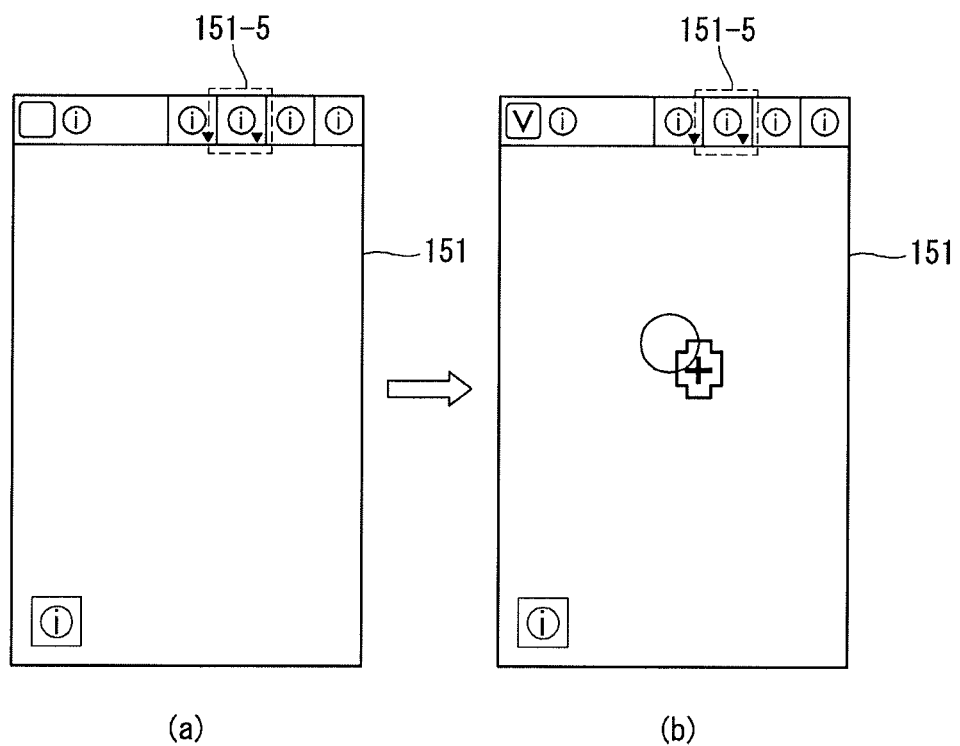
FIGS. 79 and 80 illustrate an example where an eraser function provided by a mobile terminal according to the present invention is performed.
Figure 80:
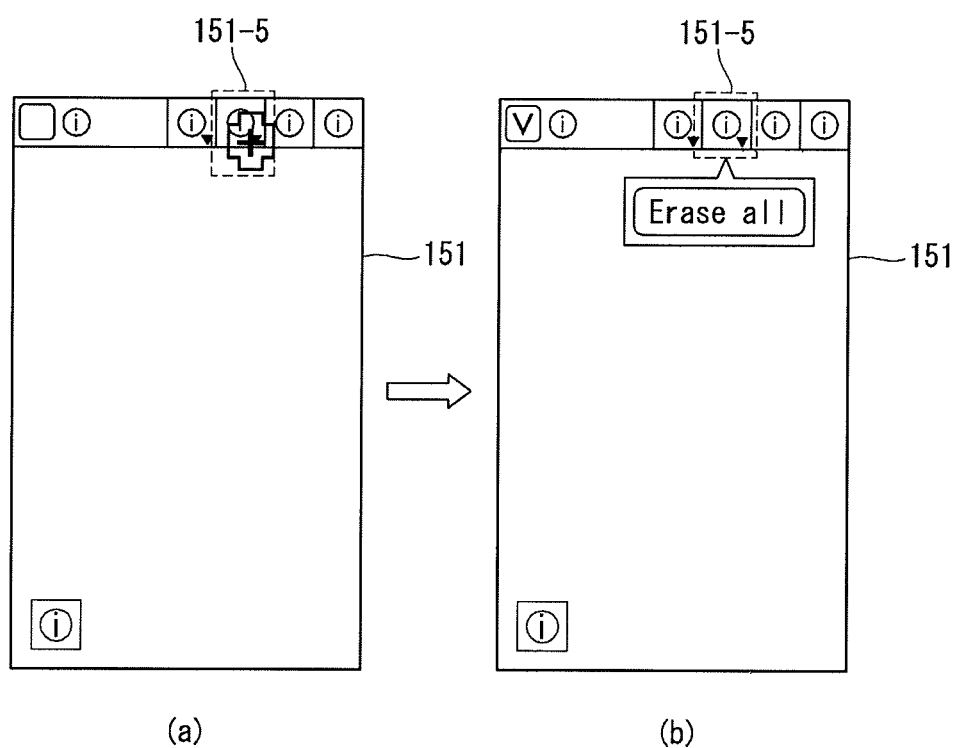

FIGS. 79 and 80 illustrate an example where an eraser function provided by the mobile terminal 100 according to the present invention is performed.

FIG. 79(*a*) illustrates a case where the user touches a second icon 151-5 for utilizing a virtual eraser. Then, as shown in FIG. 79(*b*), the controller 180 displays a circular area in a handwriting input area; if the user touches the circular area, the controller 180 can erase the handwriting input displayed inside the circular area. Though not shown in FIG. 79, the size of the circular area can be changed according to the user's touch and drag motion. Also, the shape of the area provided to perform the eraser function is not limited to the circle.

FIG. 80(*a*) illustrates a case where the user re-touches the second icon 151-5 while an eraser function is activated. Then, as shown in FIG. 80(*b*), the controller 180 can provide a user interface for deleting the whole handwriting input. If the user touches the user interface, the controller 180 can erase the whole handwriting input displayed on a handwriting input area.

Though not shown in FIG. 80, if the user presses a hardware back key or touches a handwriting input area outside of the user interface or re-touches the second icon 151-5, the controller 180 can convert the display status of the touch screen into that of FIG. 80(*a*).

Figure 81:
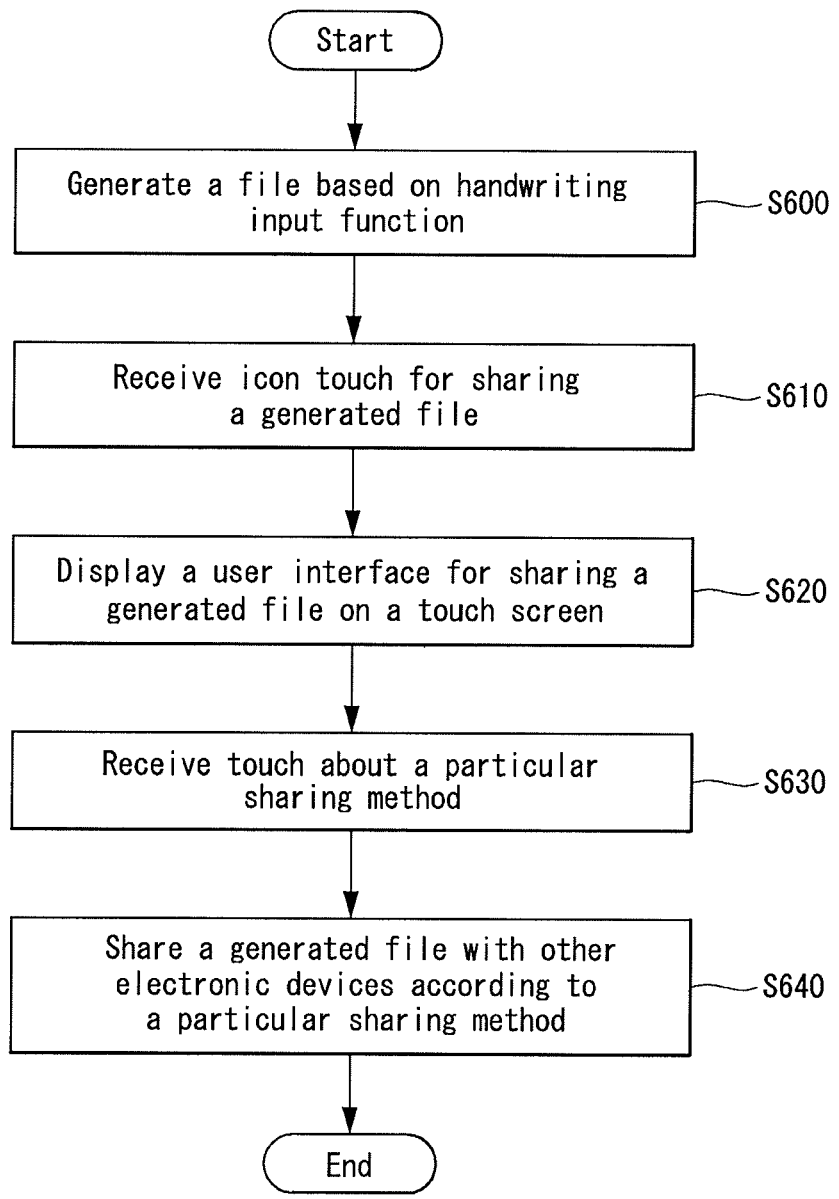
FIG. 81 is a flow diagram illustrating one example of a method for file sharing for a mobile terminal according to the present invention.

FIG. 81 is a flow diagram illustrating one example of a method for file sharing for the mobile terminal 100 according to the present invention. In what follows, the method for generating a memo file will be described with reference to related drawings.

A file is generated based on an activated handwriting input function S600. Next, a user's touch is received for sharing the file generated through a touch screen 151 with other electronic devices S610. Then, the controller 180 of the mobile terminal 100 displays on the touch screen 151 a user interface for sharing the generated file with other electronic devices S620.

Next, a touch for a particular sharing method among various sharing methods provided through the user interface is received S630 through the touch screen 151. Then, the controller 180 carries out the operation for sharing the generated file with the other electronic devices according to a particular sharing method selected S640. Depending on circumstances, the controller 180 may further provide a user interface for carrying out the particular sharing method through the touch screen 151.

Figure 82:
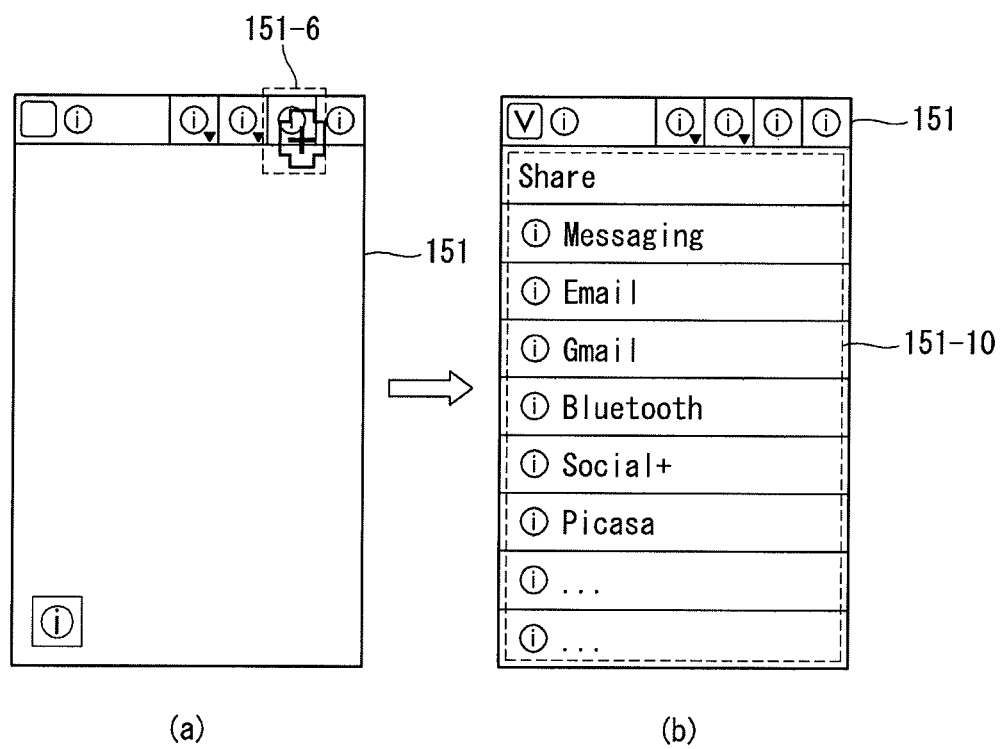
FIG. 82 illustrates one example of a user interface provided for sharing files according to a method for file sharing illustrated in FIG. 81.

FIG. 82 illustrates one example of a user interface provided for sharing files according to a method for file sharing illustrated in FIG. 81.

FIG. 82(*a*) illustrates a case where, after a file is generated based on a handwriting input function, the user touches a third icon 151-6 for carrying out a function for sharing the generated file with other electronic devices. Then, as shown in FIG. 82(*b*), the controller 180 displays on a touch screen 151 a user interface 151-10 for selecting a variety of methods for sharing the generated file with other electronic devices.

With reference to FIG. 82(*b*), the method for sharing a generated file can include a sharing method using short range wireless communication such as Bluetooth, a sharing method using a social network service, a sharing method using an e-mail service, etc. Meanwhile, if the generated file is shared through a messaging service or an e-mail service, the generated file can be shared with other electronic devices in the form of a write-up message or an attached file of an e-mail. However, a file sharing method performed in the mobile terminal 100 according to the present invention is not limited to the examples described above.

Figure 83:
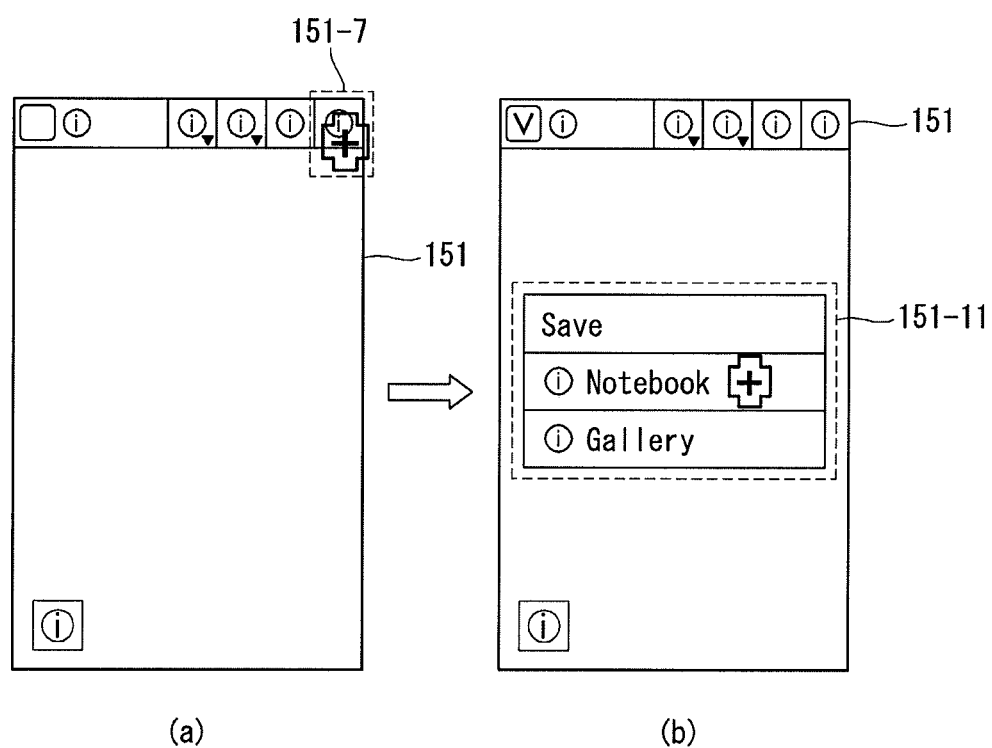
FIG. 83 illustrates one example of a procedure of storing a file generated based on a handwriting input function in a mobile terminal according to the present invention.

FIG. 83 illustrates one example of a procedure of storing a file generated based on a handwriting input function in the mobile terminal 100 according to the present invention.

FIG. 83(*a*) illustrates a case where, after a file is generated based on a handwriting input function, the user touches a fourth icon 151-7 for storing the generated file. Then, as shown in FIG. 83(*b*), the controller 180 can provide a user interface for selecting the type of application corresponding to data storage space in which the generated file is stored. As shown in FIG. 83(*b*), if the user selects a 'notebook' application, the controller 180 can store the generated file into a data storage area corresponding to the 'notebook' application.

Different from what are illustrated in FIG. 83, if the user touches the fourth icon 151-7 after a file is generated based on a handwriting input function, the controller 180 can store the generated file into predetermined data storage space without providing a user interface as shown in FIG. 83(*b*).

Also, the mobile terminal 100 according to the present invention can store the generated file into an external device connected to the mobile terminal 100 in a wired/wireless manner rather than store the generated file into data storage space prepared inside the mobile terminal 100. At this time, the user interface illustrated in FIG. 83(*b*) can further comprise the external device.

Figure 84:
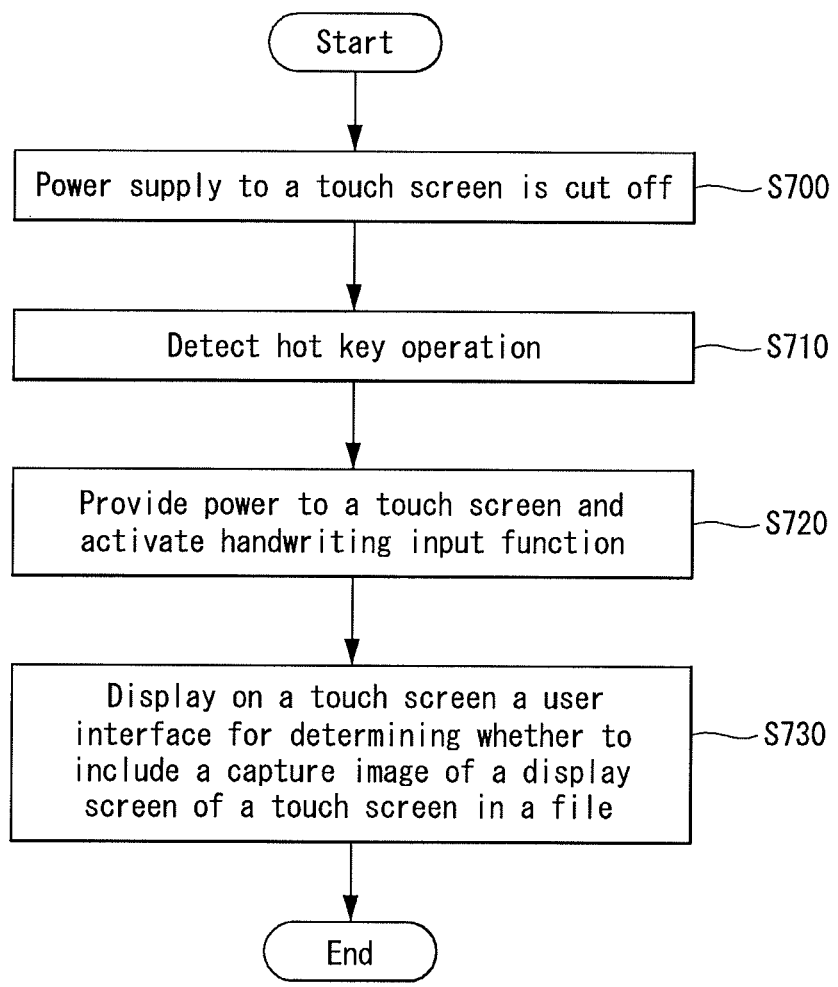
FIG. 84 is a flow diagram illustrating yet another example of a method for generating a memo file for a mobile terminal according to the present invention.

FIG. 84 is a flow diagram illustrating yet another example of a method for generating a memo file for the mobile terminal 100 according to the present invention. In what follows, the method for generating a memo file will be described with reference to related drawings.

Power supply to a touch screen 151 is cut off. While the touch screen staying in that state S700, the user operates a hot key arranged to activate handwriting input. Then, the controller 180 recognizes the hot key operation S710 and provides power to the touch screen 151 and activates handwriting input through the touch screen 151, S720.

Then, the controller 180 displays S730 a user interface on the touch screen 151, where the user interface is intended for determining whether to incorporate a capture image of a display screen of the touch screen 151 into a file to be generated. Then, the user can determine whether to incorporate the capture image into the file to be generated through the user interface and perform handwriting input and generate a file based on the handwriting input.

Figure 85:
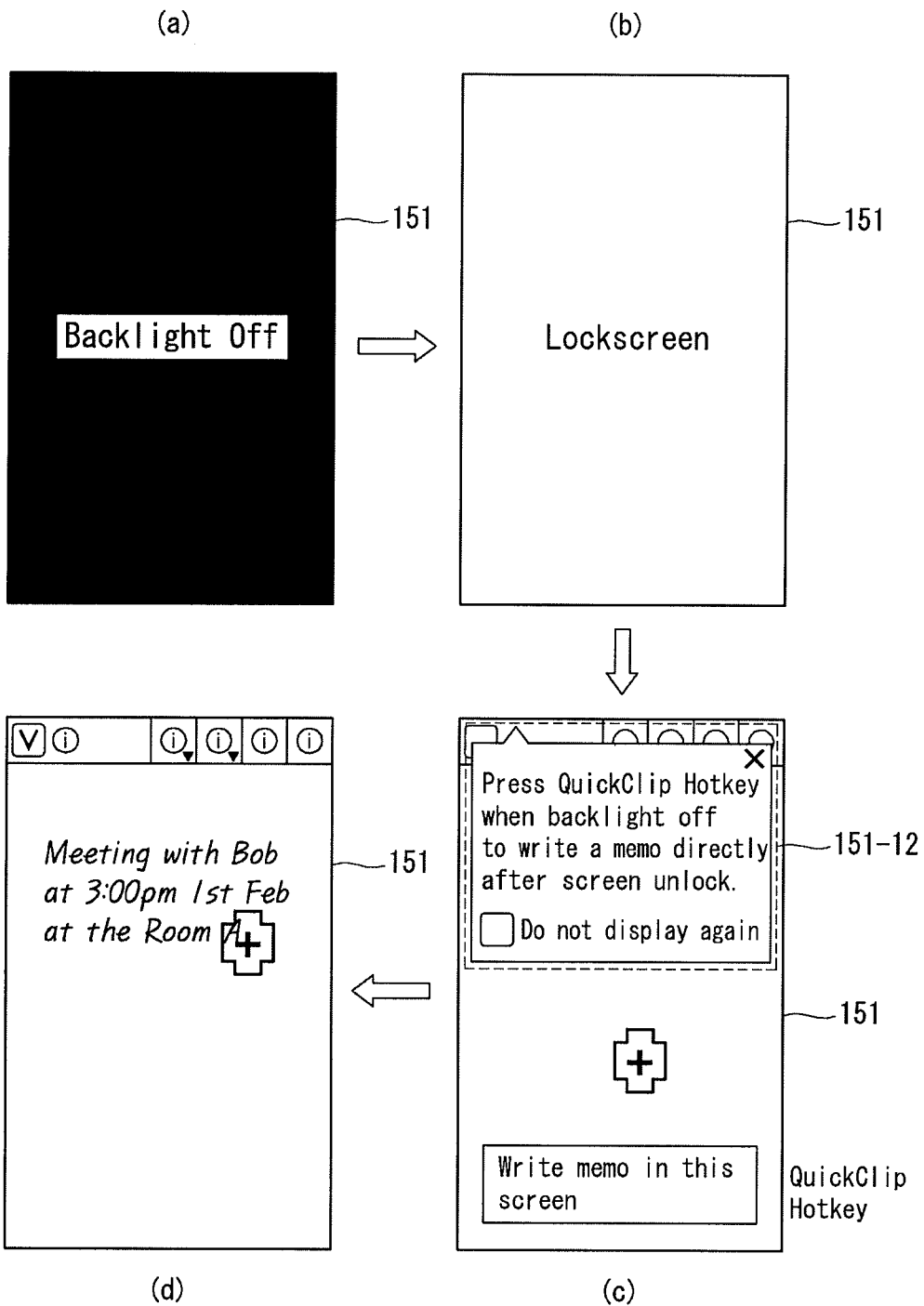
FIG. 85 illustrates a procedure of generating a memo file in a mobile terminal according to the present invention.

FIG. 85 illustrates a procedure of generating a memo file in the mobile terminal 100 according to the present invention.

FIG. 85(*a*) illustrates a case where the user operates a hot key meant for activating handwriting input while power supply to a touch screen 151 is cut off. Then, as shown in FIG. 85(*b*), the controller 180 of the mobile terminal 100 provides power to the touch screen 151 and switches the state of the mobile terminal 100 into a lock-screen state.

If the user releases a lock-screen state, the controller 180, as shown in FIG. 85(c), can display on a touch screen 151 a user interface indicating that a handwriting input function has been activated. As shown in FIG. 85(c), the user interface can include a selection area for the user interface not to be displayed repeatedly.

As shown in FIG. 85(d), the user can input handwriting into a handwriting input area and then generate a memo file after a predetermined time is passed after the user interface 151-12 is displayed or the user selects the selection area.

Different from what are illustrated in FIG. 85, if hot key operation is detected while power supply to the touch screen 151 is cut off, the controller 180 can provide power to the touch screen 151 and activate the handwriting input function in a lock-screen state. At this time, the controller 180 can display on the touch screen 151 a user interface for determining whether to use a capture image of a lock-screen display as a background of a memo file to be generated. This is intended to allow the user to determine whether to use a lock-screen as a background of a memo file because the lock-screen itself is considered to have low value as information as the lock-screen provides only simple information such as date, time, and the like, Also, the controller 180 can activate the handwriting function even if a hot key is operated in a lock-screen state. At this time, too, the controller 180 can display on the touch screen 151 a user interface to determine whether to use a capture image of the lock-screen display as a background of a memo file to be generated.

As described with reference to FIGS. 84 and 85, namely, the user of the mobile terminal 100 according to the present invention can quickly activate a handwriting input function by operating a hot key even in a state where power supply to the touch screen 151 is cut off or in a lock-screen state.

Figure 86:
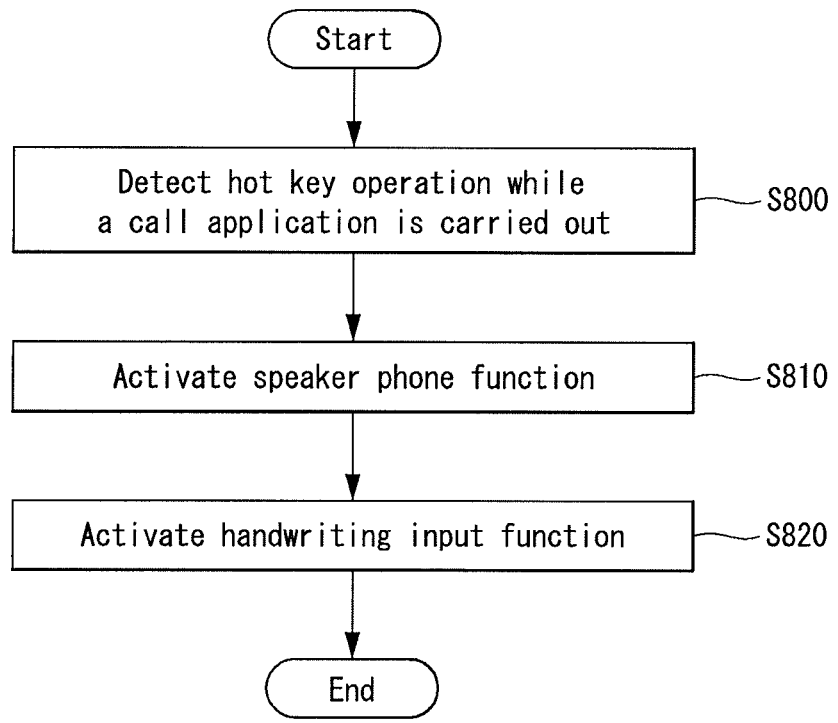
FIG. 86 is a flow diagram illustrating a different example of a method for generating a memo file in a mobile terminal according to the present invention.

FIG. 86 is a flow diagram illustrating a different example of a method for generating a memo file in the mobile terminal 100 according to the present invention. In what follows, the method for generating a memo file will be described with reference to related drawings.

A hot key operation is detected for activating a handwriting input function while a call application is running S800. Then, the controller 180 of the mobile terminal 100 activates S810 a speaker phone function of the mobile terminal 100 and activates S820 a handwriting input function through a touch screen 151. Then since the user can make a call by using a speaker phone function, handwriting input through the touch screen 151 can be performed easily.

Figure 87:
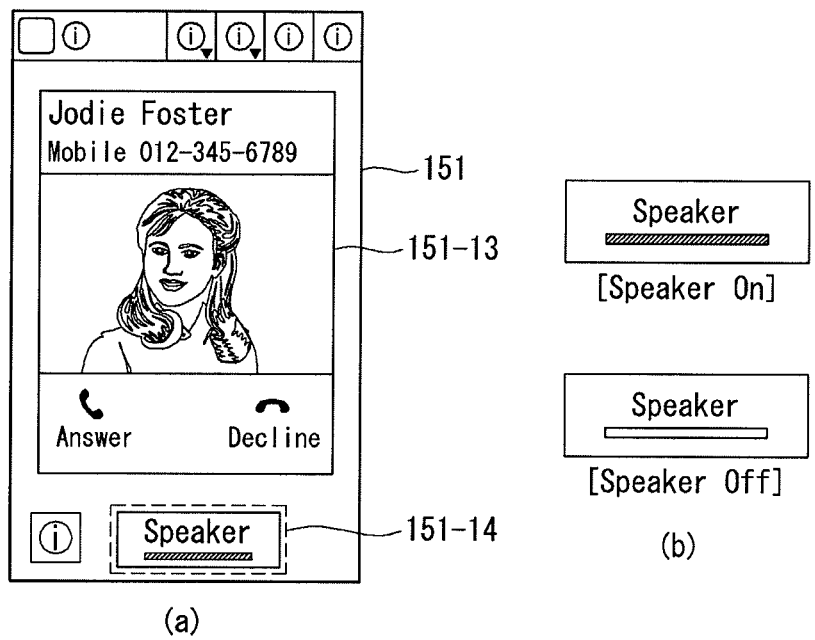
FIG. 87 illustrates a case where a speaker phone is activated for a mobile terminal of the present invention according to a method for generating a memo file illustrated in FIG. 86.

FIG. 87 illustrates a case where a speaker phone is activated for the mobile terminal 100 of the present invention according to a method for generating a memo file illustrated in FIG. 86.

Referring to FIG. 87(a), it can be seen that the controller 180 of the mobile terminal 100 displays on a touch screen 151 a user interface 151-14 indicating that the speaker phone function has been activated as well as call application related information 151-13. If the user touches the user interface 151-14, a speaker phone function can be deactivated. Then, the user interface 151-14 is turned into the state shown in the lower part of FIG. 87(b).

Figure 88:
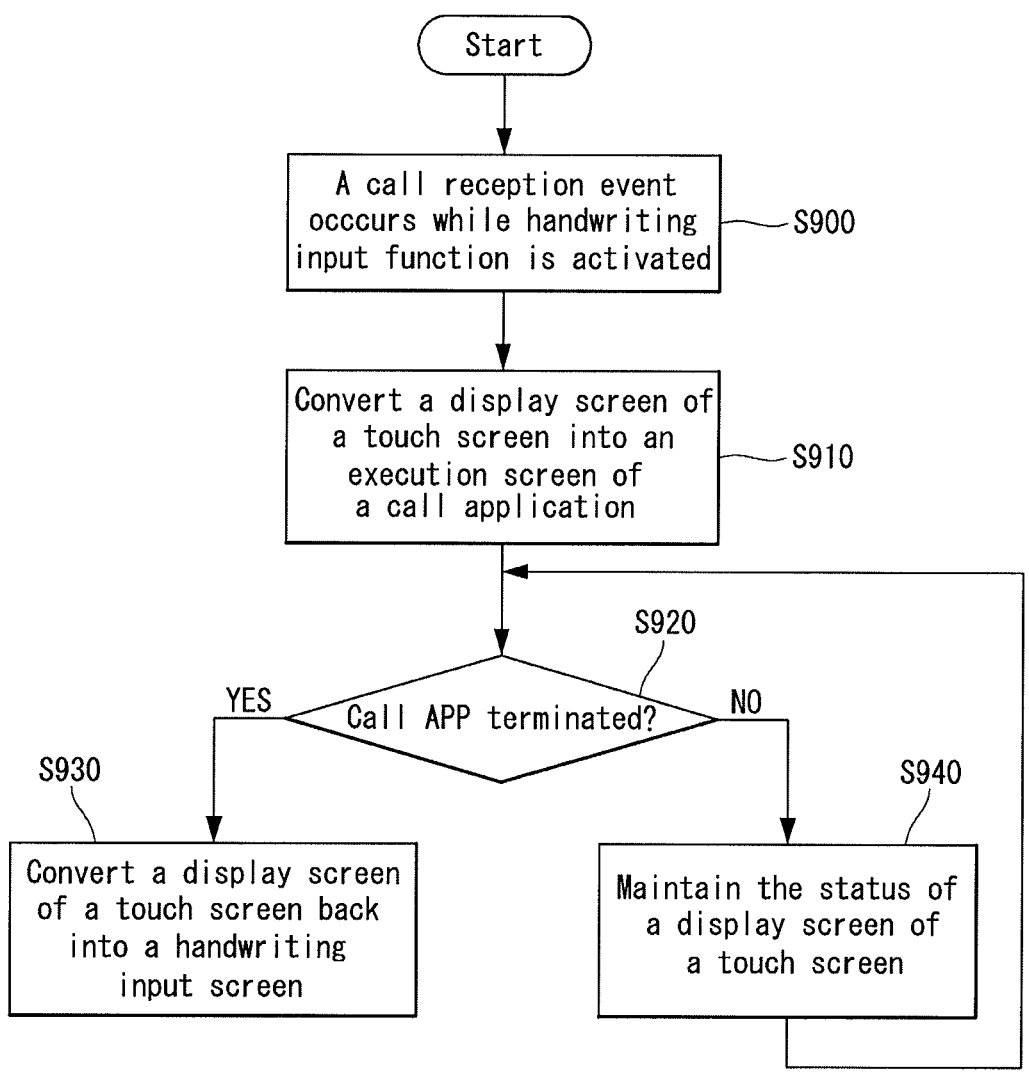
FIG. 88 is a flow diagram illustrating still another example of a method for generating a memo file in a mobile terminal according to the present invention.

FIG. 88 is a flow diagram illustrating still another example of a method for generating a memo file in the mobile terminal 100 according to the present invention. In what follows, the method for generating a memo file will be described with reference to related drawings.

A call reception event occurs while a handwriting input function is activated S900. Then, the controller 180 of the mobile terminal 100 converts a display screen of the touch screen 151 into an execution screen of the call application S910. It is because in general, the most fundamental and important function of a mobile terminal can be a phone call.

After a call application is executed, the controller 180 checks termination of the call application S920. If the call application is terminated, the controller 180 switches a display screen of the touch screen 151 back into a handwriting input screen S930. Then the user can continue to perform a procedure of generating a file by using a handwriting input function. However, if the call application is not terminated, the controller 180 maintains the state of a display screen of the touch screen 151 the same S940.

Figure 89:
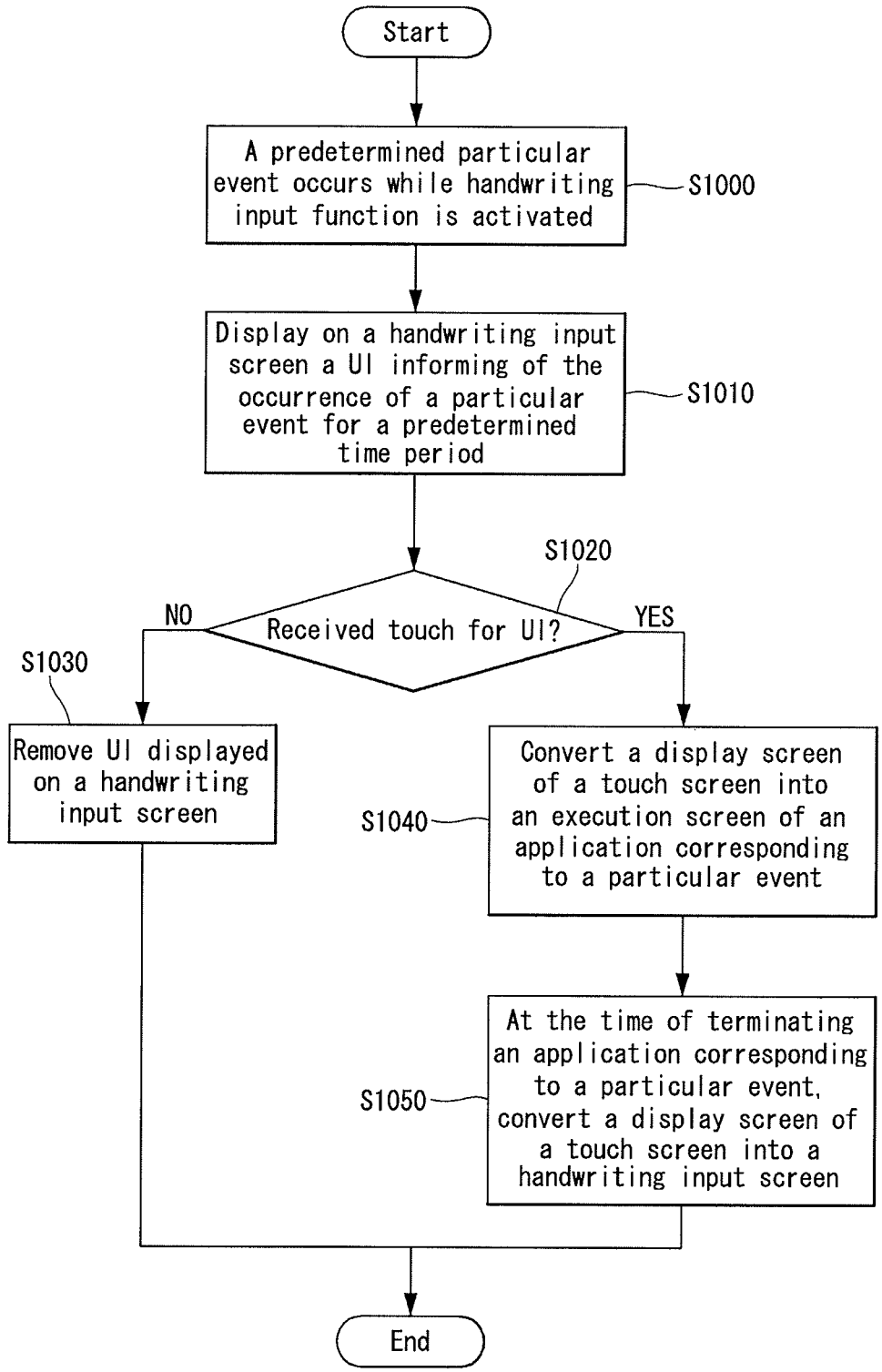
FIG. 89 is a flow diagram illustrating a further example of a method for generating a memo file in a mobile terminal according to the present invention.

FIG. 89 is a flow diagram illustrating a further example of a method for generating a memo file in the mobile terminal 100 according to the present invention. In what follows, the method for generating a memo file will be described with reference to related drawings.

A predetermined particular event occurs while a handwriting input function is activated S1000. Then, the controller 180 of the mobile terminal 100 additionally displays on the handwriting input screen a user interface notifying of the occurrence of the particular event for a predetermined time period S1010.

Next, the controller 180 checks whether a touch on the user interface is received within a predetermined time period S1020. If the user's touch for the user interface is not received within the predetermined time period, the controller 180 removes the user interface displayed on the handwriting input screen S1030.

However, if a touch for the user interface is received with the predetermined time period, the controller 180 switches a display screen of the touch screen 151 into an execution screen of an application corresponding to the particular event S1040. Next, if an application corresponding to the particular event is terminated, the controller 180 converts a display screen of the touch screen 151 into the handwriting input screen S1050. Then, the user can continue to perform a procedure of generating a file by using a handwriting input function.

Figure 90:
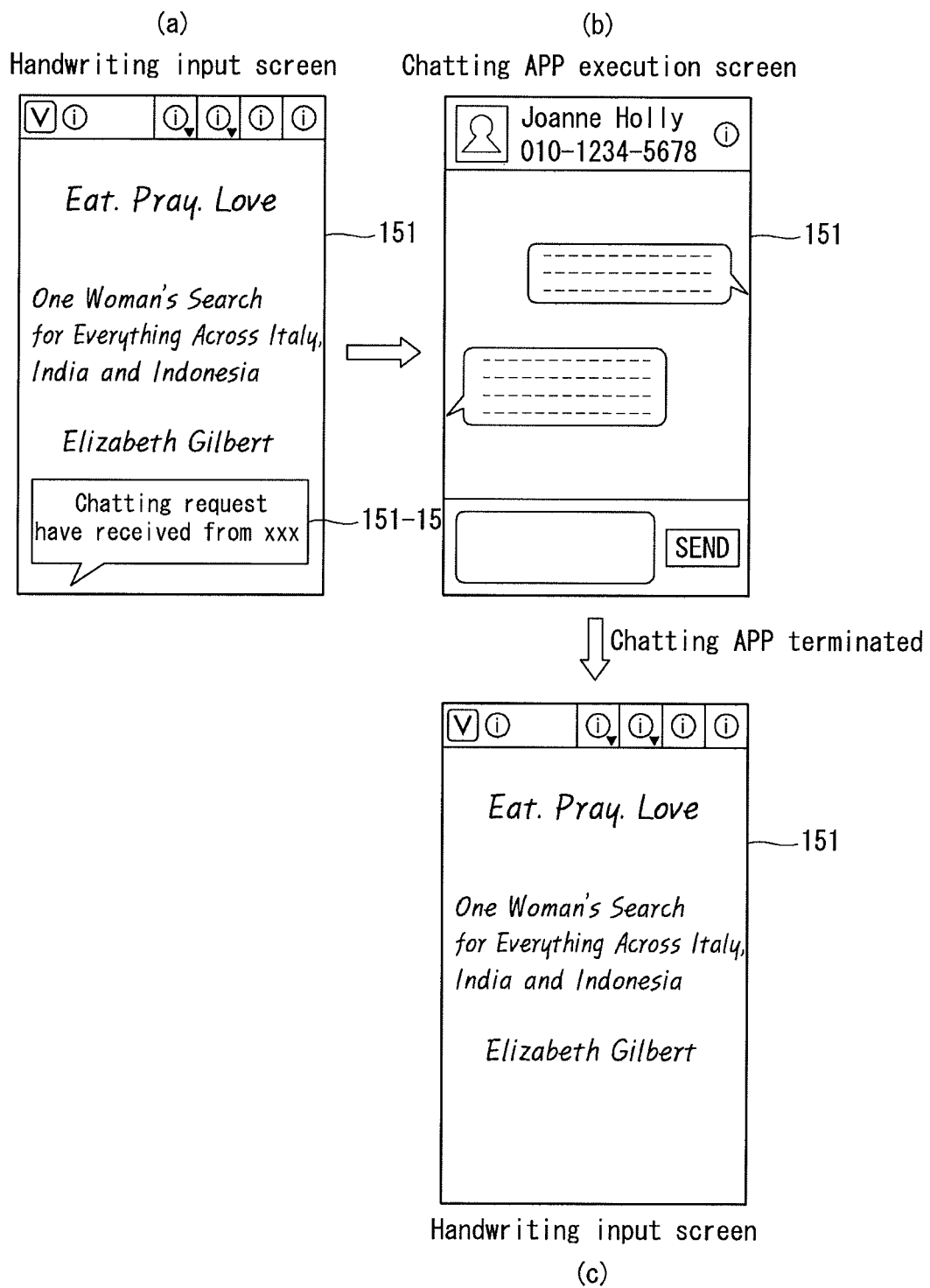
FIG. 90 illustrates a procedure through which a display screen of a touch screen is switched according to a method for generating a memo file illustrated in FIG. 89.

FIG. 90 illustrates a procedure through which a display screen of a touch screen 151 is switched according to a method for generating a memo file illustrated in FIG. 89.

FIG. 90(a) illustrates a case where, if the predetermined particular event of 'chatting request' is received while a handwriting input screen is displayed on a touch screen 151, a user interface 151-15 indicating reception of a chatting request is additionally displayed on a handwriting input screen displayed on the touch screen 151. FIG. 90(b) illustrates a case where, if the user's touch on the user interface 151-15 is received, a display screen on the touch screen 151 is converted from the handwriting input screen to an execution screen of a chatting application.

FIG. 90(c) illustrates a case where, if the chatting application is terminated, a display screen of the touch screen 151 is converted from an execution screen of the chatting application back into a handwriting input screen.

Meanwhile, a particular even applied to FIGS. 89 and 90 should be an event relatively less important than a handwriting input function. For example, the particular event can include a schedule alarm event or a message receive event, which has a relatively low priority for real-time processing, as well as an event of chatting request described in detail above. On the other hand, in the mobile terminal 100 according to the present invention, the user can change the particular event.

Figure 91:
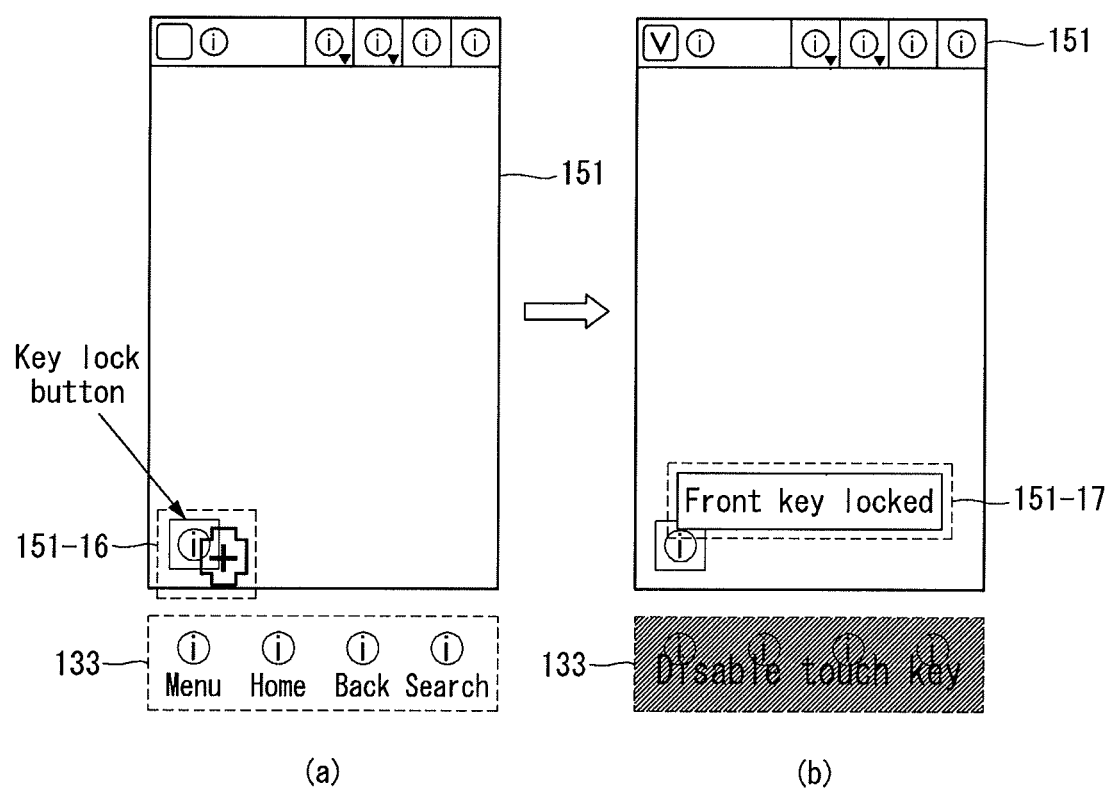
FIG. 91 illustrates a procedure of deactivating a hardware key prepared in the front of a mobile terminal according to the present invention while a handwriting input function is activated in the mobile terminal.

FIG. 91 illustrates a procedure of deactivating a hardware key prepared in the front of the mobile terminal 100 according to the present invention while a handwriting input function is activated in the mobile terminal 100.

FIG. 91(*a*) illustrates a case where, if a handwriting input function is activated in the mobile terminal 100, a user interface 151-16 is displayed on a handwriting input screen, the user interface being intended for deactivating hardware keys disposed in front of the mobile terminal 100. In FIG. 91(*a*), a plurality of hardware keys 133 are disposed in a lower part of a handwriting input screen.

The user touches the user interface 151-16 while in the state illustrated in FIG. 91(*a*). Then, the controller 180 of the mobile terminal 100, as shown in FIG. 91(*b*), can deactivate the plurality of hardware keys 133 and additionally display on the handwriting input screen a user interface 151-17 indicating that the plurality of hardware keys 133 have been deactivated. Also, the controller 180 can display the user interface 151-17 on a handwriting recognition screen for a predetermined time period.

Meanwhile, hardware keys disposed in front of the mobile terminal 100 can include keys of hardware button type and hardware keys operating based on touch input. However, the scope of the present invention is not limited to the above description.

Figure 92:
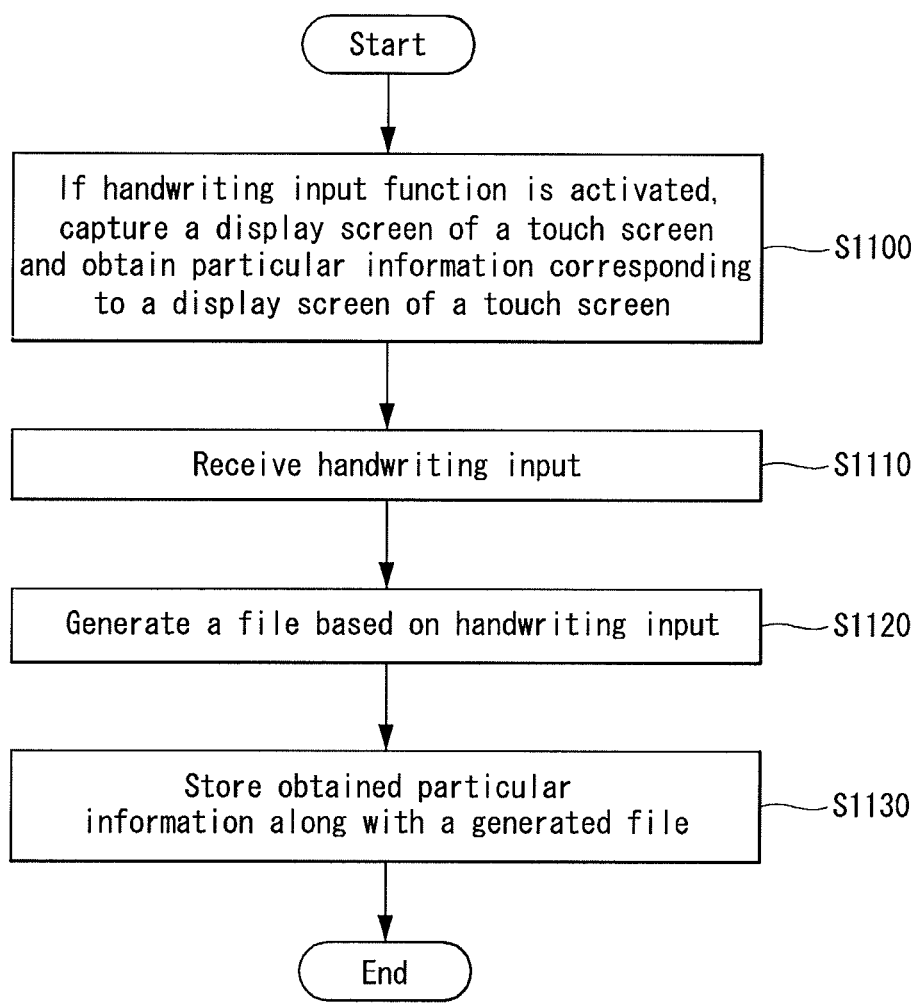
FIG. 92 is a flow diagram illustrating yet another example of a method for generating a memo file in a mobile terminal according to the present invention.

FIG. 92 is a flow diagram illustrating yet another example of a method for generating a memo file in the mobile terminal 100 according to the present invention. In what follows, the method for generating a memo file will be described with reference to related drawings.

If a handwriting input function is activated due to the user's hot key operation, the controller 180 captures a display screen of a touch screen 151 and obtains particular information corresponding to a display screen of the touch screen 151, S1100. Here, particular information corresponding to the display screen may include attribute information of the display screen. For example, particular information corresponding to the display screen can include URL (Uniform Resource Locator) of a particular webpage displayed on the touch screen 151.

Also, information corresponding to the display screen may be the information extracted from the information displayed on the display screen. For example, the extracted information may include a phone number, e-mail address, etc. displayed on the display screen. The type of information extracted from the display screen can be determined according to which application's execution screen corresponds to the display screen.

Handwriting input of the user is received through a handwriting input screen of the touch screen 151, S1110. Then the controller 180 generates a file based on the received handwriting input S1120 and stores the obtained information in a storage unit 160 together with the generated file S1130.

Figure 93:
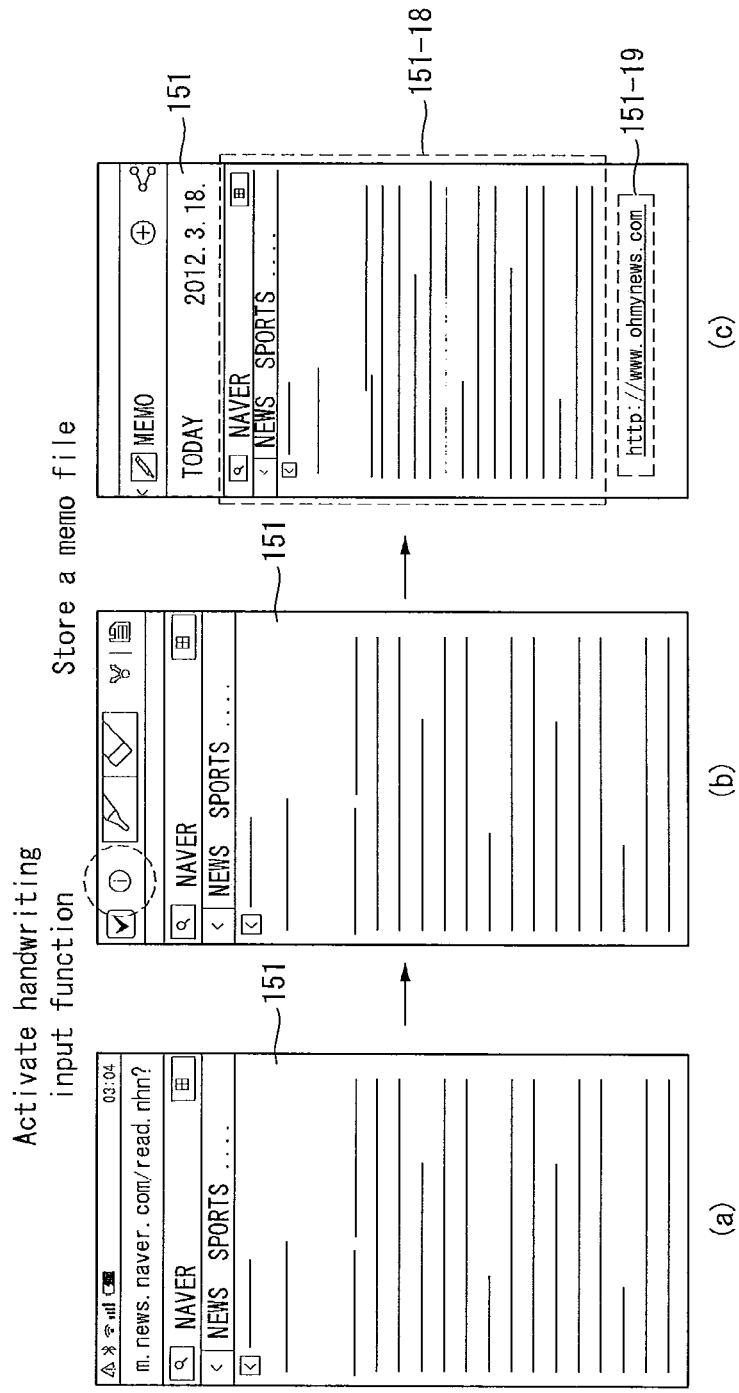
FIG. 93 illustrates one example of a procedure of storing a file generated through a handwriting input screen according to a method for generating a memo file illustrated in FIG. 92.

FIG. 93 illustrates one example of a procedure of storing a file generated through a handwriting input screen according to a method for generating a memo file illustrated in FIG. 92.

A handwriting input function is activated while in the state illustrated in FIG. 93(*a*) where a web browsing screen is displayed on a touch screen 151. Then, the controller 180, as shown in FIG. 93(*b*), activates a handwriting input function and captures the web browsing screen and obtains particular information of "URL of the web browsing screen" from the web browsing screen.

Next, as shown in FIG. 93(*b*), the user touches an icon (an icon within a dotted circle) for storing a generated file. Then, as shown in FIG. 93(*c*), the controller 180 stores a capture image 151-18 and URL 151-19 of the web browsing screen in a memo application.

Figure 94:
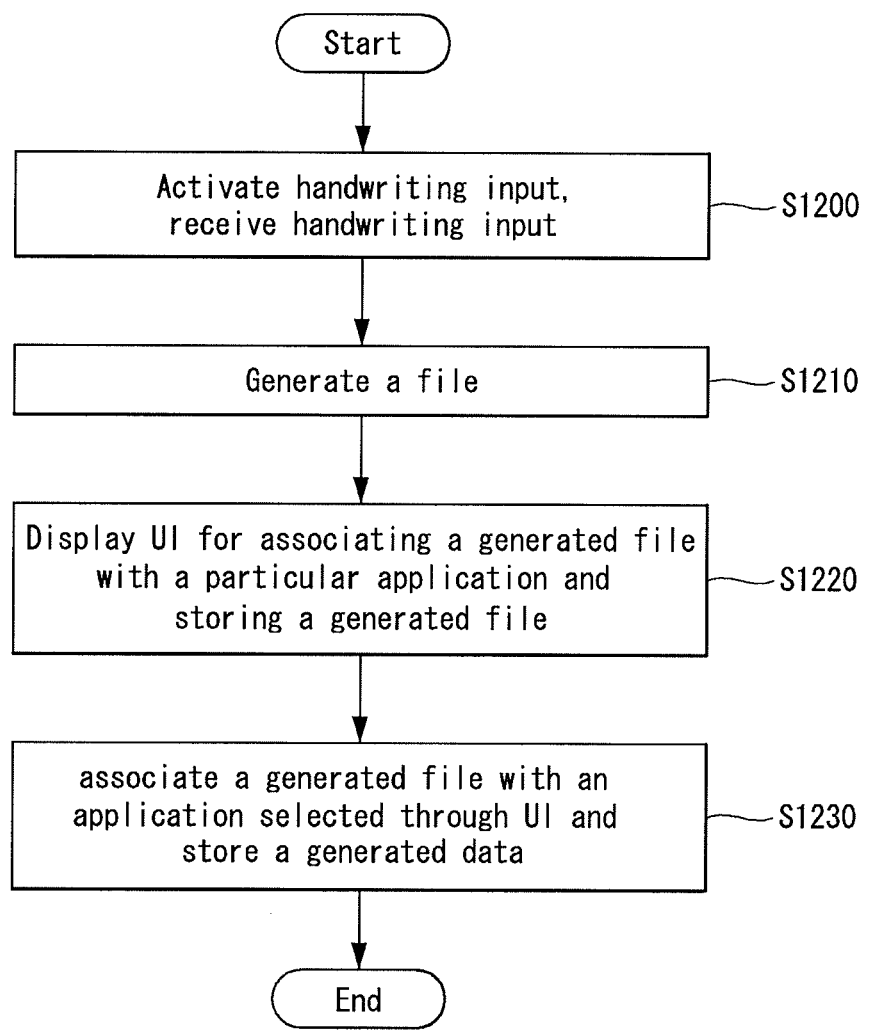
FIG. 94 is a flow diagram illustrating yet another example of a method for generating a memo file in a mobile terminal according to the present invention.

FIG. 94 is a flow diagram illustrating yet another example of a method for generating a memo file in the mobile terminal 100 according to the present invention. In what follows, the method for generating a memo file will be described with reference to related drawings.

Handwriting input is received through a handwriting input screen while a handwriting input function is activated S1200. Then, the controller 180 generates a memo file based on the received handwriting input S1210 and displays on a touch screen 151 a user interface for associating the generated memo file with a particular application and storing the generated file S1220. Then, the controller 180 associates the generated file in with an application selected through the user interface and stores the generated file S1230. Meanwhile, a particular application can be an application corresponding to a display screen of a touch screen 151 or an application predetermined by an application associated at the time of carrying out a handwriting input function.

Figure 95:
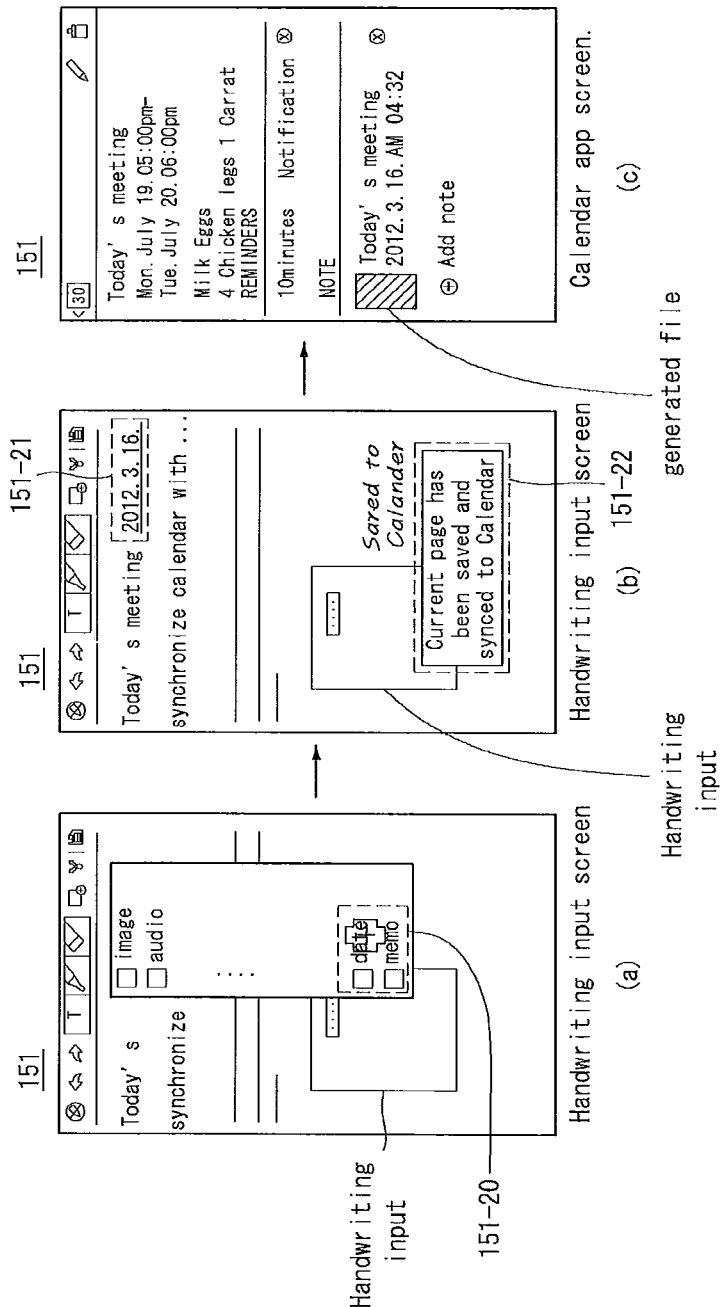
FIG. 95 illustrates a procedure of storing a generated memo file in conjunction with a calendar application according to a method for generating a memo file illustrated in FIG. 94.

FIG. 95 illustrates a procedure of storing a generated memo file in conjunction with a calendar application according to a method for generating a memo file illustrated in FIG. 94.

FIG. 95(*a*) illustrates a case where a memo file is generated based on handwriting input received through a handwriting input screen and a user interface 151-20 for storing the generated memo file in conjunction with a particular application is displayed and the user selects a calendar application from the user interface 151-20.

Then, as shown in FIG. 95(*b*), the controller 180 displays on a touch screen 151 the time at which the user's selection has been made 151-21. The controller also displays a user interface 151-22 indicating that the generated memo file has been stored in conjunction with a calendar application. FIG. 95(*c*) illustrates a case where the generated memo file is stored at the date at which the user's selection is made in conjunction with the calendar application.

Figure 96:
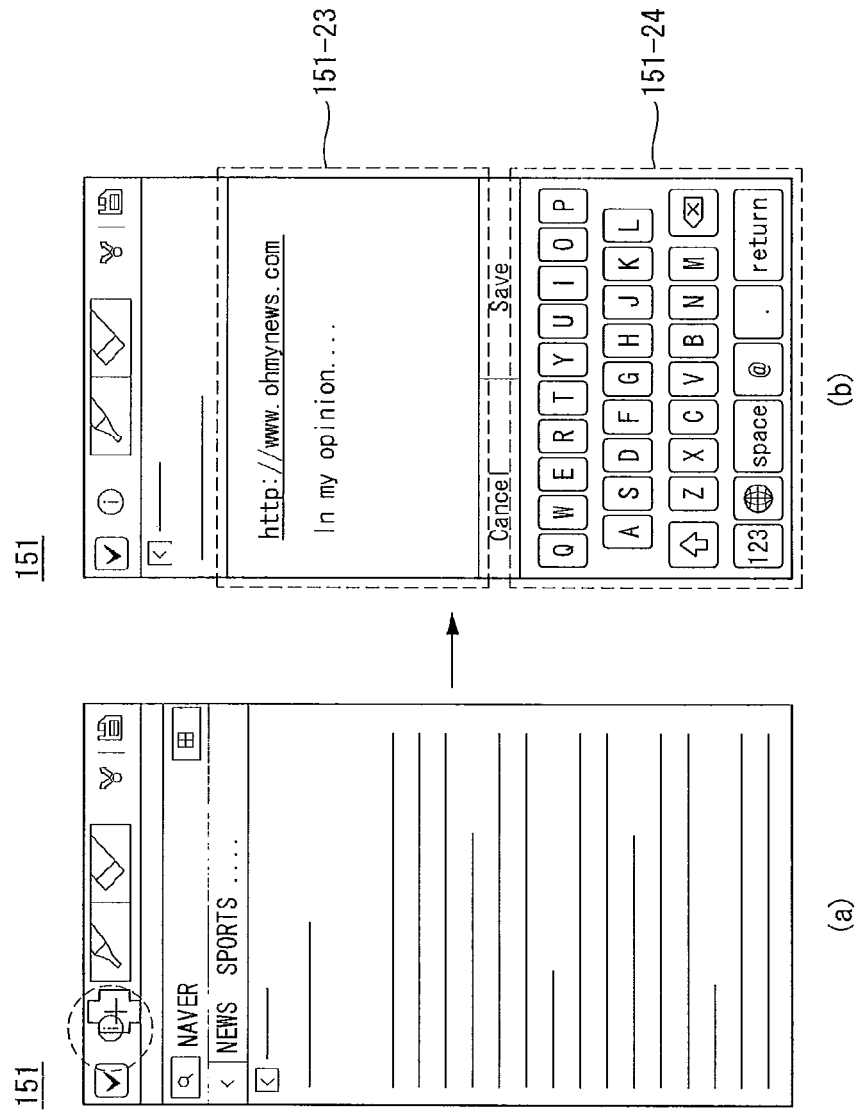
FIG. 96 illustrates a case where a virtual keyboard for generating a memo file in a mobile terminal according to the present invention is provided.

FIG. 96 illustrates a case where a virtual keyboard for generating a memo file in the mobile terminal 100 according to the present invention is provided.

FIG. 96(*a*) illustrates a case where, if the user operates a particular hot key, a web browsing screen displayed on a touch screen 151 is captured and the user touches a particular icon while a memo file generation function is activated. Then, as shown in FIG. 96(*b*), the controller 180 displays a virtual keyboard 151-24 for the user's character input on a touch screen 151 and displays an area 151-23 for displaying characters input through the virtual keyboard 151-24 on the touch screen 151. It should be noted that the controller 180 can extract URL corresponding to the web browsing screen and display the extracted URL additionally on the area 151-23.

Figure 97:
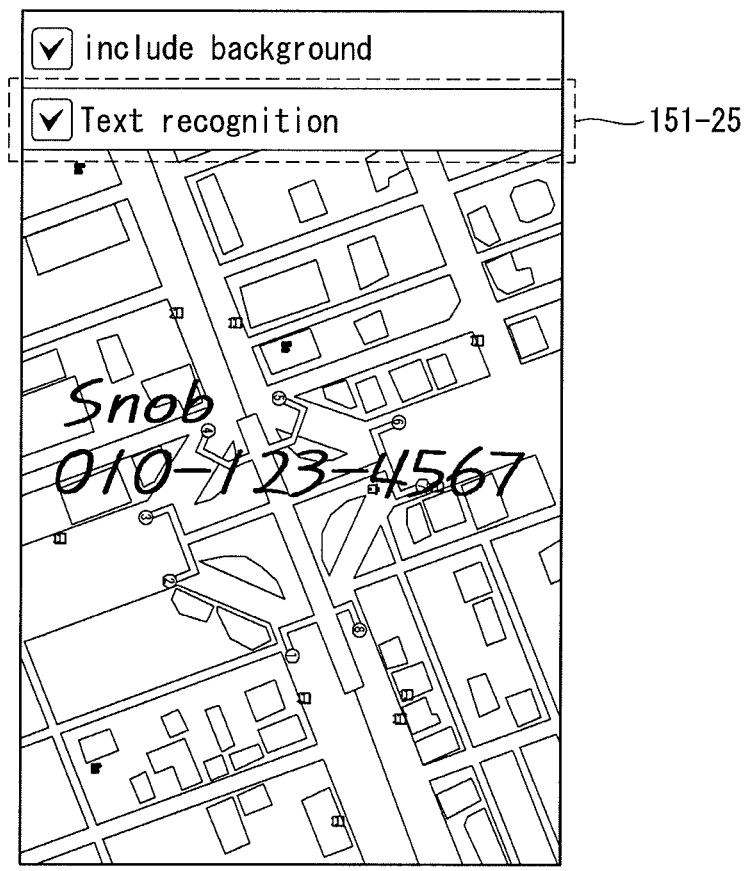
FIG. 97 illustrates a case where a character recognition function is applied to handwriting input received when a handwriting input function is activated in a mobile terminal according to the present invention.

FIG. 97 illustrates a case where a character recognition function is applied to handwriting input received when a handwriting input function is activated in the mobile terminal 100 according to the present invention.

FIG. 97 illustrates a case where the controller 180 provides a user interface 151-25 for determining whether to activate a character recognition function against received handwriting input through a touch screen 151. By using the character recognition function, the controller 180 can generate a file including text recognized based on the received handwriting input as well as a file including an image corresponding to the received handwriting input.

Figure 98:
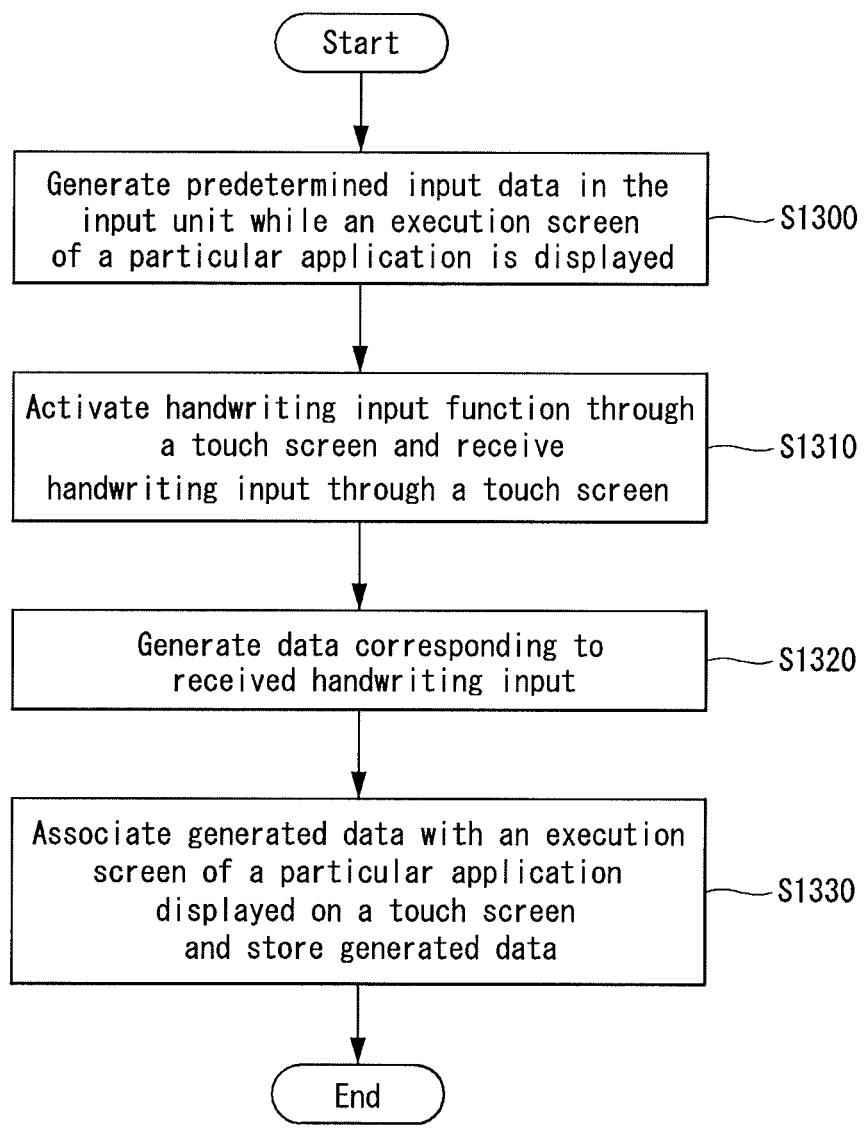
FIG. 98 is a flow diagram illustrating one example of a method for utilizing handwriting input for a mobile terminal according to the present invention.

FIG. 98 is a flow diagram illustrating one example of a method for utilizing handwriting input for the mobile terminal 100 according to the present invention. In what follows, the method for generating a memo function will be described with reference to related drawings.

Predetermined input data are generated through an input unit 116 while an execution screen of a particular application is displayed on a touch screen 151, S1300. Then, the controller 180 of the mobile terminal 100 activates a handwriting input function through the touch screen 151 and receives handwriting input through the touch screen 151, S1310.

Then, the controller 180 generates data corresponding to the received handwriting input S1320 and associates the generated data with an execution screen of the particular application displayed on the touch screen 151 and stores the generated data, S1330.

Figure 99:
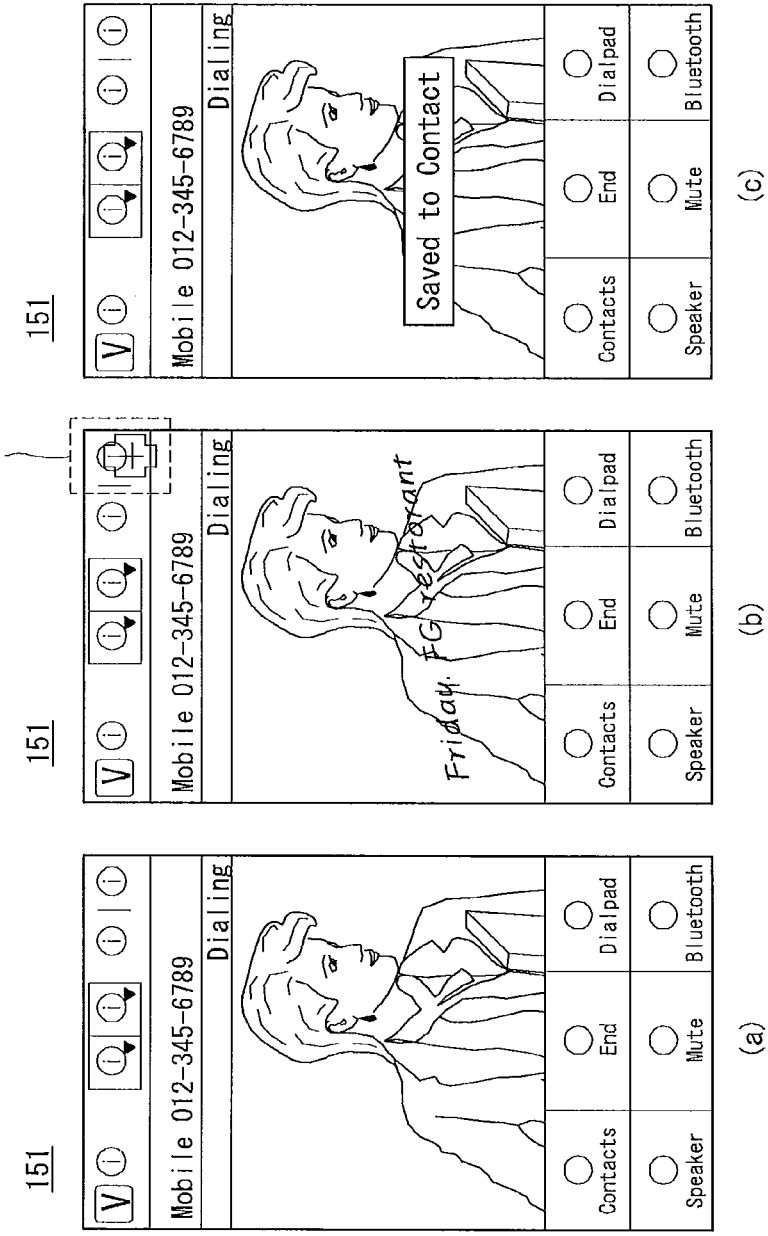
FIG. 99 illustrates a procedure of storing a file generated based on handwriting history in conjunction with an execution screen of a particular application displayed on a touch screen according to a method for utilizing handwriting input illustrated in FIG. 98.

FIG. 99 illustrates a procedure of storing a file generated based on handwriting history in conjunction with an execution screen of a particular application displayed on a touch screen 151 according to a method for utilizing handwriting input illustrated in FIG. 98

FIG. 99(*a*) illustrates a case where a handwriting input function is activated while a call is transmitted to a particular person as a call application is performed. FIG. 99(*b*) illustrates a case where the user inputs handwriting through a handwriting input function and touches a fourth icon 151-7 for generating data corresponding to the handwriting input. Then the controller 180, as shown in FIG. 99(*c*), can store data generated based on handwriting input as information corresponding to the particular person.

FIG. 100 illustrates a case where data stored in response to a particular person according to a procedure illustrated in FIG. 99 are displayed on a touch screen 151 at the time of executing a call application for the particular person.

With reference to FIG. 100(*b*), if a call origination is attempted to the particular person, the controller 180 displays data 151-26 pre-stored for the particular person on an execution screen of the call application. It should be noted that FIG. 100(*a*) represents an execution screen of a call application when pre-stored data do not exist for the particular person.

According to the description provided with reference to FIGS. 99 and 100, the controller 180 can store data generated based on a handwriting input function activated in an execution screen of a call application for the particular person in conjunction with the particular person who is an execution object of the call application.

Figure 101:
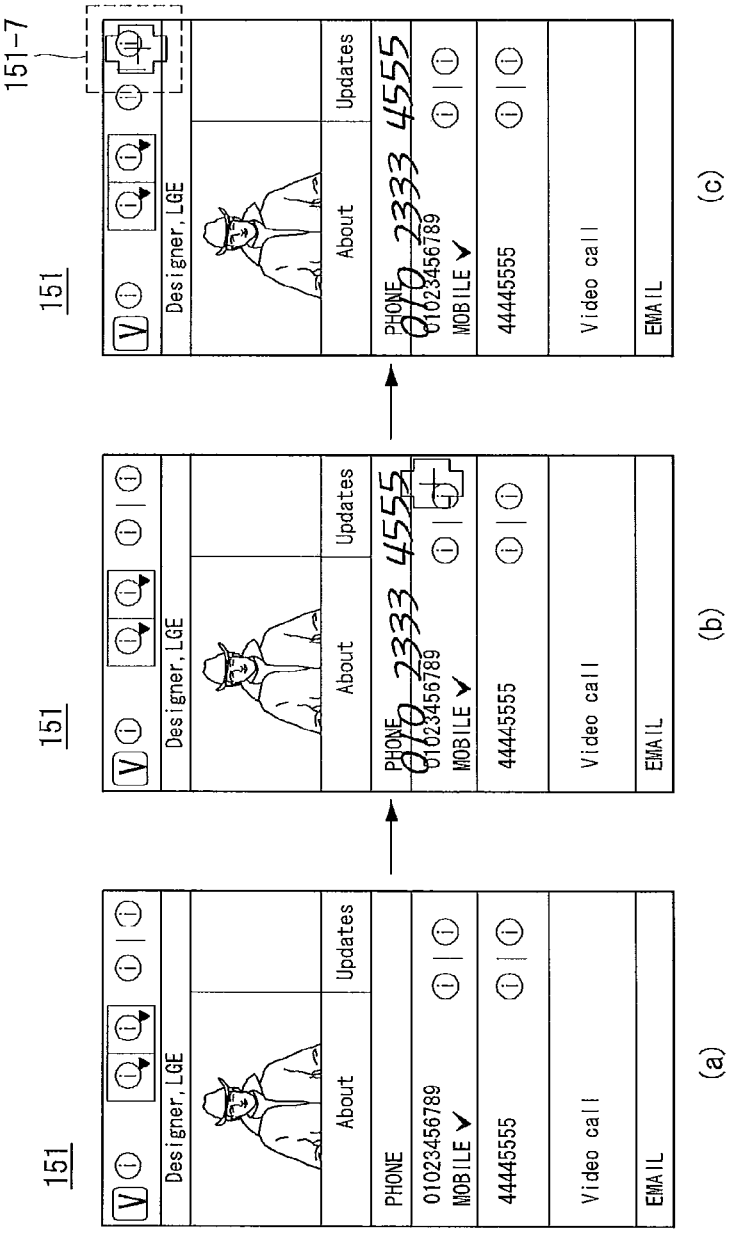
FIGS. 101 and 102 illustrate another example of a procedure of storing data generated based on handwriting input according to a method for utilizing handwriting input illustrated in FIG. 98 in conjunction with an execution screen of a particular application displayed on a touch screen.
Figure 102:
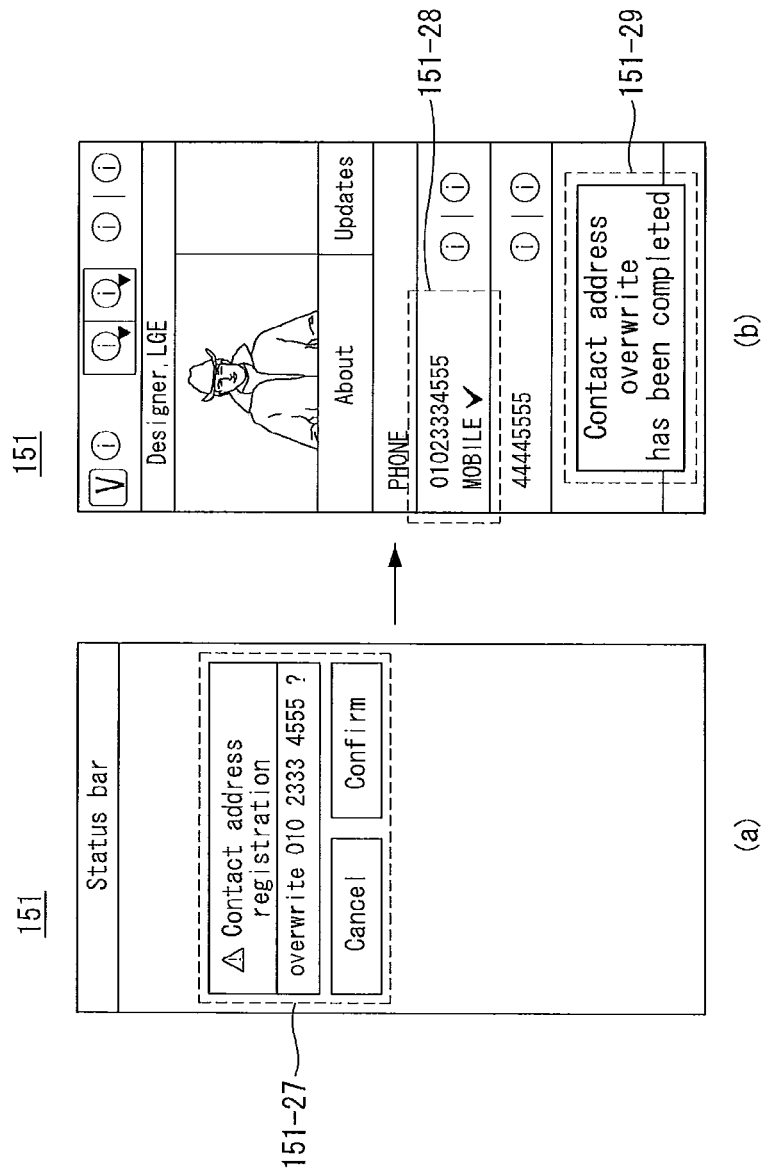

FIGS. 101 and 102 illustrate another example of a procedure of storing data generated based on handwriting input according to a method for utilizing handwriting input illustrated in FIG. 98 in conjunction with an execution screen of a particular application displayed on a touch screen 151.

FIGS. 101(*a*) and (*b*) illustrate a case where a handwriting input function is activated while an execution screen of a contact application is displayed on a touch screen 151 and the user inputs handwriting in the handwriting input area where contact information about a particular person is displayed in the background.

FIG. 101(*c*) illustrates a case where the user touches an icon 151-7 for generating data based on handwriting input while handwriting input is applied in the handwriting input area. Then, as shown in FIG. 102(*a*), the controller 180 can display on a touch screen 151 a user interface 151-27 inquiring whether to overwrite the mobile phone number stored already for the particular person with a mobile phone number recognized after character recognition process against the handwriting input.

The user touches a 'confirm' button while in the state illustrated in FIG. 102(*a*). Then, the controller 180 can overwrite the existing mobile phone number of the particular person with a mobile phone number recognized based on the handwriting input and display a user interface 151-29 informing of the result.

According to the description provided with reference to FIGS. 101 and 102, the controller 180 can store the data generated based on a handwriting input function activated in an execution screen of a contact application for the particular person in conjunction with a mobile phone number of the particular person displayed by the contact application. In other words, the controller 180, if a character recognition result for handwriting input matches the format of particular input data of a contact application, can store the character recognition result as particular input data corresponding to the particular person.

Figure 103:
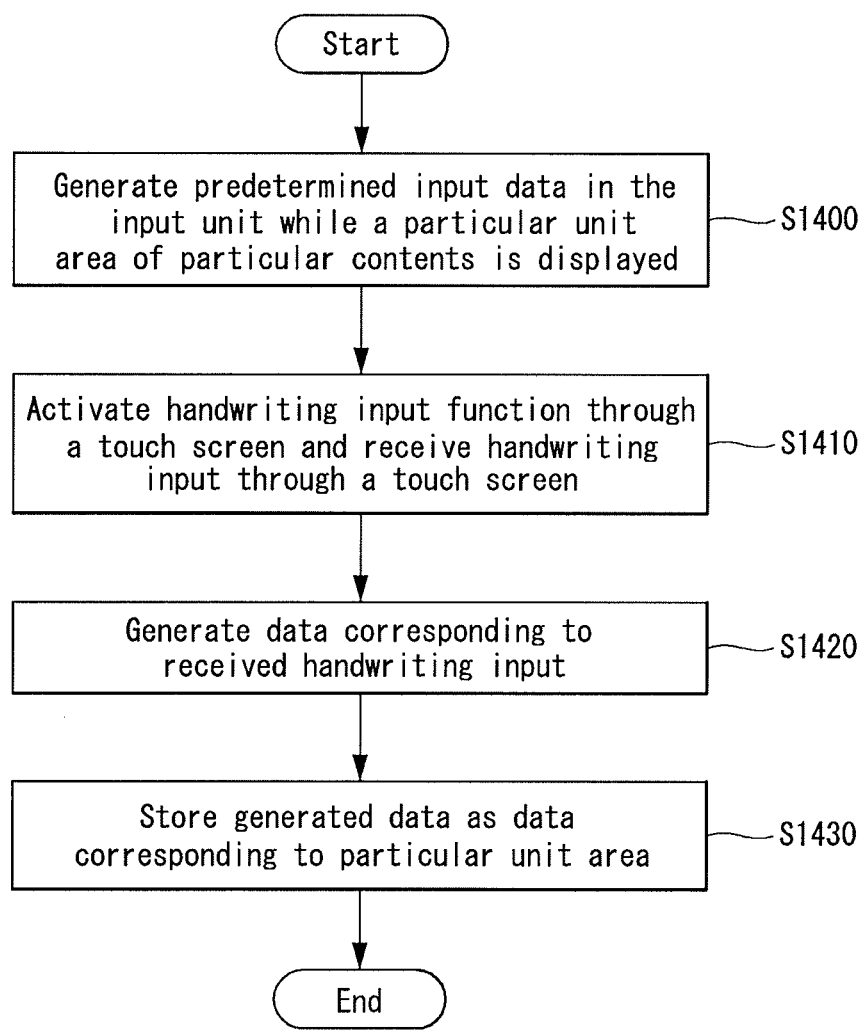
FIG. 103 is a flow diagram illustrating a different example of a method for utilizing handwriting input for a mobile terminal according to the present invention.

FIG. 103 is a flow diagram illustrating a different example of a method for utilizing handwriting input for the mobile terminal 100 according to the present invention. In the following, the method for utilizing handwriting input will be described with reference to related drawings.

While a particular unit area of particular contents comprising a plurality of unit areas is displayed on a touch screen 151, particular input data predetermined through the input unit 116 are generated S1400. As described above, the particular input data can be generated based on a predetermined hot key operation.

Meanwhile, the particular contents may be e-book contents comprising a plurality of pages. In this case, the unit area of particular contents may be a unit page comprising the e-book contents. Also, the particular contents can be a text document consisting of multiple pages. In this case, the unit area of particular contents may be a unit page comprising the text document. However, in the present invention, particular contents and a particular unit area thereof are not limited to the examples described above.

If the predetermined input data are generated, the controller 180 activates handwriting input function through the touch screen 151 and receives handwriting input through the touch screen 151, S1410. Then, the controller 180 generates data corresponding to the received handwriting input S1420 and stores the generated data as data corresponding to the particular unit area S1430.

Figure 104:
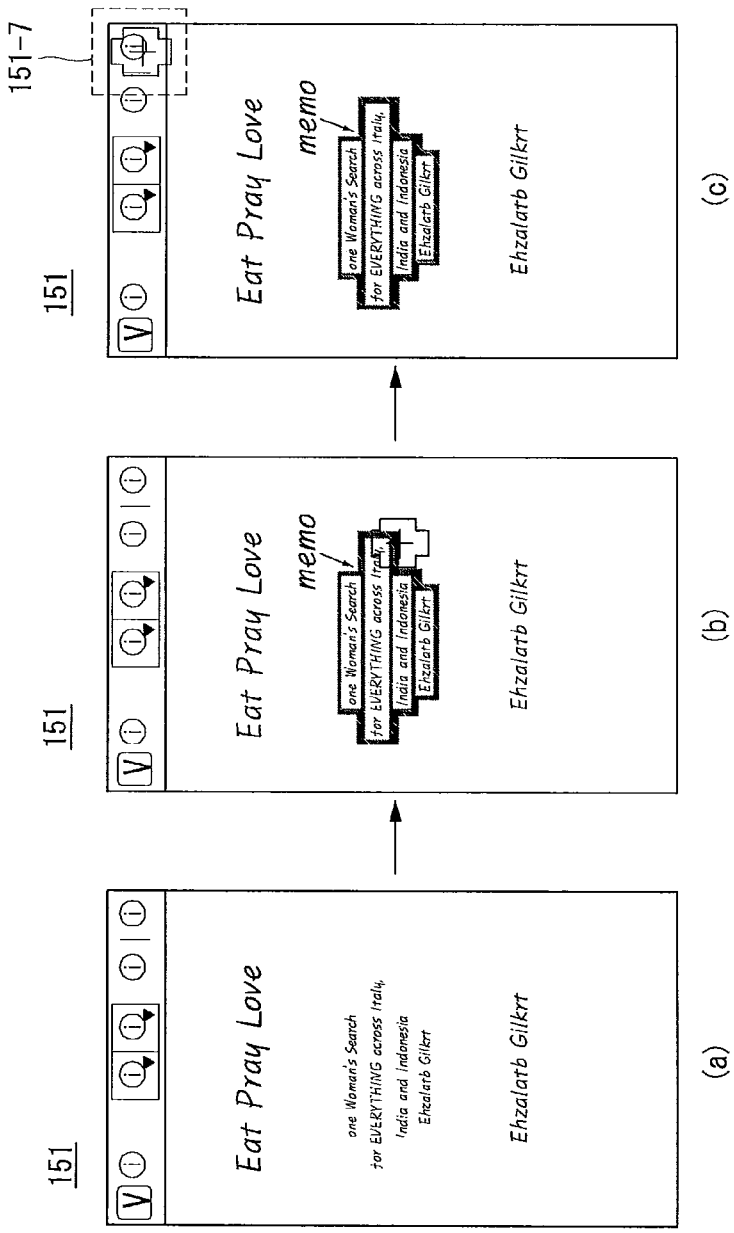
FIGS. 104 and 105 illustrate a procedure of using handwriting input received as a handwriting input function is activated while an e-book application is running according to a method for utilizing handwriting input illustrated in FIG. 103.
Figure 105:
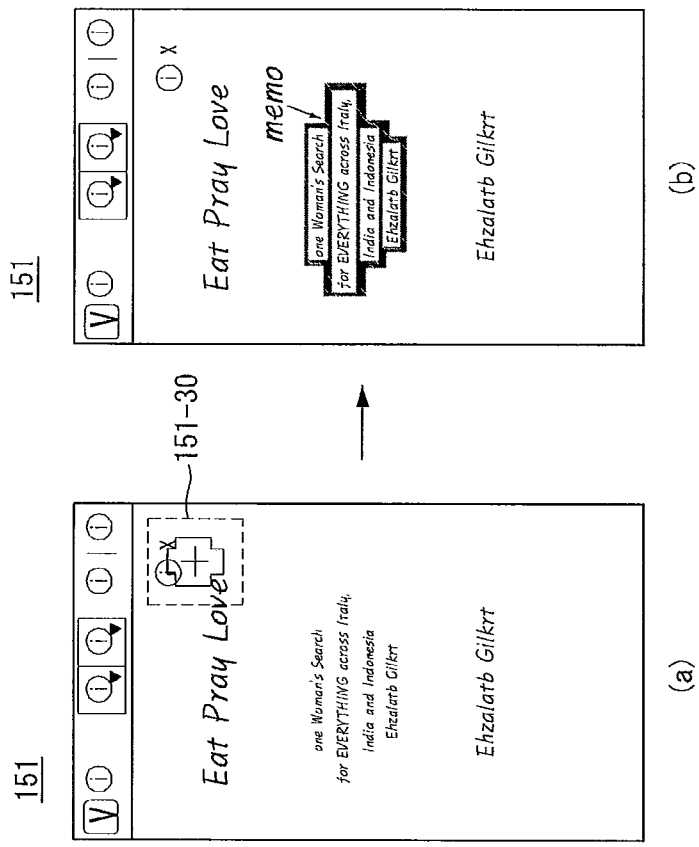

FIGS. 104 and 105 illustrate a procedure of using handwriting input received as a handwriting input function is activated while an e-book application is running according to a method for utilizing handwriting input illustrated in FIG. 103.

FIGS. 104(*a*) and (*b*) illustrate a case where a handwriting input function is activated while a particular page is displayed on a touch screen 151 as an e-book application is executed and the user inputs handwriting into a handwriting input area. FIG. 104(*c*) illustrates a case where the user touches an icon 151-7 for generating data based on handwriting input while handwriting has been input to the handwriting input area.

Then, the controller 180 stores the generated data in the form of data compliant with the particular page. FIG. 105(*c*) illustrates a case where the e-book application is executed while the generated data have been stored in the form of data compliant with the particular page. With reference to FIG. 105(*a*), a user interface 151-30 has been displayed additionally to a particular page of an e-book application displayed on a touch screen 151, indicating existence of a memo file stored in accordance with the particular page.

As shown in FIG. 105(*a*), the user touches a particular area of the user interface 151-30. Then the controller 180 can display a pre-stored memo file corresponding to the particular page additionally on the particular page. On the other hand, if the user touches a mark denoted by 'X' on the user interface 151-30, the controller 180 can erase the particular page from the user interface 151-30.

Different from what are illustrated in FIG. 105, a pre-stored memo file corresponding to the particular page can be displayed together with the particular page rather than hidden.

Figure 106:
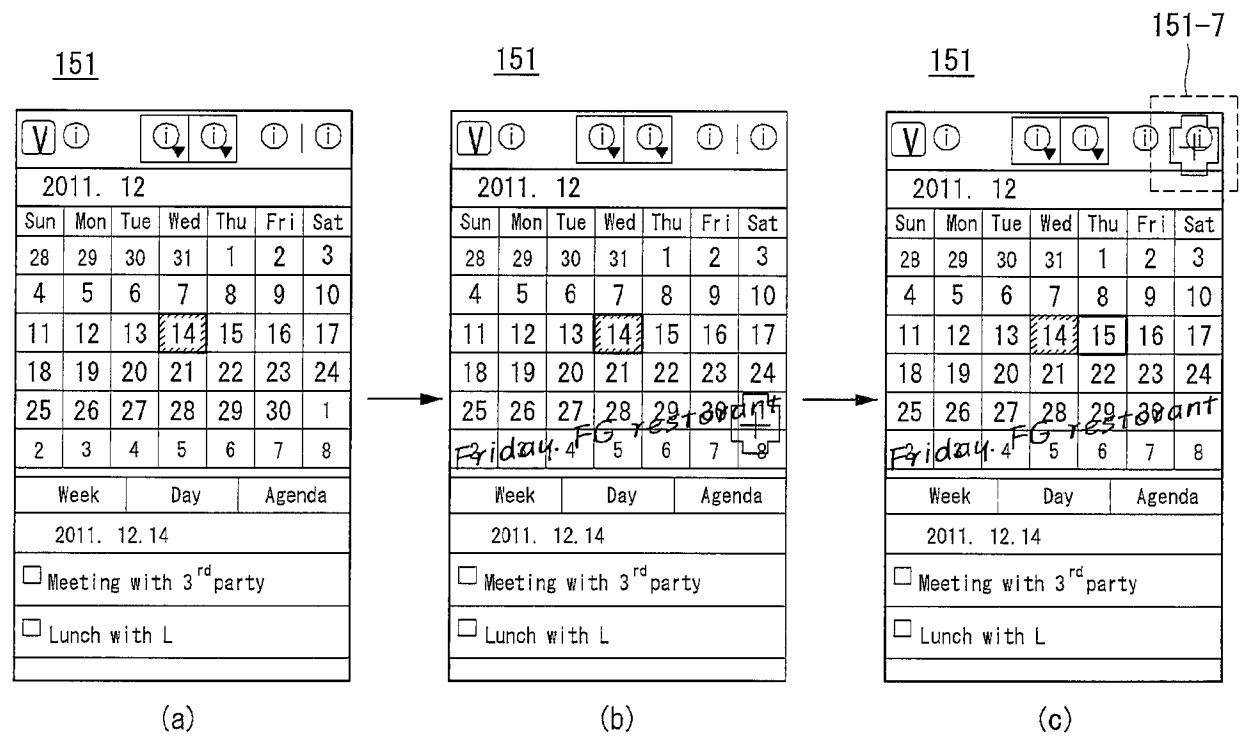
Figure 107:
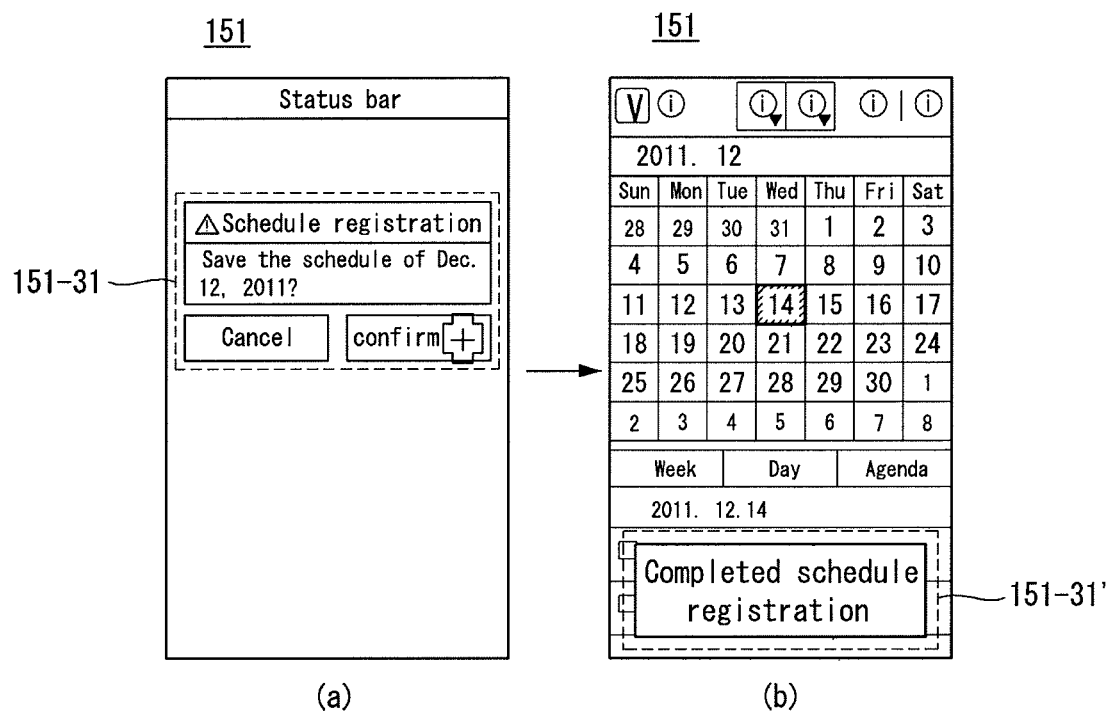

FIGS. 106 and 107 illustrate a procedure of using handwriting input received as a handwriting input function is activated while a calendar application is running according to a method for utilizing handwriting input illustrated in FIG. 103. FIGS. 106(*a*) and (*b*) illustrate a case where a calendar application is performed and a handwriting input function is activated while the execution screen is displayed on a touch screen 151 and the user inputs handwriting into a handwriting input area. FIG. 106(*c*) illustrates a case where the user touches an icon 151-7 for generating data based on handwriting input while handwriting is input to the handwriting input area.

Then, the controller 180 performs character recognition against the handwriting input and thus recognizes that the handwriting input has been made at Friday, Dec. 14, 2011 and considers image data generated based on the handwriting input as the data corresponding to the recognized data. FIG. 107(*a*) illustrates a case where a user interface 151-31 is displayed on a touch screen 151, where the user interface is intended for storing the generated image data at the recognized data of Nov. 16, 2012.

While in the state illustrated in FIG. 107(*a*), the user touches a confirm button of the user interface 151-30. Then, as shown in FIG. 107(*b*), the controller 180 can store the generated image data according to a schedule corresponding to the recognized date and display on a touch screen 151 a user interface 151-31' indicating the status.

As described with reference to FIGS. 106 and 107, the controller 180, if handwriting input is received as a handwriting input function is activated while a calendar application is activated, can store data generated based on the handwriting input in association with the date selected in an execution screen of the calendar application. Here, the controller 180 has selected the date recognized according to handwriting recognition applied against the handwriting input as the date selected in an execution screen of the calendar application.

Figure 108:
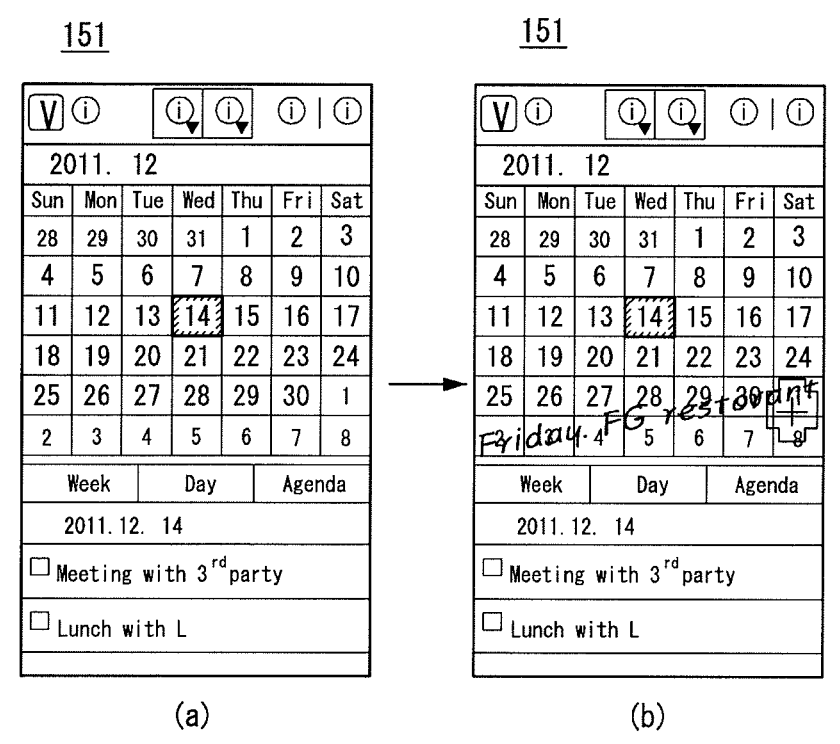
Figure 109:
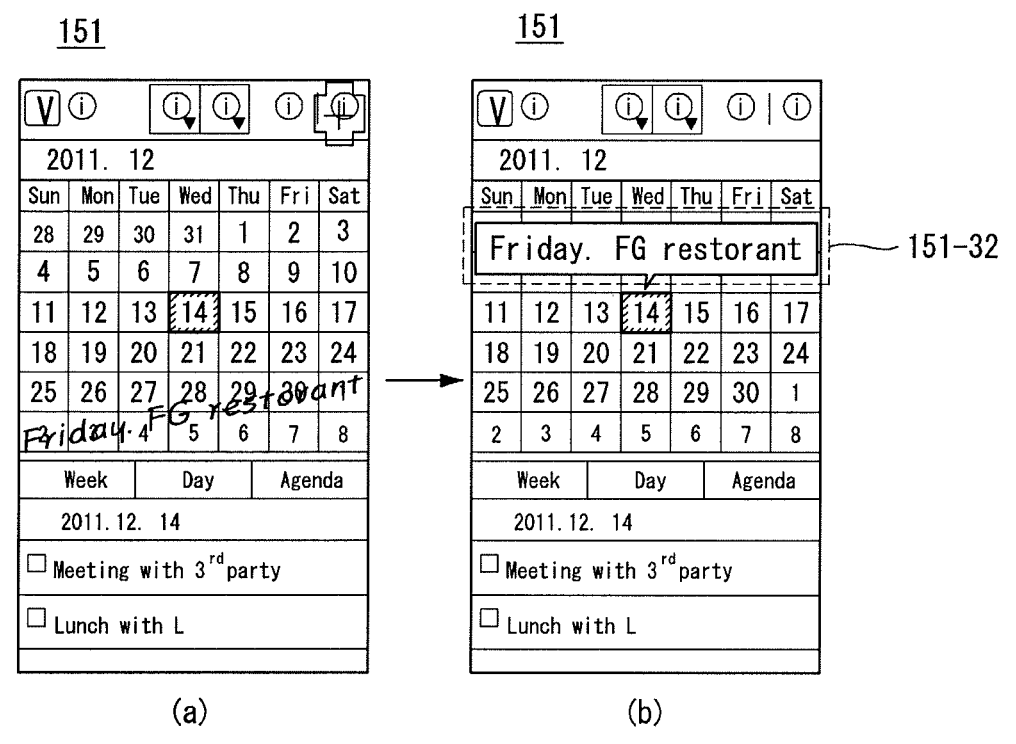

FIGS. 108 and 109 illustrate a procedure of using handwriting input received as a handwriting input function is activated while a calendar application is running according to a method for utilizing handwriting input illustrated in FIG. 103.

FIGS. 108(*a*) and (*b*) illustrate a case where a calendar application is performed and a handwriting input function is activated while the execution screen is displayed on a touch screen 151 and the user inputs handwriting into a handwriting input area. FIG. 109(*a*) illustrates a case where the user touches an icon 151-7 for generating data based on handwriting input while handwriting is input to the handwriting input area.

Then, the controller 180 can perform character recognition against the handwriting input and store the character recognition result as the data corresponding to the date of Dec. 14, 2011 selected from an execution screen of the calendar application. FIG. 109(*b*) illustrates a case where a calendar application is performed after the character recognition result is stored and if the selected date is chosen from an execution screen of the calendar application, the stored character recognition result 151-32 is displayed additionally on the execution screen of the calendar application.

Figure 110:
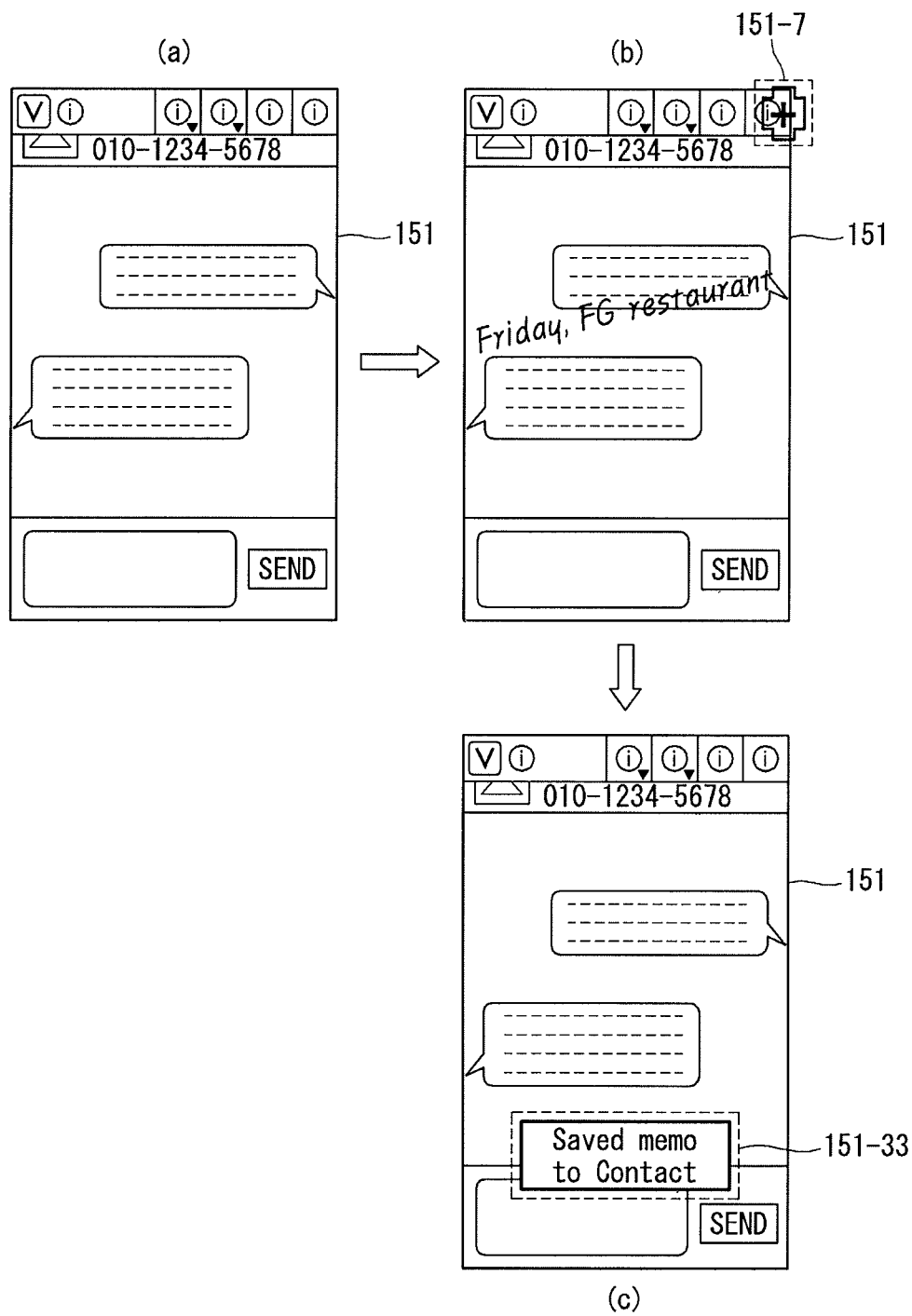
FIGS. 110 and 111 illustrate a procedure of using handwriting input received as a handwriting input function is activated while a messaging application is running according to a method for utilizing handwriting input illustrated in FIG. 103.
Figure 111:
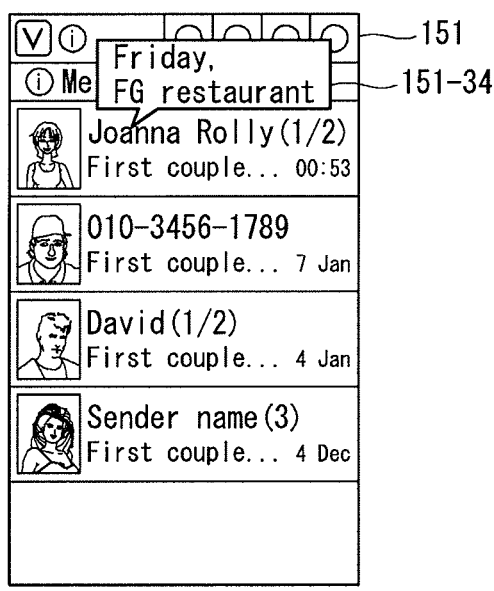

FIGS. 110 and 111 illustrate a procedure of using handwriting input received as a handwriting input function is activated while a messaging application is running according to a method for utilizing handwriting input illustrated in FIG. 103.

FIGS. 110(*a*) and (*b*) illustrate a case where a handwriting input function is activated as a messaging application is performed and the execution screen is displayed on a touch screen 151; and the user inputs handwriting into a handwriting input area. Then, the user touches an icon 151-7 for generating data based on handwriting input while in the state illustrated in FIG. 110(*a*).

Then, the controller 180 can generate data corresponding to the handwriting input and store the generated data in conjunction with a message transmitting/receiving party selected in an execution screen of the message application. For example, the controller 180 can store the generated data in the contact information of the transmitting/receiving party. Here, the generated information can be a character recognition result against the handwriting input or image data corresponding to the handwriting input.

FIG. 111 illustrates a case where the generated data are stored as contact information of a messaging party and if a message is received from the user, the stored information is displayed together with the messaging party-related information.

Figure 112:
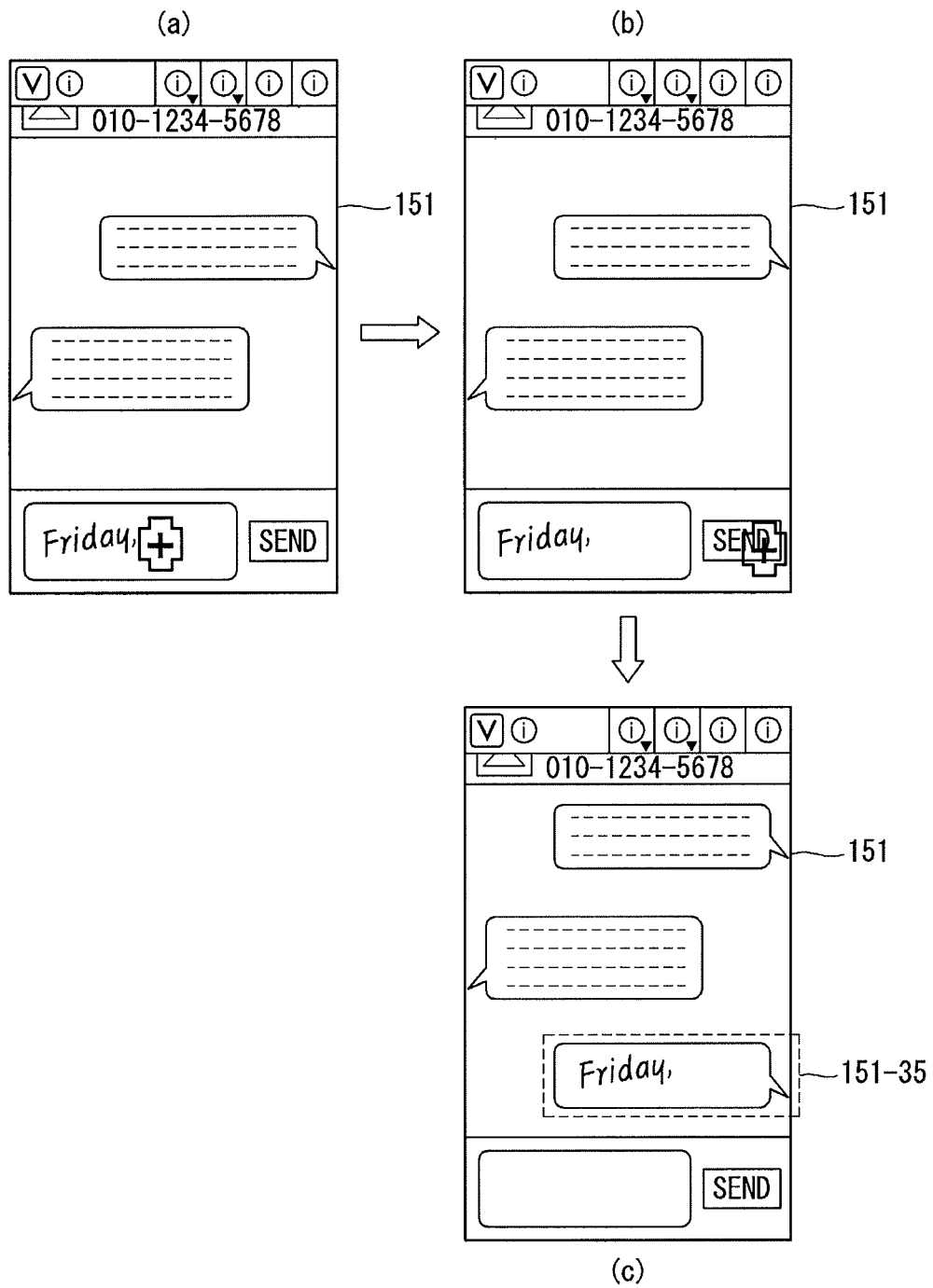
FIG. 112 illustrates one example of using handwriting input based on a handwriting input activated in an execution screen of a messaging application.

FIG. 112 illustrates one example of using handwriting input based on a handwriting input activated in an execution screen of a messaging application.

FIG. 112(*a*) illustrates a case where a handwriting input function is activated while the messaging application is performed and the user inputs handwriting in a message input area of an execution screen of the messaging application. Next, the user touches a message transmission button as shown in FIG. 112(*a*).

Then, the controller 180, as shown in FIG. 112(*c*), can generate image data corresponding to the handwriting input and transmit the generated image to a messaging party.

Figure 113:
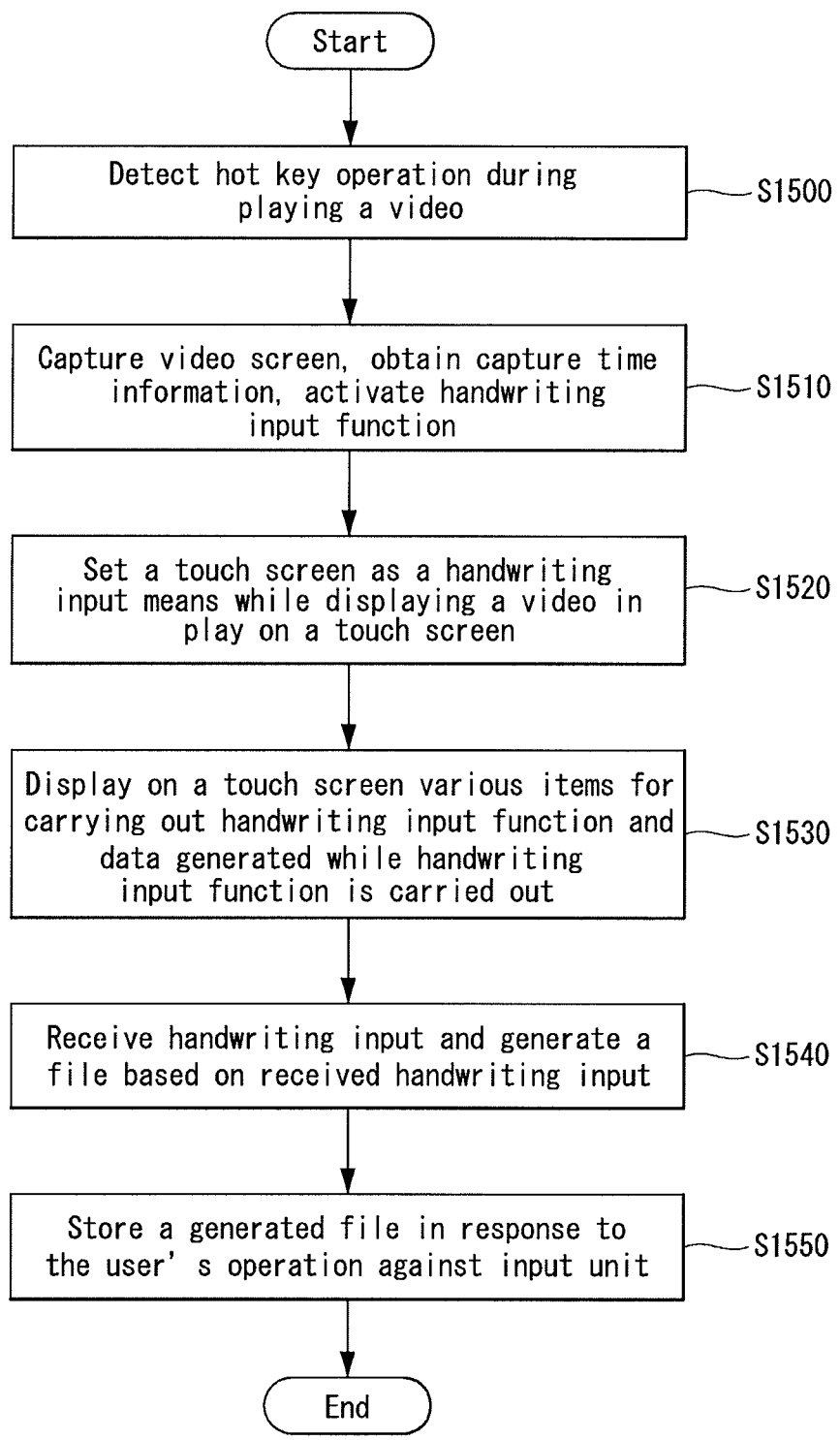
FIG. 113 is a flow diagram illustrating yet another example of a method for generating a memo file in a mobile terminal according to the present invention.

FIG. 113 is a flow diagram illustrating yet another example of a method for generating a memo file in the mobile terminal 100 according to the present invention.

If the user operates a hot key predetermined to activate a handwriting input function in the middle of playing a video, the controller 180 recognizes the hot key operation S1500. Then, the controller 180 captures a video screen and obtains the video capture time and activates a handwriting input function S1510. At this time, the controller 180 sets the touch screen 151 as a handwriting input means while displaying a video in play on a touch screen 151, S1520.

Meanwhile, though FIG. 113 assumes that a handwriting input function is activated based on hot key operation, as described previously, the controller 180 can activate the handwriting input function based on soft key operation, recognition of the user's particular gesture, a voice command of the user, etc. This will be applied the same for FIGS. 118 and 119 to be described later.

Also, the controller 180 can set the entire touch screen 151 or part of the touch screen 151 as a handwriting input means. Also, the controller 180 can set a separate handwriting input area on the touch screen 151 distinguished from the video display screen area. Examples where the touch screen 151 is determined as a handwriting input means will be described later in detail with reference to FIGS. 114 to 116.

If the touch screen is determined as a handwriting input means, the controller 180 can display on the touch screen 151 various items for carrying out a handwriting input function and data generated while performing the handwriting input function S1530. Here, various items for carrying out the handwriting input function can include an icon for carrying out a particular function, a selection area, etc. Meanwhile, data generated in the middle of carrying out the handwriting input function can include activation time for the handwriting input function, an image of a captured video screen, etc. However, the scope of the present invention is not limited to the above description.

If handwriting input is received though the touch screen 151 while the touch screen 151 is determined as a handwriting input means, the controller 180 generates a file based on the received handwriting input S1540 and stores the generated file based on the user's operation S1550. Here, the controller 180 can obtain storage time information of the generated file and additionally store the information. The capture time information of a video screen obtained previously and storage time information of the generated file can be displayed on a touch screen 151 when the user opens a stored file afterwards.

On the other hand, the controller 180 can store the generated file in a data storage area related to video files or a data storage area related to a memo application.

Figure 114:
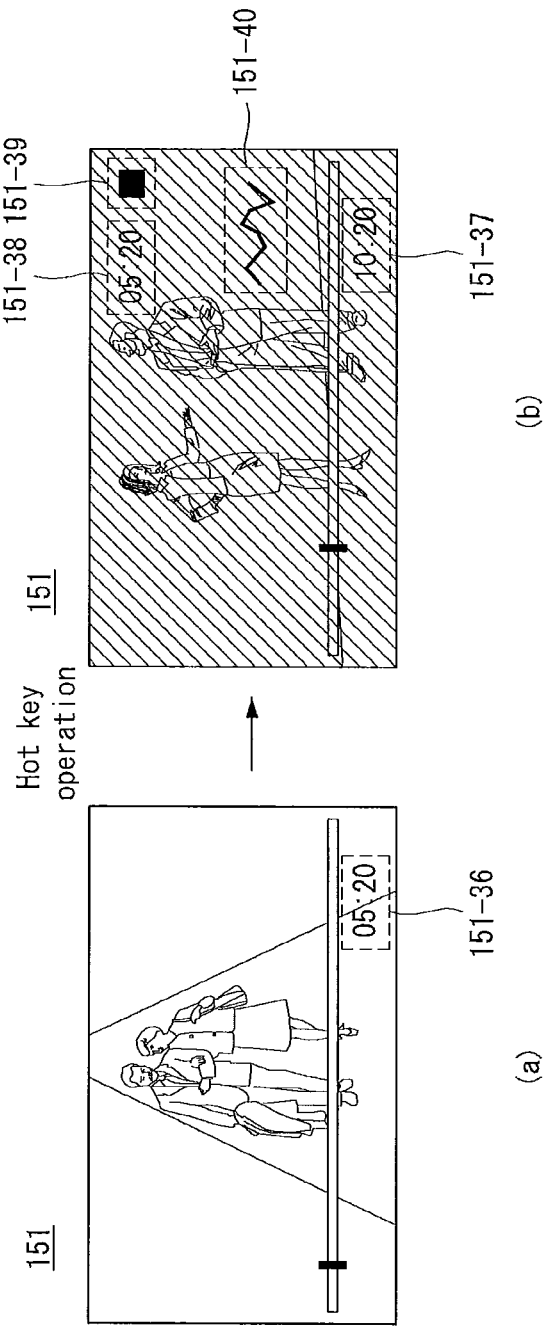
FIG. 114 illustrates one example of a display screen change of a touch screen according to a procedure of carrying out a handwriting input function according to a method for generating a memo file illustrated in FIG. 113.

FIG. 114 illustrates one example of a display screen change of a touch screen according to a procedure of carrying out a handwriting input function according to a method for generating a memo file illustrated in FIG. 113.

Referring to FIG. 114(a), it can be seen that playing time of 5 minutes and 20 seconds has elapsed. At this time point, the user operates a hot key for activating a handwriting input function. Then, the controller 180, as shown in FIG. 114(b), sets the entire touch screen 151 as a handwriting input area. It should be noted from FIG. 114(b) that a separate layer for handwriting input has been created on the video play screen.

Comparing the video play time information 151-36, 151-37 of FIGS. 114(a) and (b), the controller 180 continues video play operation and displays the result on the touch screen 151 even after the touch screen 151 is set as a handwriting input area. Also, the controller 180 can display the activation time of the handwriting input function (in other words, video screen capture time information 151-39) and an icon 151-39 for storing handwriting input 151-40 in the separate layer.

Figure 115:
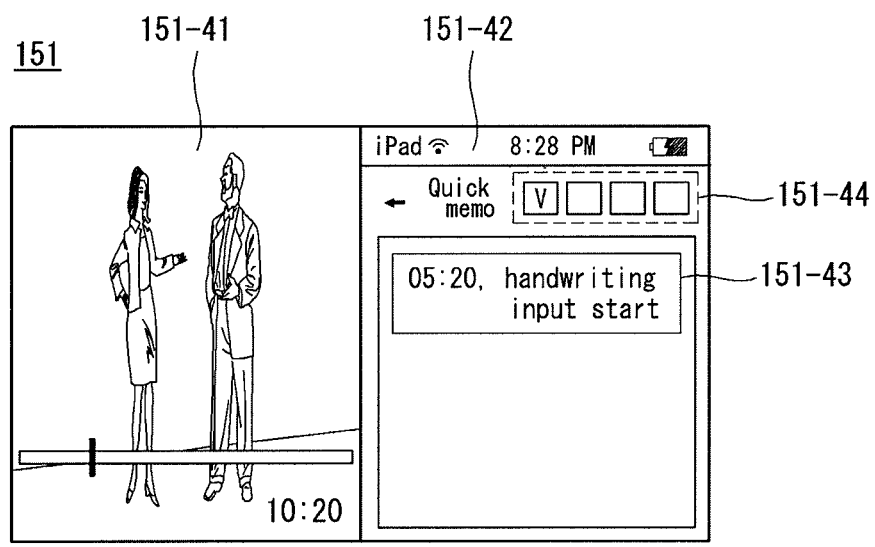
FIG. 115 illustrates another example of a display screen change of a touch screen according to a procedure of carrying out a handwriting input function according to a method for generating a memo file illustrated in FIG. 113.

FIG. 115 illustrates another example of a display screen change of a touch screen 151 according to a procedure of carrying out a handwriting input function according to a method for generating a memo file illustrated in FIG. 113. It should be noted that FIGS. 115 and 116 represent a display screen of a touch screen 151 when the user operates a hot key for activating a handwriting input function while in the state illustrated in FIG. 114(a).

Figure 116:
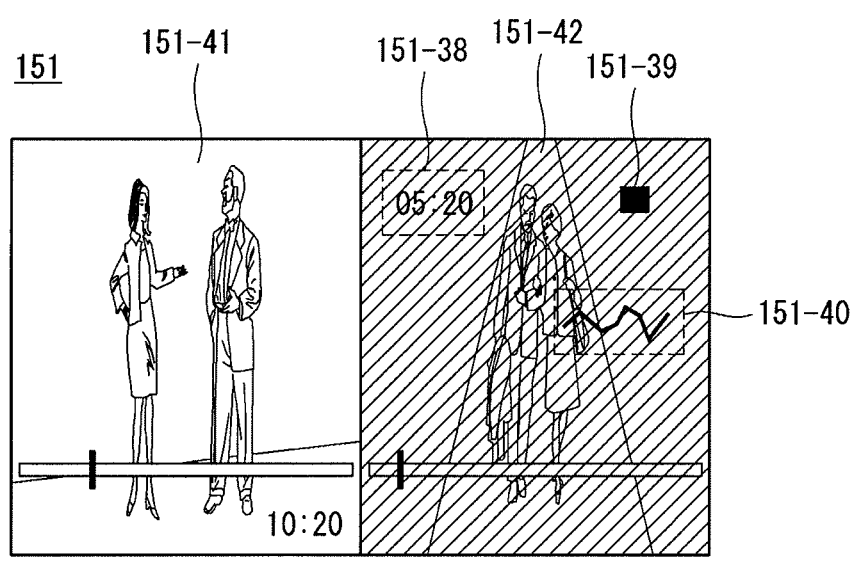
FIG. 116 illustrates still another example of a display screen change of a touch screen according to a procedure of carrying out a handwriting input function according to a method for generating a memo file illustrated in FIG. 113.

Referring to FIGS. 115 and 116, if a hot key is operated, the controller 180 divides the display of a touch screen 151 into a video play screen 151-4 and a handwriting input area 151-42. The handwriting input area displays handwriting start time information (namely, video screen capture time information 151-43) and tools for carrying out a handwriting input function.

Meanwhile, though a captured video screen is not displayed in the handwriting input area in FIG. 115, the controller 180 can store the captured video screen and the data generated based on handwriting input as a single file if the user operates a storage button. Also, the controller 180 can generate and store a file including only the generated data other than the captured video screen.

FIG. 116 illustrates still another example of a display screen change of a touch screen according to a procedure of carrying out a handwriting input function according to a method for generating a memo file illustrated in FIG. 113

Referring to FIGS. 115 and 116, FIG. 116 illustrates a case where a handwriting input area 151-42 displays a video screen captured as a background and on top of the captured video screen, a storage button 151-39 for storing a file generated based on video screen capture time 151-38 and handwriting input 151-40.

Figure 117:
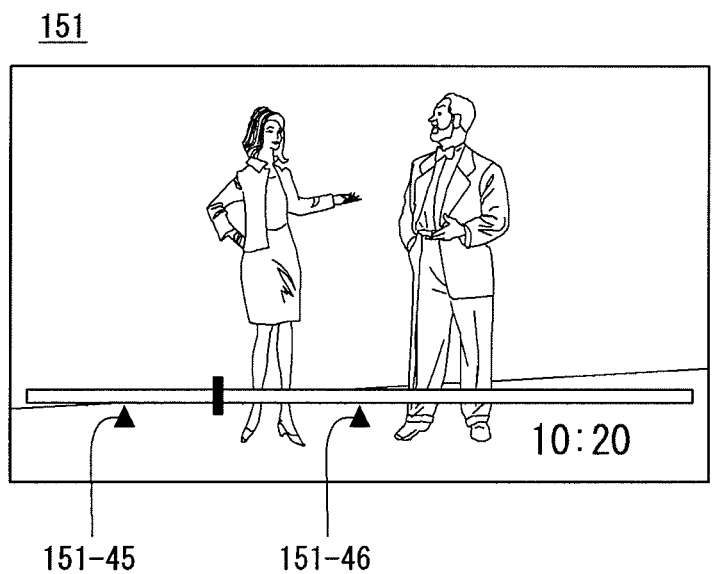
FIG. 117 illustrates an example where a generation position of a file generated according to a method for generating a memo file illustrated in FIG. 113 is provided through a screen playing moving images.

FIG. 117 illustrates an example where a generation position of a file generated according to a method for generating a memo file illustrated in FIG. 113 is provided through a screen playing moving images.

FIG. 117 illustrates a case where the controller 180 displays additionally on a video play screen an indicator 151-45, 151-46 indicating that the user has generated and stored a memo file based on handwriting input. The display timing of the indicator may correspond to an activation time point of a handwriting input function or a time point at which a generated file is stored based on the handwriting input function.

Figure 118:
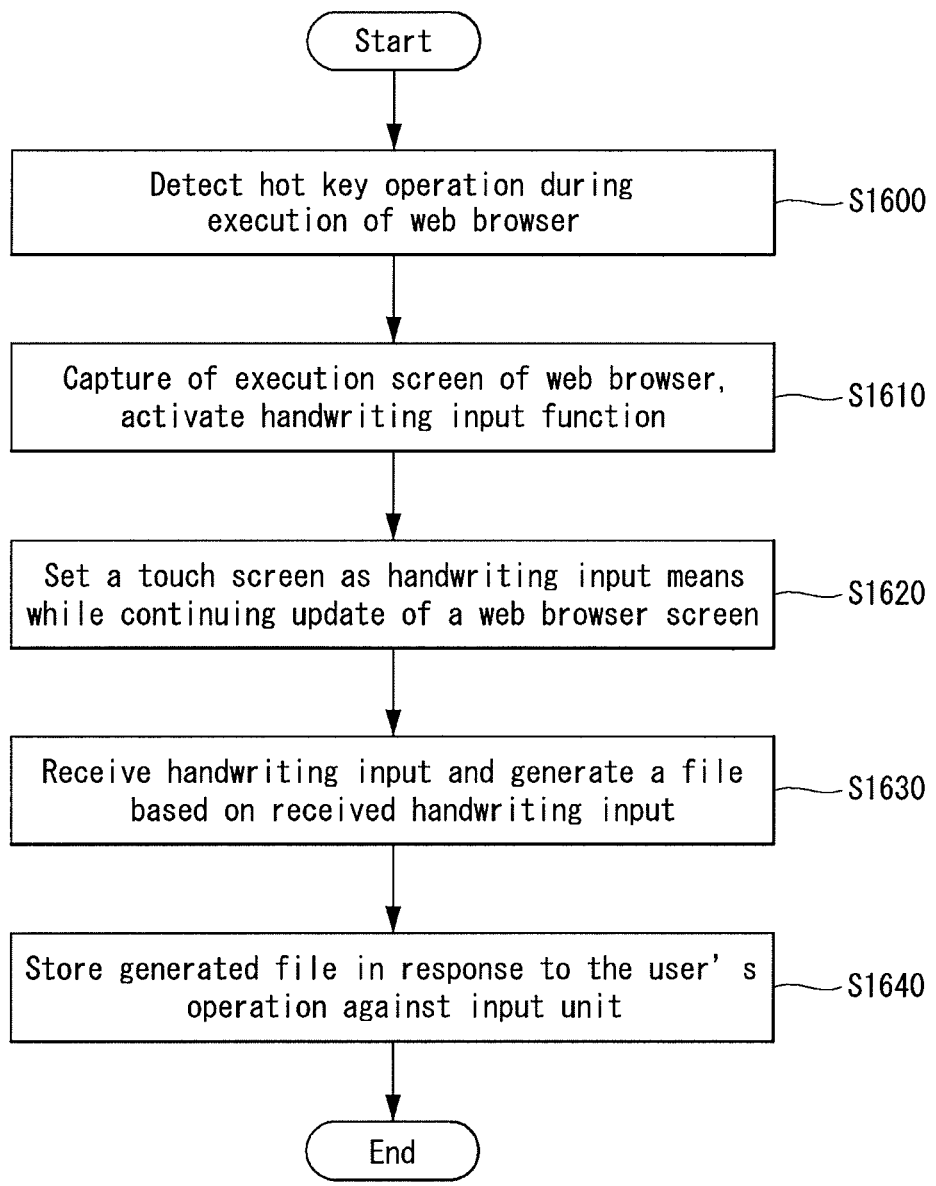
FIG. 118 is a flow diagram illustrating a further example of a method for generating a memo file in a mobile terminal according to the present invention.

FIG. 118 is a flow diagram illustrating a further example of a method for generating a memo file in the mobile terminal 100 according to the present invention. In what follows, the method for generating a memo file will be described with reference to related drawings.

Hot key operation for activating a handwriting input function is detected in the middle of running a web browser. Then, the controller 180 captures the web browser execution screen and activates a handwriting input function through a touch screen 151, S1610; and sets the touch screen 151 as a handwriting input means while continuing update of the web browser execution screen S1620. Here, update of a web browser execution screen may include update of contents displayed on the web browser execution screen, update of an article displayed on the web browser execution screen. However, the scope of the present invention is not limited to the above description.

If handwriting input is received through the touch screen 151 while the touch screen 151 is set as a handwriting input means, the controller 180 generates a file based on the received handwriting input S1630 and stores the generated file based on the user's operation S1640. Here, the generated file includes data generated based on the handwriting input. However, incorporating a captured image of an execution screen of the web browser into the generated file may be optional.

As described with reference to FIG. 118, the mobile terminal 100 according to the present invention can update an execution screen of a running application in such a way of reflecting the execution result of the application even if a handwriting input function is activated.

Though not shown in the figure, the mobile terminal 100 according to the present invention may not change the display status of contents through a touch screen 151 even if a handwriting input function is activated. For example, if a handwriting input function is activated while a flash-based video is displayed on a display screen of the touch screen 151, the controller 180 may not change the display status of the flash-based video. The conditions above can be applied the same to a case where flash-based contents are displayed on a web browser execution screen.

Figure 119:
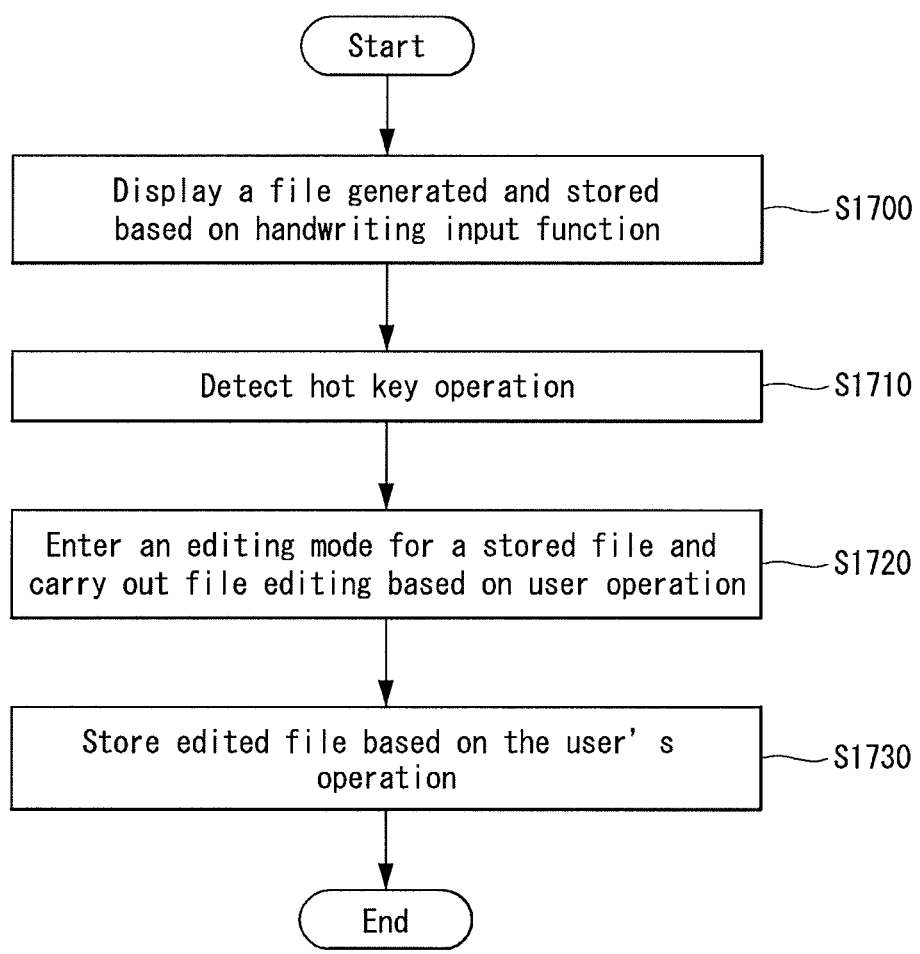
FIG. 119 is a flow diagram illustrating a different example of a method for generating a memo file in a mobile terminal according to the present invention.

FIG. 119 is a flow diagram illustrating a different example of a method for editing a memo file in the mobile terminal 100 according to the present invention. In what follows, the method for editing a memo file will be described with reference to related drawings.

A file generated and stored based on a handwriting input function is displayed on a touch screen 151. The user's hot key operation is detected while the stored file is displayed S1700. Here, the hot key may correspond to a hot key set for activating the handwriting input function.

If it is detected that the user operates a hot key, the controller 180 enters the mobile terminal 100 an editing mode for the stored file and carries out file editing based on the operation of the user S1720. Here, the operation of the user may include deleting of handwriting input, additional handwriting input, etc. However, the scope of the present invention is not limited to the above description.

Next, the controller 180 stores the edited file based on the user's operation S1730. Here, the edited file can be stored in a data storage area where files are used to be stored. Also, the edited file can be stored in a new data storage area. At this time, the controller 180 can display on a touch screen 151 a user interface for selecting or setting a data storage area in which the edited file is to be stored.

Each of the methods for generating a file, methods for sharing a file, and methods for utilizing handwriting input in the mobile terminal 100 according to the present invention described above can be implemented in the form of a program which can be executed through various computer means and can be recorded in a computer-readable recording medium.

The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a wireless communication unit configured to wirelessly communicate with at least one other terminal;
a touch screen;
a controller configured to:
activate a handwriting input function on the touch screen while displaying an image of a display screen on the touch screen,
receive handwriting input through the touch screen on the displayed image,
display on the touch screen a user interface for determining whether or not to include the displayed image with the handwriting input,
store a file including the displayed image with the handwriting input when it is determined based on a selection of the user interface to include the displayed image with the handwriting input, and
store a file including the handwriting input without the displayed image when it is determined based on a selection of the user interface not to include the displayed image with the handwriting input.

2. The mobile terminal of claim 1, further comprising:
an input unit configured to receive an input for activating the handwriting input function,
wherein the received input corresponds to one of:
a selection of a predetermined hardware hot key included in the input unit,
at least one of particular user gesture recognized through a camera included in the input unit and a particular voice command through a microphone included in the input unit,
a touch on a soft key displayed on the touch screen, and
a particular touch pattern formed on the touch screen.

3. The mobile terminal of claim 2, wherein when the input unit receives the input while a power supply to the touch screen is turned off, the controller is further configured to turn on the power supply to the touch screen, activate the handwriting input function and display on the touch screen the user interface for determining whether or not to include the displayed image with the handwriting input.

4. The mobile terminal of claim 2, wherein when the input unit receives the input while the touch screen is in a lock-screen state and the displayed image is a lock screen, the controller is further configured to activate the handwriting input function, and display on the touch screen the user interface for determining whether to include the lock screen with the handwriting input.

5. The mobile terminal of claim 1, wherein the controller is configured to activate a speaker phone function of the mobile terminal when the handwriting input function is activated while a call application is occurring on the mobile terminal.

6. The mobile terminal of claim 1, wherein when a call reception event occurs on the mobile terminal while the handwriting input function is activated, the controller is further configured to convert the display screen of the touch screen from a handwriting input screen to an execution screen of a call application and switch back to the handwriting input screen when the call application is terminated.

7. The mobile terminal of claim 1, wherein when a predetermined event occurs on the mobile terminal while the handwriting input function is activated, the controller is further configured to display a notification user interface notifying the occurrence of the predetermined event on a handwriting input screen for a predetermined time period.

8. The mobile terminal of claim 7, wherein when a touch action is received through the displayed notification user interface within the predetermined time period, the controller is further configured to convert the display screen of the touch screen into an execution screen of an application corresponding to the particular event.

9. The mobile terminal of claim 1, wherein the user interface includes an option for transmitting the stored file to said at least one other terminal using the wireless communication unit.

10. The mobile terminal of claim 1, wherein when the handwriting input function is activated, the controller is further configured to automatically deactivate hardware keys disposed in a front surface of the mobile terminal or display on the touch screen a user interface for deactivating the hardware keys.

11. The mobile terminal of claim 1, wherein the controller is further configured to obtain particular information corresponding to the display screen and store the obtained particular information together with the stored file.

12. The mobile terminal of claim 1, wherein the user interface includes an editing tool for editing the handwriting input.

13. The mobile terminal of claim 1, wherein the user interface includes an editing tool for editing the file including the image with the handwriting input.

14. The mobile terminal of claim 1, wherein the controller is further configured to:
display a memo user interface option based on a selection of a hardware key on the mobile terminal for activating the handwriting input function.

15. The mobile terminal of claim 14, wherein the memo user interface is displayed in an indicator area.

16. The mobile terminal of claim 14, wherein the handwriting input function is activated when the memo user interface option is selected.

17. The mobile terminal of claim 1, wherein the user interface includes a memo option for displaying a screen with the received handwriting input without the displayed image.

18. The mobile terminal of claim 1, wherein the user interface includes a sharing option for sharing the file.

19. The mobile terminal of claim 18, wherein the sharing option includes email and social media options for sharing the file.

20. The mobile terminal of claim 1, wherein the file is stored to a specific folder on the mobile terminal.

21. The mobile terminal of claim 1, wherein the displayed image corresponds to an execution screen of a particular application.

22. The mobile terminal of claim 21, wherein the handwriting input is overlapped on the execution screen of the particular application.

23. The mobile terminal of claim 22, wherein the stored file includes the handwriting input overlapped on the execution screen.

24. The mobile terminal of claim 21, wherein the controller is further configured to deactivate the execution screen of the particular application, when the handwriting input function is activated.

25. The mobile terminal of claim 21, wherein the controller is further configured to change the execution screen of the particular application into a translucent state, when the handwriting input function is activated.

26. The mobile terminal of claim 1, wherein the stored file including the handwriting input without the displayed image corresponds to one of an image of the handwriting input, character-recognized text of the handwriting input or a combination of the image and character-recognized text of the handwriting input.

27. A method of controlling a mobile terminal, the method comprising:
activating, via a controller of the mobile terminal, a handwriting input function on a touch screen while displaying an image of a display screen on the touch screen;
receiving handwriting input through the touch screen on the displayed image;
displaying on the touch screen a user interface for determining whether or not to include the displayed image with the handwriting input;
storing, via the controller, a file including the displayed image with the handwriting input when it is determined based on a selection of the user interface to include the displayed image with the handwriting input; and
storing, via the controller, a file including the handwriting input without the displayed image when it is determined based on a selection of the user interface not to include the displayed image with the handwriting input.

28. The method of claim 27, further comprising:
receiving, via an input unit of the mobile terminal, an input for activating the handwriting input function,
wherein the received input corresponds to one of:
a selection of a predetermined hardware hot key included in the input unit,
at least one of particular user gesture recognized through a camera included in the input unit and a particular voice command through a microphone included in the input unit,
a touch on a soft key displayed on the touch screen, and
a particular touch pattern formed on the touch screen.

29. The method of claim 28, wherein when the input unit receives the input while a power supply to the touch screen is turned off, the method further comprises turning on the power supply to the touch screen, activating the handwriting input function and displaying on the touch screen the user interface for determining whether or not to include the displayed image with the handwriting input.

30. The method of claim 28, wherein when the input unit receives the input while the touch screen is in a lock-screen state and the displayed image is a lock screen, the method further comprises activating the handwriting input function, and displaying on the touch screen the user interface for determining whether to include the lock screen with the handwriting input.

31. The method of claim 27, further comprising:
activating a speaker phone function of the mobile terminal when the handwriting input function is activated while a call application is occurring on the mobile terminal.

32. The method of claim 27, wherein when a call reception event occurs on the mobile terminal while the handwriting input function is activated, the method further comprises converting the display screen of the touch screen from a handwriting input screen to an execution screen of a call application and switching back to the handwriting input screen when the call application is terminated.

33. The method of claim 27, wherein when a predetermined event occurs on the mobile terminal while the handwriting input function is activated, the method further comprises displaying a notification user interface notifying the occurrence of the predetermined event on a handwriting input screen for a predetermined time period.

34. The method of claim 33, wherein when a touch action is received through the displayed notification user interface within the predetermined time period, the method further comprises converting the display screen of the touch screen into an execution screen of an application corresponding to the particular event.

35. The method of claim 27, wherein the user interface includes an option for transmitting the stored file to said at least one other terminal using the wireless communication unit.

36. The method of claim 27, wherein when the handwriting input function is activated, the method further comprises automatically deactivating hardware keys disposed in a front surface of the mobile terminal or displaying on the touch screen a user interface for deactivating the hardware keys.

37. The method of claim 27, further comprising:
obtaining particular information corresponding to the display screen and storing the obtained particular information together with the stored file.

38. The method of claim 27, wherein the user interface includes an editing tool for editing the handwriting input.

39. The method of claim 27, wherein the user interface includes an editing tool for editing the file including the image with the handwriting input.

40. The method of claim 27, further comprising:
displaying a memo user interface option based on a selection of a hardware key on the mobile terminal for activating the handwriting input function.

41. The method of claim 40, wherein the memo user interface is displayed in an indicator area.

42. The method of claim 40, wherein the handwriting input function is activated when the memo user interface option is selected.

43. The method of claim 27, wherein the user interface includes a memo option for displaying a screen with the received handwriting input without the displayed image.

44. The method of claim 27, wherein the user interface includes a sharing option for sharing the file.

45. The method of claim 44, wherein the sharing option includes email and social media options for sharing the file.

46. The method of claim 27, wherein the file is stored to a specific folder on the mobile terminal.

47. The method of claim 27, wherein the displayed image corresponds to an execution screen of a particular application.

48. The method of claim 47, wherein the handwriting input is overlapped on the execution screen of the particular application.

49. The method of claim 48, wherein the stored file includes the handwriting input overlapped on the execution screen.

50. The method of claim 47, further comprising:
deactivating the execution screen of the particular application, when the handwriting input function is activated.

51. The method of claim 47, further comprising:
changing the execution screen of the particular application into a translucent state, when the handwriting input function is activated.

52. The method of claim 27, wherein the stored file including the handwriting input without the displayed image corresponds to one of an image of the handwriting input, character-recognized text of the handwriting input or a combination of the image and character-recognized text of the handwriting input.

* * * * *